(12) United States Patent
Shimoda et al.

(10) Patent No.: US 11,700,665 B2
(45) Date of Patent: Jul. 11, 2023

(54) COMMUNICATION SYSTEM, BASE STATION DEVICE AND COMMUNICATION TERMINAL DEVICE

(71) Applicant: Mitsubishi Electric Corporation, Tokyo (JP)

(72) Inventors: Tadahiro Shimoda, Tokyo (JP); Mitsuru Mochizuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/545,545

(22) Filed: Dec. 8, 2021

(65) Prior Publication Data

US 2022/0104307 A1    Mar. 31, 2022

Related U.S. Application Data

(63) Continuation of application No. 16/641,124, filed as application No. PCT/JP2018/035876 on Sep. 27, 2018, now Pat. No. 11,234,286.

(30) Foreign Application Priority Data

Sep. 27, 2017  (JP) ................. 2017-186492

(51) Int. Cl.
  *H04W 76/27*    (2018.01)
(52) U.S. Cl.
  CPC ................. *H04W 76/27* (2018.02)
(58) Field of Classification Search
  CPC ..... H04W 76/27; H04W 76/15; H04W 92/20; H04W 16/32; H04W 24/08; H04B 17/14; H04B 17/309
  See application file for complete search history.

(56) References Cited

U.S. PATENT DOCUMENTS 8,718,016 B2 *  5/2014  Izawa ............... H04W 36/0005
                                                       455/436
10,952,107 B2   3/2021  Lee
(Continued)

FOREIGN PATENT DOCUMENTS

JP        2016-528778 A    9/2016
WO    WO 2015/012492 A1    1/2015
(Continued)

OTHER PUBLICATIONS

Indian Office Action dated Apr. 7, 2022 in Indian Patent Application No. 202047010031, 6 pages.
(Continued)

*Primary Examiner* — Andrew Wendell
(74) *Attorney, Agent, or Firm* — Oblon, McClelland, Maier & Neustadt, L.L.P.

(57) ABSTRACT

A high-speed communication system etc. are provided in New Radio (NR) and LTE. When a secondary base station device detects a data inactive state for all bearers, the secondary base station device notifies a master base station device of occurrence of the data inactive state regardless of absence of an inquiry from the master base station device. The data inactive state is a state in which downlink data for a communication terminal device is inactive. When the master base station device receives the notification about the occurrence of the data inactive state, the master base station device transmits a command to the communication terminal device to transition from an RRC_CONNECTED state to an RRC_INACTIVE state. Based on the command from the master base station device, the communication terminal device transitions to the RRC_INACTIVE state.

4 Claims, 27 Drawing Sheets

(56) References Cited

U.S. PATENT DOCUMENTS

| | | | | |
|---|---|---|---|---|
| 2009/0264128 | A1* | 10/2009 | Tomisawa | H04W 36/30 455/436 |
| 2013/0215772 | A1* | 8/2013 | Kaur | H04W 36/0072 370/332 |
| 2014/0200021 | A1* | 7/2014 | Jiao | H04W 72/1226 455/452.2 |
| 2014/0362752 | A1* | 12/2014 | Jha | H04W 28/085 370/311 |
| 2015/0003272 | A1* | 1/2015 | Hu | H04L 5/14 370/252 |
| 2016/0127107 | A1 | 5/2016 | Zahng | |
| 2016/0150418 | A1 | 5/2016 | Kang et al. | |
| 2016/0242128 | A1 | 8/2016 | Loehr | |
| 2017/0373728 | A1* | 12/2017 | Viering | H04B 7/0632 |
| 2018/0084523 | A1* | 3/2018 | Uchiyama | H04W 88/04 |
| 2018/0324872 | A1 | 11/2018 | Babaei | |
| 2018/0367273 | A1 | 12/2018 | Park | |
| 2019/0021120 | A1* | 1/2019 | Chen | H04W 74/0833 |
| 2019/0052339 | A1 | 2/2019 | Zhou | |
| 2019/0327708 | A1* | 10/2019 | Hong | H04W 4/20 |
| 2020/0022044 | A1 | 1/2020 | Kim | |
| 2020/0205123 | A1* | 6/2020 | Byun | H04W 76/27 |

FOREIGN PATENT DOCUMENTS

| | | |
|---|---|---|
| WO | WO 2015/165120 A1 | 11/2015 |
| WO | WO 2015/197904 A1 | 12/2015 |

OTHER PUBLICATIONS

Japanese Office Action dated Aug. 30, 2022 in Japanese Patent Application No. 2019-545598 (with unedited computer generated English translation), 8 pages.
International Search Report dated Dec. 18, 2018 in PCT/JP2018/035876 filed on Sep. 27, 2018, 6 pages.
3GPP TSG-RAN WG3 Meeting #97, R3-172739, "RRC_Inactive with MR_DC," Qualcomm Incorporated, Aug. 2017 (total 7 pages).
Extended European Search Report dated May 14, 2021 in corresponding European Patent Application No. 18861769.0, 7 pages.
3GPP TS 36.300 V14.3.0 (Jun. 2017), Technical Specification, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," Jun. 2017 (total 331 pages).
3GPP TSG-SA1 #42, S1-083461, "LS on HNB/HeNB Open Access Mode," 3GPP SA WG1, Oct. 2008 (total 2 pages).
3GPP TR 36.814 V9.2.0 (Mar. 2017), Technical Report,"3rd Generation Partnership Project; Technical Specification Group Radio Access Network; Evolved Universal Terrestrial Radio Access (E-UTRA); Further advancements for E-UTRA physical layer aspects (Release 9)," Mar. 2017 (total 105 pages).
3GPP TR 36.912 V14.0.0 (Mar. 2017), Technical Report, "3rd Generation Partnership Project; Technical Specification Group Radio Access Network; Feasibility study for Further Advancements for E-UTRA (LTE-Advanced) (Release 14)," Mar. 2017 (total 252 pages).
Document No. ICT-317669-METIS/D1.1, Project Name: Mobile and wireless communications Enablers for the Twenty-twenty Information Society (METIS), Deliverable D1.1, "Scenarios, requirements and KPIs for 5G mobile and wireless system," Apr. 2013 (total 84 pages).
3GPP TR 23.799 V14.0.0 (Dec. 2016), Technical Report, "3rd Generation Partnership Project; Technical Specification Group Services and System Aspects; Study on Architecture for Next Generation System (Release 14)," Dec. 2016 (total 522 pages).
3GPP TR 38.801 V14.0.0 (Mar. 2017), Technical Report, "3rd Generation Partnership Project; Technical Specification Group Radio Access Network; Study on new radio access technology: Radio access architecture and interfaces (Release 14)," Mar. 2017 (total 91 pages).
3GPP TR 38.802 V14.1.0 (Jun. 2017), Technical Report, "3rd Generation Partnership Project; Technical Specification Group Radio Access Network; Study on New Radio Access Technology Physical Layer Aspects (Release 14)," Jun. 2017 (total 144 pages).
3GPP TR 38.804 V14.0.0 (Mar. 2017), Technical Report, "3rd Generation Partnership Project; Technical Specification Group Radio Access Network; Study on New Radio Access Technology; Radio Interface Protocol Aspects (Release 14)," Mar. 2017 (total 57 pages).
3GPP TR 38.912 V14.0.0 (Mar. 2017), Technical Specification, 3rd Generation Partnership Project; Technical Specification Group Radio Access Network; Study on New Radio (NR) access technology (Release 14), Mar. 2017 (total 74 pages).
3GPP TSG-RAN WG2 Meeting NR ad-hoc 2, R2-1706892, "MR-DC Mode in Inactive," Qualcomm Incorporated, Jun. 2017 (total 1 page).
3GPP TSG RAN Meeting #76, RP-171050 (revision of RP-170779), "Revision of SID on Enhanced Support for Aerial Vehicles," NTT Docomo Inc, Ericsson, Jun. 2017 (total 4 pages).
3GPP TSG RAN WG1 #89, R1-1708433, "Initial views on potential problems and solutions for aerial vehicles," NTT Docomo, May 2017 (total 5 pages).
Extended European Search Report issued Jan. 5, 2023, in Patent Application No. EP 22 20 7513, 9 pages.
Indian Office Action dated Feb. 3, 2023, in Indian Patent Application No. 202348001047, 6 pages (with English Translation).
Indian Office Action dated Feb. 3, 2023, in Indian Patent Application No. 202348001075, 6 pages (with English Translation).
3GPP TSG-RAN WG2 #97, R2-1702196, "TP on UL data in INACTIVE," Ericsson, Feb. 2017 (total 3 pages).

\* cited by examiner

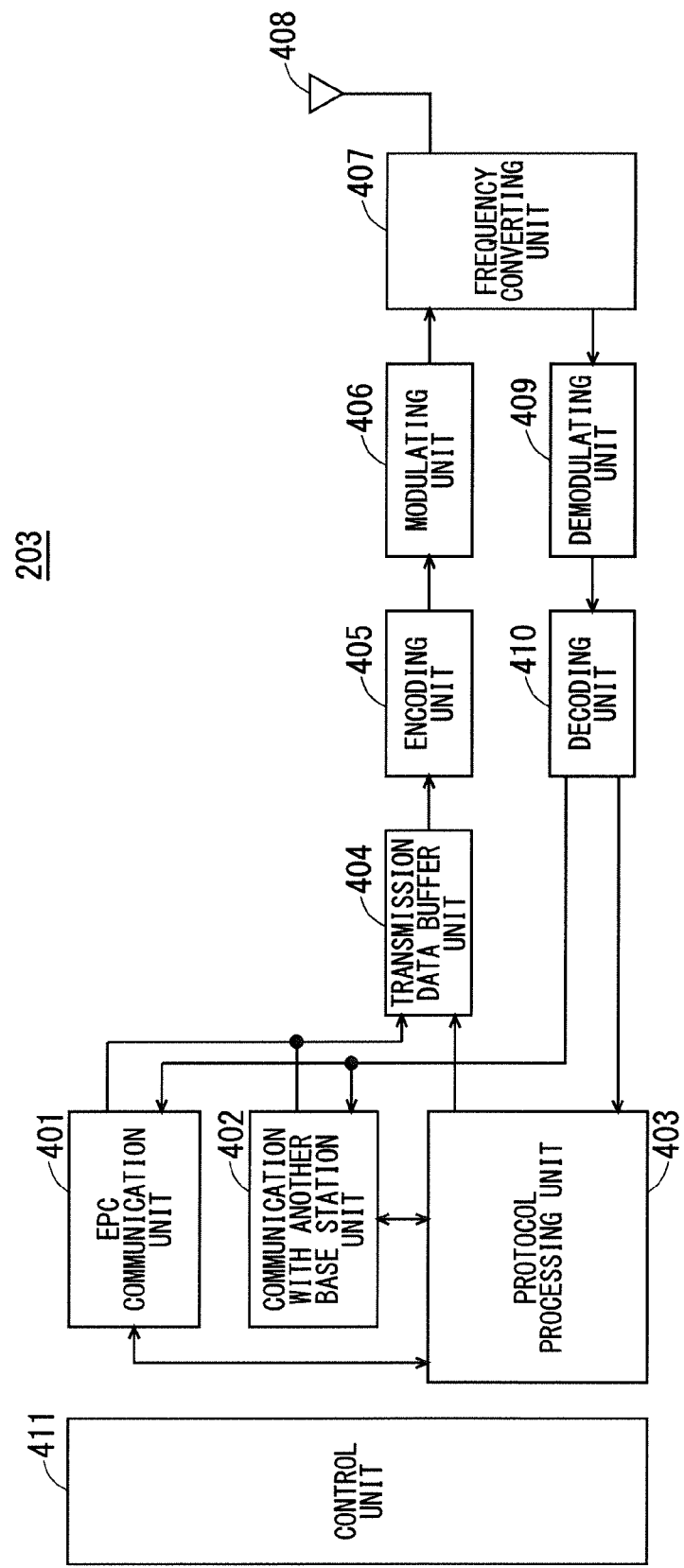
F I G. 4

F I G. 7
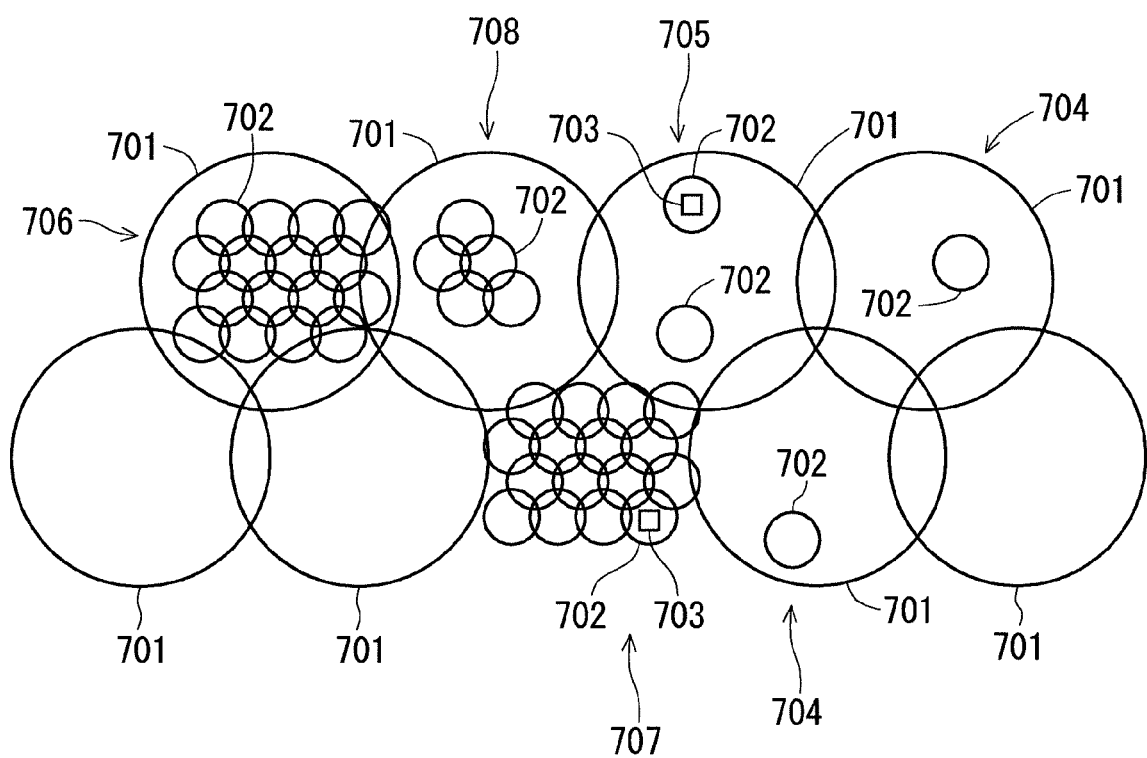

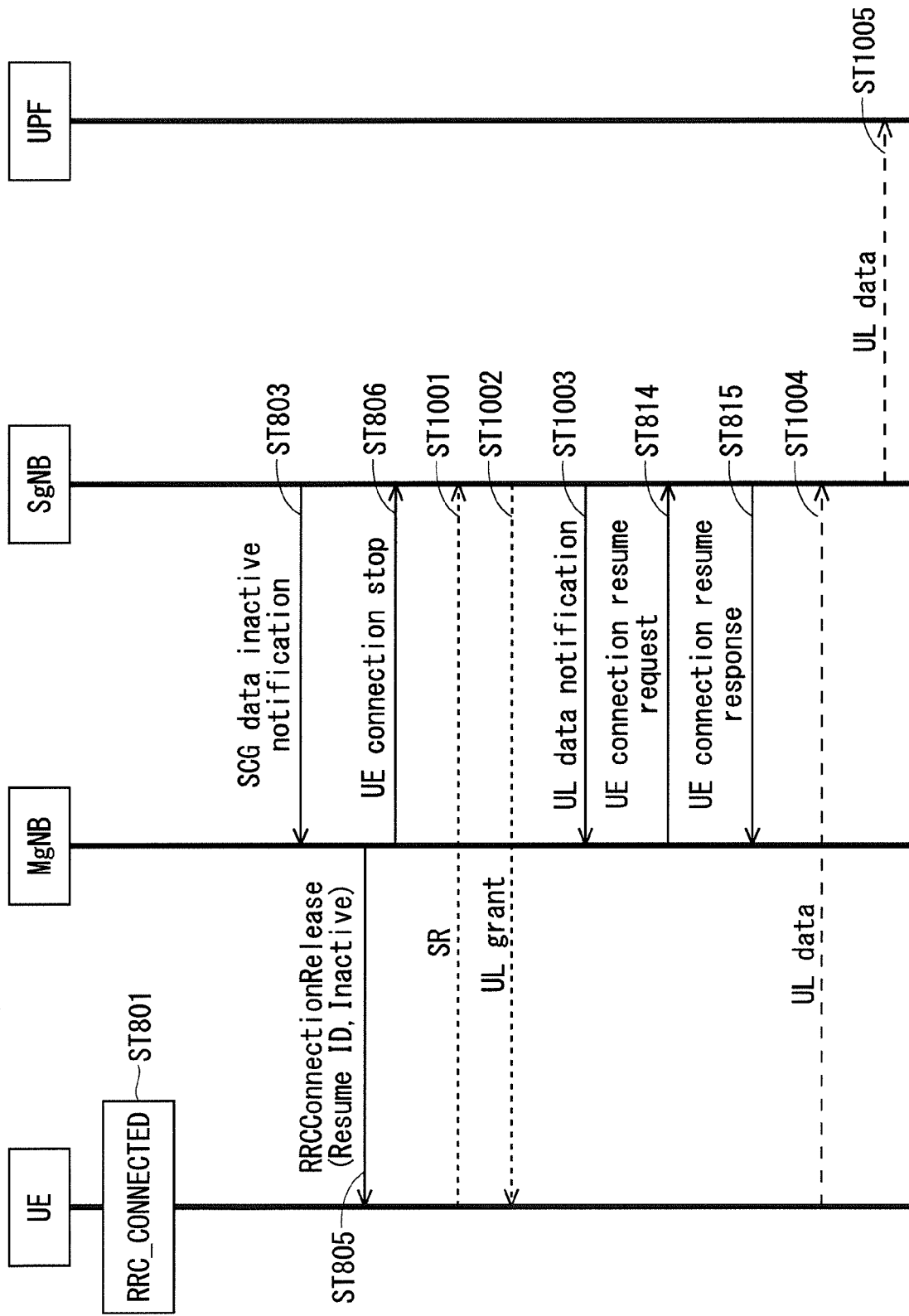

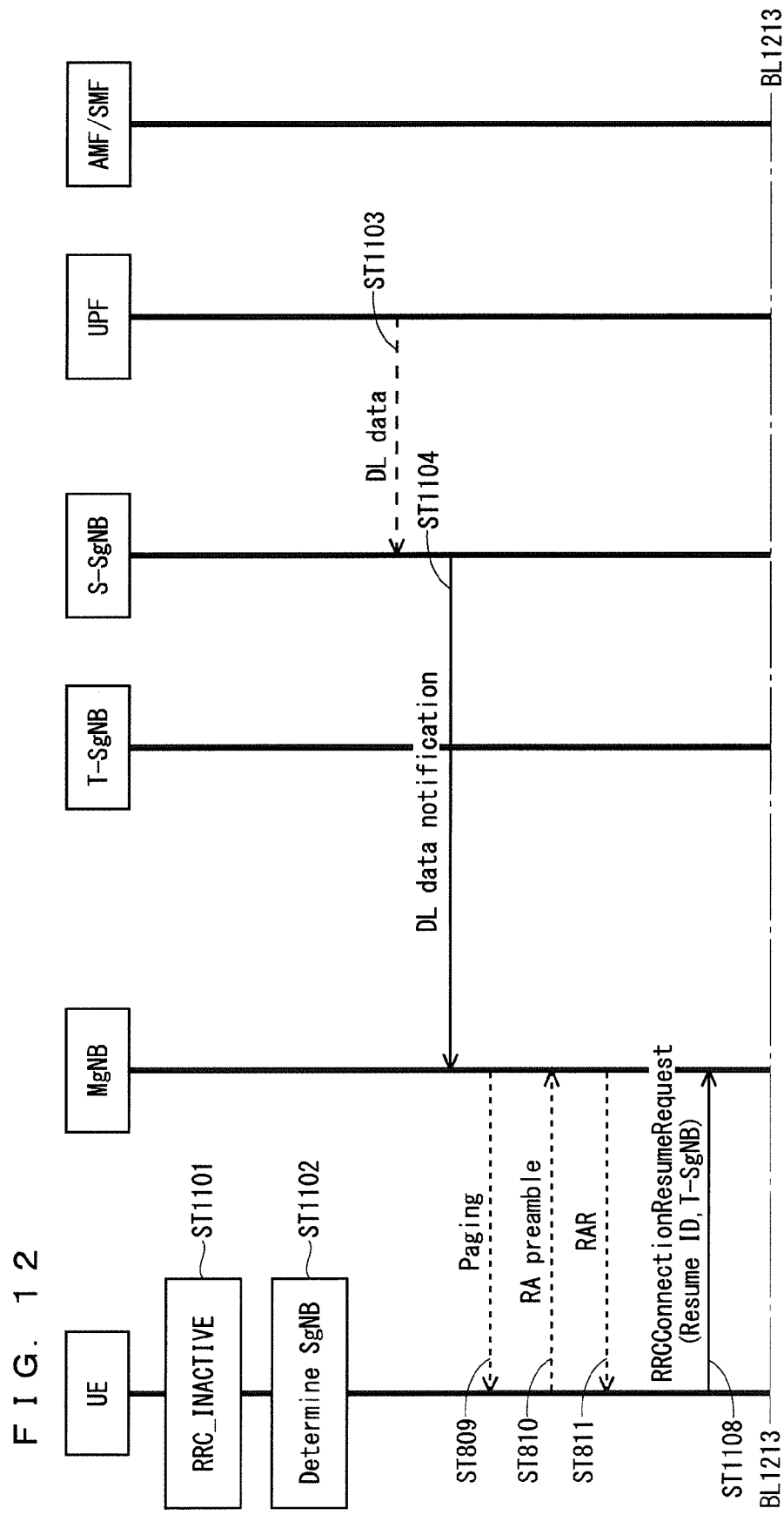
F I G. 1 2

FIG. 26
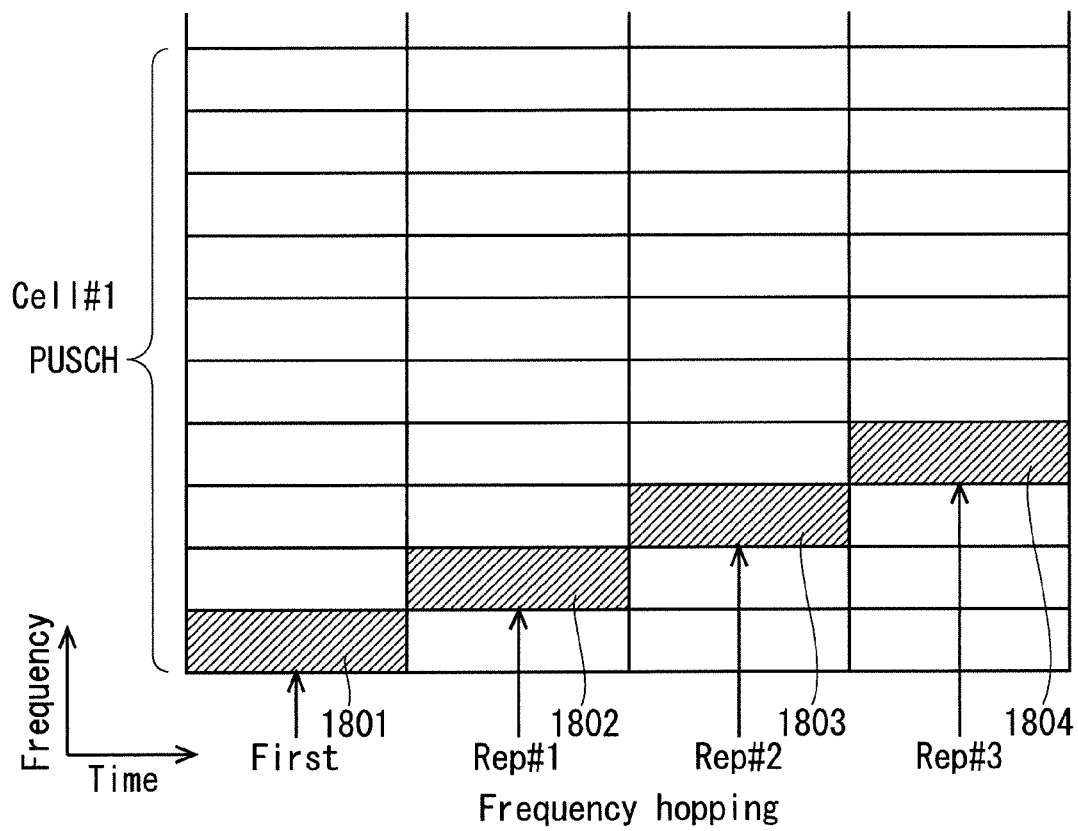
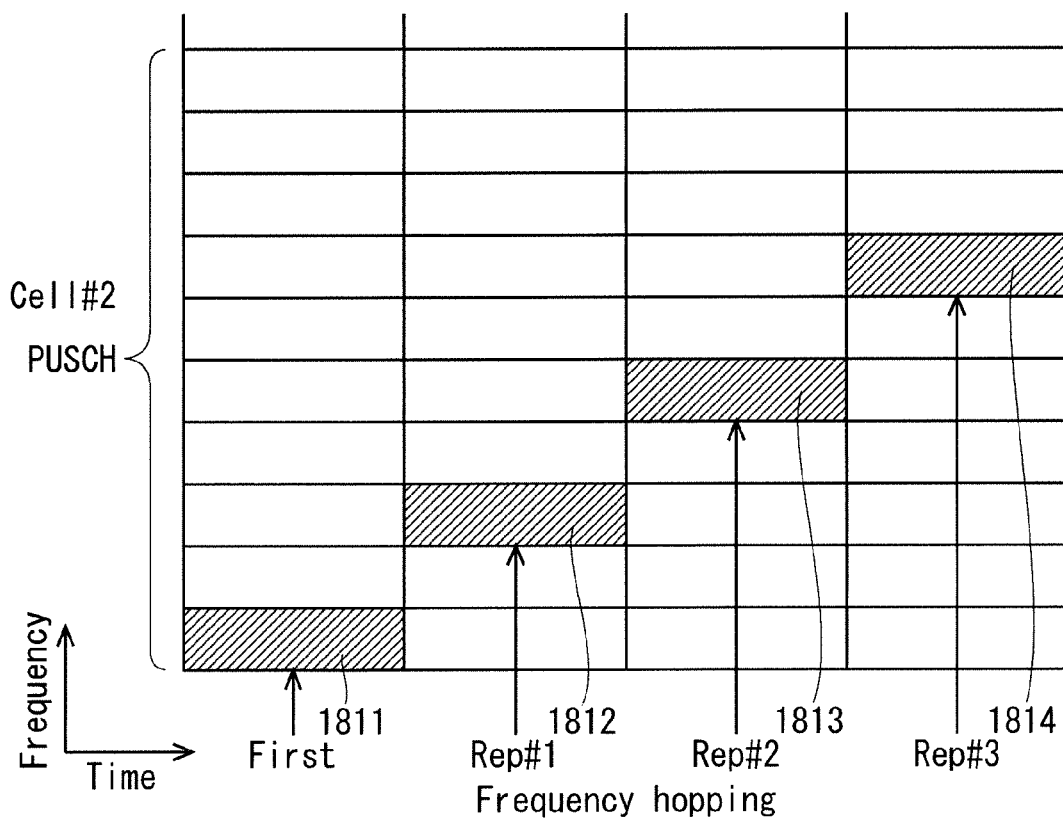

F I G. 2 7
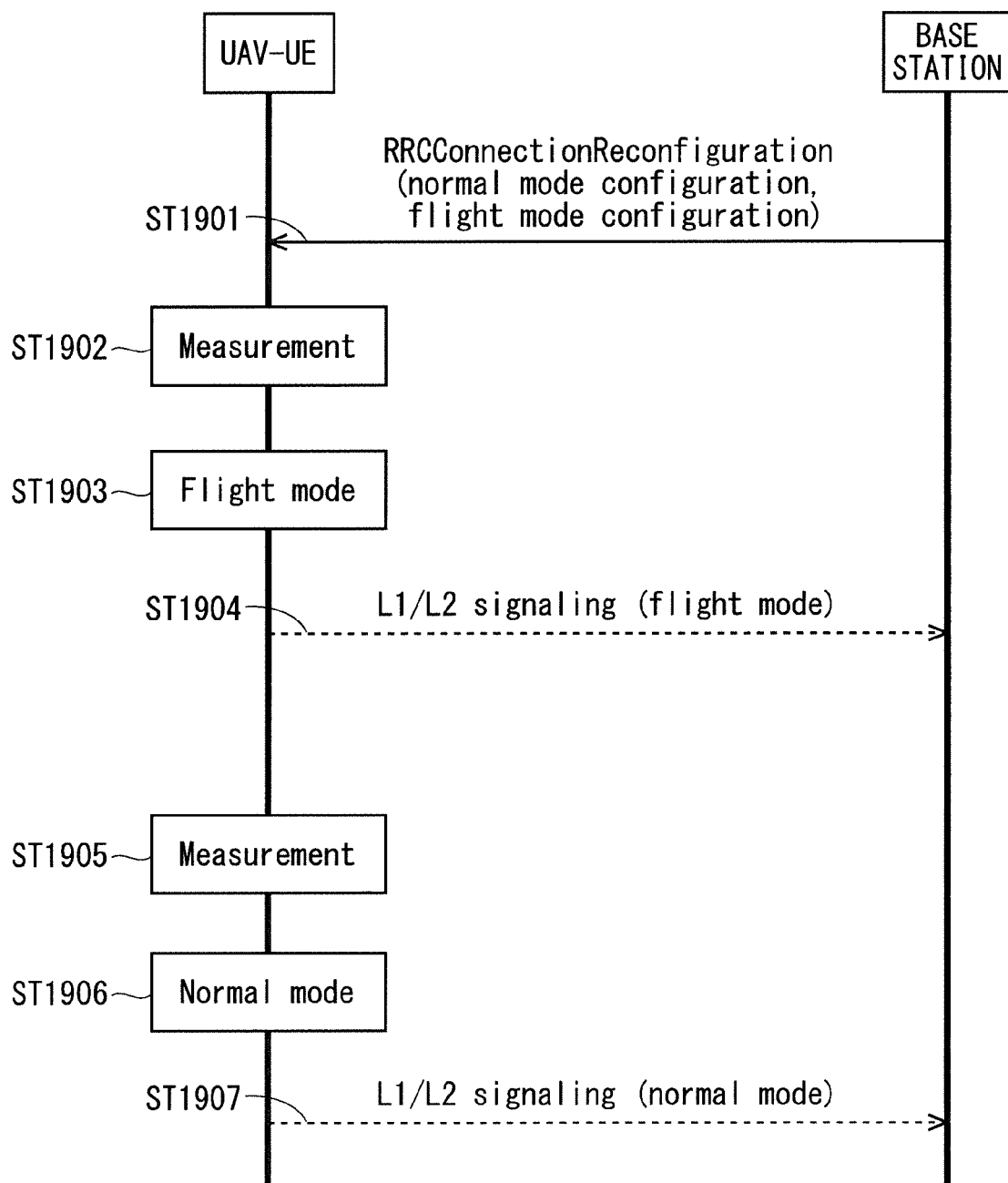

COMMUNICATION SYSTEM, BASE STATION DEVICE AND COMMUNICATION TERMINAL DEVICE

CROSS-REFERENCE TO RELATED APPLICATIONS

This application is a continuation application of U.S. application Ser. No. 16/641,124, filed Feb. 21, 2020, which is a National Stage Application of International Application No. PCT/JP2018/035876, filed Sep. 27, 2018, which is based upon and claims the benefit of priority from Japanese Patent Application No. 2017-186492, filed on Sep. 27, 2017, the entire contents of each of which are incorporated herein by reference.

TECHNICAL FIELD

The present invention relates to, for example, a communication system in which radio communication is performed between a communication terminal device such as a user equipment device and a base station device.

BACKGROUND ART

The 3rd generation partnership project (3GPP), the standard organization regarding the mobile communication system, is studying communication systems referred to as long term evolution (LTE) regarding radio sections and system architecture evolution (SAE) regarding the overall system configuration including a core network and a radio access network which is hereinafter collectively referred to as a network as well (for example, see Non-Patent Documents 1 to 5). This communication system is also referred to as 3.9 generation (3.9 G) system.

As the access scheme of the LTE, orthogonal frequency division multiplexing (OFDM) is used in a downlink direction and single carrier frequency division multiple access (SC-FDMA) is used in an uplink direction. Further, differently from the wideband code division multiple access (W-CDMA), circuit switching is not provided but a packet communication system is only provided in the LTE.

The decisions taken in 3GPP regarding the frame configuration in the LTE system described in Non-Patent Document 1 (Chapter 5) are described with reference to FIG. 1. FIG. 1 is a diagram illustrating the configuration of a radio frame used in the LTE communication system. With reference to FIG. 1, one radio frame is 10 ms. The radio frame is divided into ten equally sized subframes. The subframe is divided into two equally sized slots. The first and sixth subframes contain a downlink synchronization signal per radio frame. The synchronization signals are classified into a primary synchronization signal (P-SS) and a secondary synchronization signal (S-SS).

Non-Patent Document 1 (Chapter 5) describes the decisions by 3GPP regarding the channel configuration in the LTE system. It is assumed that the same channel configuration is used in a closed subscriber group (CSG) cell as that of a non-CSG cell.

A physical broadcast channel (PBCH) is a channel for downlink transmission from a base station device (hereinafter may be simply referred to as a "base station") to a communication terminal device (hereinafter may be simply referred to as a "communication terminal") such as a user equipment device (hereinafter may be simply referred to as a "user equipment"). A BCH transport block is mapped to four subframes within a 40 ms interval. There is no explicit signaling indicating 40 ms timing.

A physical control format indicator channel (PCFICH) is a channel for downlink transmission from a base station to a communication terminal. The PCFICH notifies the number of orthogonal frequency division multiplexing (OFDM) symbols used for PDCCHs from the base station to the communication terminal. The PCFICH is transmitted per subframe.

A physical downlink control channel (PDCCH) is a channel for downlink transmission from a base station to a communication terminal. The PDCCH notifies of the resource allocation information for downlink shared channel (DL-SCH) being one of the transport channels described below, resource allocation information for a paging channel (PCH) being one of the transport channels described below, and hybrid automatic repeat request (HARQ) information related to DL-SCH. The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) is a channel for downlink transmission from a base station to a communication terminal. A downlink shared channel (DL-SCH) that is a transport channel and a PCH that is a transport channel are mapped to the PDSCH.

A physical multicast channel (PMCH) is a channel for downlink transmission from a base station to a communication terminal. A multicast channel (MCH) that is a transport channel is mapped to the PMCH.

A physical uplink control channel (PUCCH) is a channel for uplink transmission from a communication terminal to a base station. The PUCCH carries Ack/Nack that is a response signal to downlink transmission. The PUCCH carries a channel quality indicator (CQI) report. The CQI is quality information indicating the quality of received data or channel quality. In addition, the PUCCH carries a scheduling request (SR).

A physical uplink shared channel (PUSCH) is a channel for uplink transmission from a communication terminal to a base station. An uplink shared channel (UL-SCH) that is one of the transport channels is mapped to the PUSCH.

A physical hybrid ARQ indicator channel (PHICH) is a channel for downlink transmission from a base station to a communication terminal. The PHICH carries Ack/Nack that is a response signal to uplink transmission. A physical random access channel (PRACH) is a channel for uplink transmission from the communication terminal to the base station. The PRACH carries a random access preamble.

A downlink reference signal (RS) is a known symbol in the LTE communication system. The following five types of downlink reference signals are defined as: a cell-specific reference signal (CRS), an MBSFN reference signal, a data demodulation reference signal (DM-RS) being a UE-specific reference signal, a positioning reference signal (PRS), and a channel state information reference signal (CSI-RS). The physical layer measurement objects of a communication terminal include reference signal received powers (RSRPs).

The transport channels described in Non-Patent Document 1 (Chapter 5) are described. A broadcast channel (BCH) among the downlink transport channels is broadcast to the entire coverage of a base station (cell). The BCH is mapped to the physical broadcast channel (PBCH).

Retransmission control according to a hybrid ARQ (HARQ) is applied to a downlink shared channel (DL-SCH). The DL-SCH can be broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a communication terminal for enabling the communication terminal to save power. The DL-SCH is mapped to the physical downlink shared channel (PDSCH).

The paging channel (PCH) supports DRX of the communication terminal for enabling the communication terminal to save power. The PCH is required to be broadcast to the entire coverage of the base station (cell). The PCH is mapped to physical resources such as the physical downlink shared channel (PDSCH) that can be used dynamically for traffic.

The multicast channel (MCH) is used for broadcasting the entire coverage of the base station (cell). The MCH supports SFN combining of multimedia broadcast multicast service (MBMS) services (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH) among the uplink transport channels. The UL-SCH supports dynamic or semi-static resource allocation. The UL-SCH is mapped to the physical uplink shared channel (PUSCH).

A random access channel (RACH) is limited to control information. The RACH involves a collision risk. The RACH is mapped to the physical random access channel (PRACH).

The HARQ is described. The HARQ is the technique for improving the communication quality of a channel by combination of automatic repeat request (ARQ) and error correction (forward error correction). The HARQ is advantageous in that error correction functions effectively by retransmission even for a channel whose communication quality changes. In particular, it is also possible to achieve further quality improvement in retransmission through combination of the reception results of the first transmission and the reception results of the retransmission.

An example of the retransmission method is described. If the receiver fails to successfully decode the received data, in other words, if a cyclic redundancy check (CRC) error occurs (CRC=NG), the receiver transmits "Nack" to the transmitter. The transmitter that has received "Nack" retransmits the data. If the receiver successfully decodes the received data, in other words, if a CRC error does not occur (CRC=OK), the receiver transmits "AcK" to the transmitter. The transmitter that has received "Ack" transmits the next data.

The logical channels described in Non-Patent Document 1 (Chapter 6) are described. A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging information and system information change notifications. The PCCH is used when the network does not know the cell location of a communication terminal. The PCCH that is a logical channel is mapped to the paging channel (PCH) that is a transport channel.

A common control channel (CCCH) is a channel for transmission control information between communication terminals and a base station. The CCCH is used in a case where the communication terminals have no RRC connection with the network. In the downlink direction, the CCCH is mapped to the downlink shared channel (DL-SCH) that is a transport channel. In the uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a communication terminal. The MCCH is used only by a communication terminal during reception of the MBMS. The MCCH is mapped to the multicast channel (MCH) that is a transport channel.

A dedicated control channel (DCCH) is a channel that transmits dedicated control information between a communication terminal and a network on a point-to-point basis. The DCCH is used when the communication terminal has an RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated communication terminal. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a communication terminal. The MTCH is a channel used only by a communication terminal during reception of the MBMS. The MTCH is mapped to the multicast channel (MCH).

CGI represents a cell global identifier. ECGI represents an E-UTRAN cell global identifier. A closed subscriber group (CSG) cell is introduced into the LTE, and the long term evolution advanced (LTE-A) and universal mobile telecommunication system (UMTS) described below.

The closed subscriber group (CSG) cell is a cell in which subscribers who are allowed to use are specified by an operator (hereinafter, also referred to as a "cell for specific subscribers"). The specified subscribers are allowed to access one or more cells of a public land mobile network (PLMN). One or more cells to which the specified subscribers are allowed access are referred to as "CSG cell(s)". Note that access is limited in the PLMN.

The CSG cell is part of the PLMN that broadcasts a specific CSG identity (CSG ID) and broadcasts "TRUE" in a CSG indication. The authorized members of the subscriber group who have registered in advance access the CSG cells using the CSG ID that is the access permission information.

The CSG ID is broadcast by the CSG cell or cells. A plurality of CSG IDs exist in the LTE communication system. The CSG IDs are used by communication terminals (UEs) for making access from CSG-related members easier.

The locations of communication terminals are tracked based on an area composed of one or more cells. The locations are tracked for enabling tracking the locations of communication terminals and calling communication terminals, in other words, incoming calling to communication terminals even in an idle state. An area for tracking locations of communication terminals is referred to as a tracking area.

In 3GPP, base stations referred to as Home-NodeB (Home-NB; HNB) and Home-eNodeB (Home-eNB; HeNB) are studied. HNB/HeNB is a base station for, for example, household, corporation, or commercial access service in UTRAN/E-UTRAN. Non-Patent Document 2 discloses three different modes of the access to the HeNB and HNB. Specifically, an open access mode, a closed access mode, and a hybrid access mode are disclosed.

Further, specifications of long term evolution advanced (LTE-A) are pursed as Release 10 in 3GPP (see Non-Patent Documents 3 and 4). The LTE-A is based on the LTE radio communication system and is configured by adding several new techniques to the system.

Carrier aggregation (CA) is studied for the LTE-A system in which two or more component carriers (CCs) are aggregated to support wider transmission bandwidths up to 100 MHz. Non-Patent Document 1 describes the CA.

In a case where CA is configured, a UE has a single RRC connection with a network (NW). In RRC connection, one serving cell provides NAS mobility information and security input. This cell is referred to as a primary cell (PCell). In downlink, a carrier corresponding to PCell is a downlink primary component carrier (DL PCC). In uplink, a carrier corresponding to PCell is an uplink primary component carrier (UL PCC).

A secondary cell (SCell) is configured to form a serving cell group with a PCell, in accordance with the UE capability. In downlink, a carrier corresponding to SCell is a downlink secondary component carrier (DL SCC). In uplink, a carrier corresponding to SCell is an uplink secondary component carrier (UL SCC).

A serving cell group of one PCell and one or more SCells is configured for one UE.

The new techniques in the LTE-A include the technique of supporting wider bands (wider bandwidth extension) and the coordinated multiple point transmission and reception (CoMP) technique. The CoMP studied for LTE-A in 3GPP is described in Non-Patent Document 1.

Furthermore, the use of small eNBs (hereinafter also referred to as "small-scale base station devices") configuring small cells is studied in 3GPP to satisfy tremendous traffic in the future. In an example technique under study, a large number of small eNBs is installed to configure a large number of small cells, which increases spectral efficiency and communication capacity. The specific techniques include dual connectivity (abbreviated as DC) with which a UE communicates with two eNBs through connection thereto. Non-Patent Document 1 describes the DC.

For eNBs that perform dual connectivity (DC), one may be referred to as a master eNB (abbreviated as MeNB), and the other may be referred to as a secondary eNB (abbreviated as SeNB).

The traffic flow of a mobile network is on the rise, and the communication rate is also increasing. It is expected that the communication rate is further increased when the operations of the LTE and the LTE-A are fully initiated.

For increasingly enhanced mobile communications, the fifth generation (hereinafter also referred to as "5G") radio access system is studied whose service is aimed to be launched in 2020 and afterward. For example, in the Europe, an organization named METIS summarizes the requirements for 5G (see Non-Patent Document 5).

The requirements in the 5G radio access system show that a system capacity shall be 1000 times as high as, a data transmission rate shall be 100 times as high as, a data latency shall be one tenth (1/10) as low as, and simultaneously connected communication terminals 100 times as many as those of the LTE system, to further reduce the power consumption and device cost.

To satisfy such requirements, the study of 5G standards is pursued as Release 15 in 3GPP (see Non-Patent Documents 6 to 10). The techniques on 5G radio sections are referred to as "New Radio Access Technology" ("New Radio" is abbreviated as NR), and the several new techniques are being studied (see Non-Patent Document 11). For example, inactivity control or the like in the UE using DC is studied. Further, extension of LTE standards is also being studied.

For example, power control in a UE mounted in an unmanned flying object is studied (see Non-Patent Documents 12 and 13).

PRIOR ART DOCUMENTS

Non-Patent Documents

Non-Patent Document 1: 3GPP TS 36.300 V14.3.0
Non-Patent Document 2: 3GPP S1-083461
Non-Patent Document 3: 3GPP TR 36.814 V9.2.0
Non-Patent Document 4: 3GPP TR 36.912 V14.0.0
Non-Patent Document 5: "Scenarios, requirements and KPIs for 5G mobile and wireless system", ICT-317669-METIS/D1.1
Non-Patent Document 6: 3GPP TR 23.799 V14.0.0
Non-Patent Document 7: 3GPP TR 38.801 V14.0.0
Non-Patent Document 8: 3GPP TR 38.802 V14.1.0
Non-Patent Document 9: 3GPP TR 38.804 V14.0.0
Non-Patent Document 10: 3GPP TR 38.912 V14.0.0
Non-Patent Document 11: 3GPP R2-1706892
Non-Patent Document 12: 3GPP RP-171050
Non-Patent Document 13: 3GPP R1-1708433

SUMMARY

Problem to be Solved by the Invention

In NR, as a technology for implementing power consumption reduction of a UE and prompt communication resumption, a control technology concerning an RRC_INACTIVE state is discussed. The RRC_INACTIVE state for a UE using DC configuration is also similarly discussed. An MgNB makes an inquiry to an SgNB about presence/absence of data, in order to check presence/absence of data to be transmitted and received between the MgNB and the SgNB. However, a bandwidth between the base stations is occupied by signaling for the inquiry between the MgNB and the SgNB. As a result, a communication rate between the base stations in DC is reduced, and therefore a communication rate among the MgNB, the SgNB, and the UE is reduced.

Further, a technology of reducing interference to a neighboring base station in communication with a UE mounted on an unmanned aerial vehicle (which may be hereinafter referred to as a UAV-UE) is under study. However, when transmission power from the UAV-UE is reduced in order to reduce interference to a neighboring base station, reception power in a serving cell is reduced, communication quality between the UAV-UE and the serving cell is deteriorated, and a communication rate is reduced.

In view of the above problems, the present invention has one object to provide a high-speed communication system etc. in NR and LTE.

Means to Solve the Problem

For example, the present invention provides a communication system including: a communication terminal device; and a plurality of base station devices configured to perform radio communication with the communication terminal device, wherein the plurality of base station devices include a master base station device and a secondary base station device that are configured to provide at least one bearer for the communication terminal device, when the secondary base station device detects a data inactive state for all the bearers, the secondary base station device notifies the master base station device of occurrence of the data inactive state regardless of absence of an inquiry from the master base station device, the data inactive state being a state in which downlink data for the communication terminal device is inactive, when the master base station device receives the notification about the occurrence of the data inactive state, the master base station device transmits a command to the communication terminal device to transition from an RRC_CONNECTED state to an RRC_INACTIVE state, and based on the command from the master base station device, the communication terminal device transitions to the RRC_INACTIVE state.

For example, the present invention provides a base station device configured to perform radio communication with a communication terminal device, wherein the base station device operates as a secondary base station device configuring at least one bearer for the communication terminal device with a master base station device, and when the base station device detects a data inactive state for all the bearers, the base station device notifies the master base station device of occurrence of the data inactive state regardless of absence of an inquiry from the master base station device, the data inactive state being a state in which downlink data for the communication terminal device is inactive.

For example, the present invention provides a base station device configured to perform radio communication with a communication terminal device, wherein the base station device operates as a master base station device configuring at least one bearer for the communication terminal device with a secondary base station device, when the secondary base station device detects a data inactive state for all the bearers, the secondary base station device notifies the base station device of occurrence of the data inactive state regardless of absence of an inquiry from the base station device, the data inactive state being a state in which downlink data for the communication terminal device is inactive, and when the base station device receives the notification about the occurrence of the data inactive state, the base station device transmits a command to the communication terminal device to transition from an RRC_CONNECTED state to an RRC_INACTIVE state.

For example, the present invention provides a communication terminal device configured to perform radio communication with a plurality of base station devices, wherein the plurality of base station devices include a master base station device and a secondary base station device that are configured to provide at least one bearer for the communication terminal device, when the secondary base station device detects a data inactive state for all the bearers, the secondary base station device notifies the master base station device of occurrence of the data inactive state regardless of absence of an inquiry from the master base station device, the data inactive state being a state in which downlink data for the communication terminal device is inactive, when the master base station device receives the notification about the occurrence of the data inactive state, the master base station device transmits a command to the communication terminal device to transition from an RRC_CONNECTED state to an RRC_INACTIVE state, and based on the command from the master base station device, the communication terminal device transitions to the RRC_INACTIVE state.

Effects of the Invention

According to the present invention, a high-speed communication system etc. can be provided in NR and LTE.

These objects, features, aspects and advantages of the present invention become more apparent from the following detailed description of the present invention when taken in conjunction with the accompanying drawings.

BRIEF DESCRIPTION OF DRAWINGS

FIG. 4 is a block diagram showing the configuration of a base station 203 shown in FIG. 2, which is a base station according to the present invention.

FIG. 7 shows the concept of a cell configuration when macro eNBs and small eNBs coexist.

FIG. 11 is a sequence diagram illustrating operation in which RRC_INACTIVE state transition of the UE is cancelled based on generation of uplink data, according to the first modification of the first embodiment.

FIG. 12 is a sequence diagram illustrating operation in which the UE in the RRC_INACTIVE state determines an SgNB, according to a second modification of the first embodiment.

FIG. 26 is a pattern diagram illustrating an example in which frequency hopping patterns different for each cell are given to a UAV-UE, according to a third embodiment.

FIG. 27 is a sequence diagram illustrating operation in which the UAV-UE determines a communication mode, according to a fifth embodiment.

DESCRIPTION OF EMBODIMENTS

First Embodiment

Figure 1:
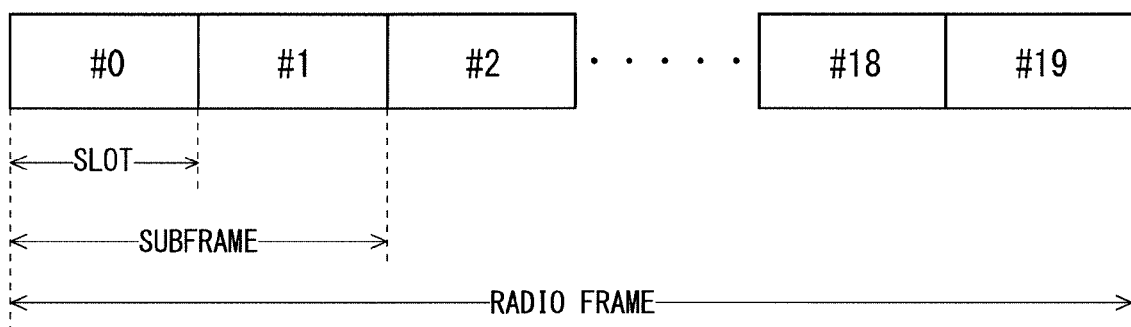
FIG. 1 is a diagram illustrating the configuration of a radio frame for use in an LTE communication system.
Figure 2:
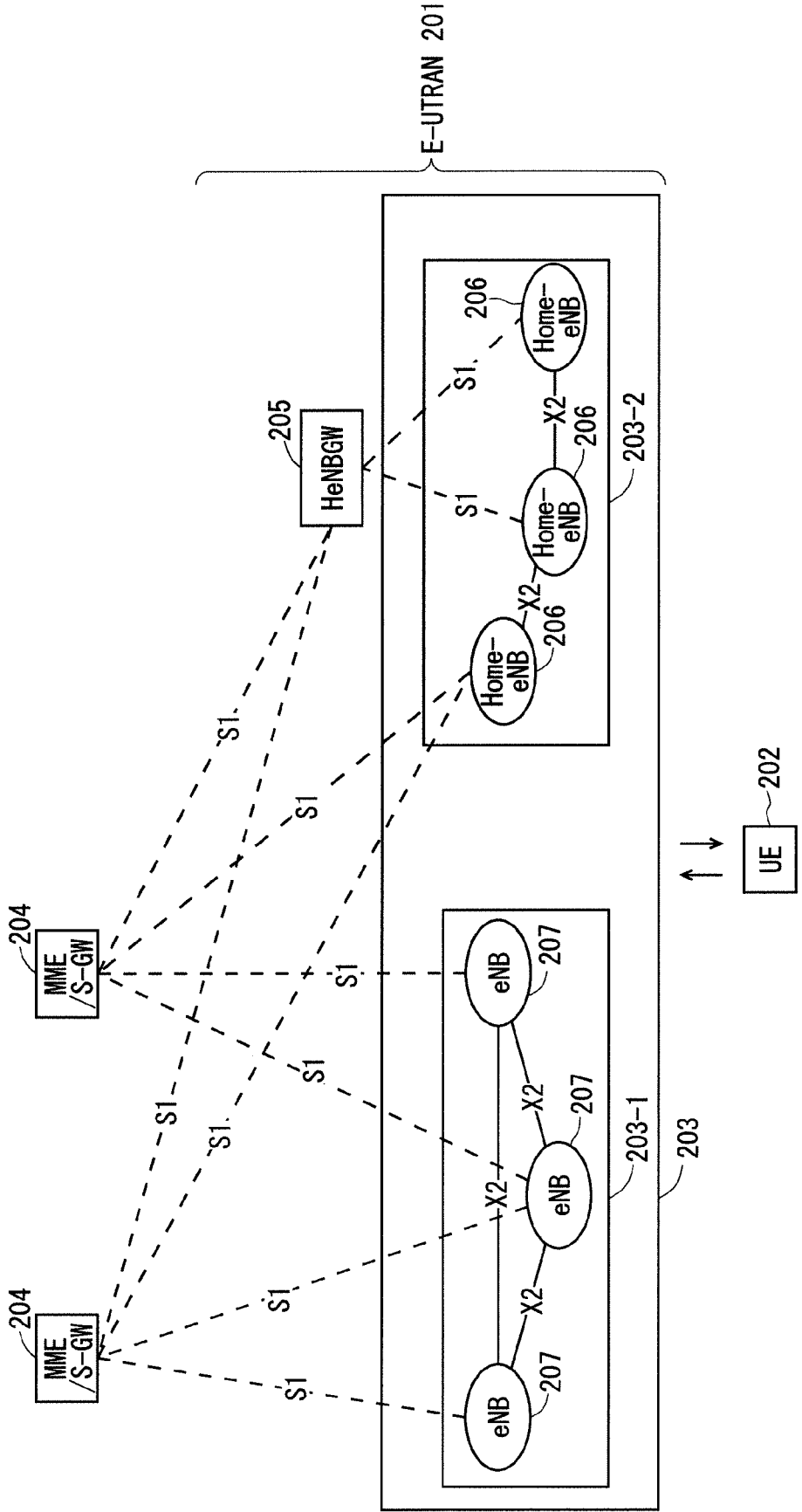
FIG. 2 is a block diagram showing the overall configuration of an LTE communication system 200 under discussion of 3GPP.

FIG. 2 is a block diagram showing an overall configuration of an LTE communication system 200 which is under discussion of 3GPP. FIG. 2 is described here. A radio access network is referred to as an evolved universal terrestrial radio access network (E-UTRAN) 201. A user equipment device (hereinafter, referred to as a "user equipment (UE)") 202 that is a communication terminal device is capable of radio communication with a base station device (hereinafter, referred to as a "base station (E-UTRAN Node B: eNB)") 203 and transmits and receives signals through radio communication.

Here, the "communication terminal device" covers not only a user equipment device such as a mobile phone terminal device, but also an unmovable device such as a sensor. In the following description, the "communication terminal device" may be simply referred to as a "communication terminal".

The E-UTRAN is composed of one or a plurality of base stations 203, provided that a control protocol for the user equipment 202 such as a radio resource control (RRC), and user planes (hereinafter also referred to as "U-planes") such as a packet data convergence protocol (PDCP), radio link control (RLC), medium access control (MAC), or physical layer (PHY) are terminated in the base station 203.

The control protocol radio resource control (RRC) between the user equipment 202 and the base station 203 performs, for example, broadcast, paging, RRC connection management. The states of the base station 203 and the user equipment 202 in RRC are classified into RRC_IDLE and RRC_CONNECTED.

In RRC_IDLE, public land mobile network (PLMN) selection, system information (SI) broadcast, paging, cell re-selection, mobility and others are performed. In RRC_CONNECTED, the user equipment has RRC connection and is capable of transmitting and receiving data to and from a network. In RRC_CONNECTED, for example, handover (HO) and measurement of a neighbor cell are performed.

The base stations 203 are classified into eNBs 207 and Home-eNBs 206. The communication system 200 is equipped with an eNB group 203-1 including a plurality of eNBs 207 and a Home-eNB group 203-2 including a plurality of Home-eNBs 206. A system, composed of an evolved packet core (EPC) being a core network and an E-UTRAN 201 being a radio access network, is referred to as an evolved packet system (EPS). The EPC being a core network and the E-UTRAN 201 being a radio access network may be collectively referred to as a "network".

The eNB 207 is connected to an MME/S-GW unit (hereinafter, also referred to as an "MME unit") 204 including a mobility management entity (MME), a serving gateway (S-GW), or an MME and an S-GW by means of an S1 interface, and control information is communicated between the eNB 207 and the MME unit 204. A plurality of MME units 204 may be connected to one eNB 207. The eNBs 207 are connected to each other by means of an X2 interface, and control information is communicated between the eNBs 207.

The Home-eNB 206 is connected to the MME unit 204 by means of an S1 interface, and control information is communicated between the Home-eNB 206 and the MME unit 204. A plurality of Home-eNBs 206 are connected to one MME unit 204. Alternatively, the Home-eNBs 206 are connected to the MME units 204 through a Home-eNB gateway (HeNBGW) 205. The Home-eNB 206 is connected to the HeNBGW 205 by means of an S1 interface, and the HeNBGW 205 is connected to the MME unit 204 by means of an S1 interface.

One or a plurality of Home-eNBs 206 are connected to one HeNBGW 205, and information is communicated therebetween through an S1 interface. The HeNBGW 205 is connected to one or a plurality of MME units 204, and information is communicated therebetween through an S1 interface.

The MME units 204 and HeNBGW 205 are entities of higher layer, specifically, higher nodes, and control the connections between the user equipment (UE) 202 and the eNB 207 and the Home-eNB 206 being base stations. The MME units 204 configure an EPC being a core network. The base station 203 and the HeNBGW 205 configure the E-UTRAN 201.

Further, the configuration below is studied in 3GPP. The X2 interface between the Home-eNBs 206 is supported. In other words, the Home-eNBs 206 are connected to each other by means of an X2 interface, and control information is communicated between the Home-eNBs 206. The HeNBGW 205 appears to the MME unit 204 as the Home-eNB 206. The HeNBGW 205 appears to the Home-eNB 206 as the MME unit 204.

The interfaces between the Home-eNBs 206 and the MME units 204 are the same, which are the S1 interfaces, in both cases where the Home-eNB 206 is connected to the MME unit 204 through the HeNBGW 205 and it is directly connected to the MME unit 204.

The base station device 203 may configure a single cell or a plurality of cells. Each cell has a range predetermined as a coverage in which the cell can communicate with the user equipment 202 and performs radio communication with the user equipment 202 within the coverage. In a case where one base station device 203 configures a plurality of cells, every cell is configured so as to communicate with the user equipment 202.

Figure 3:
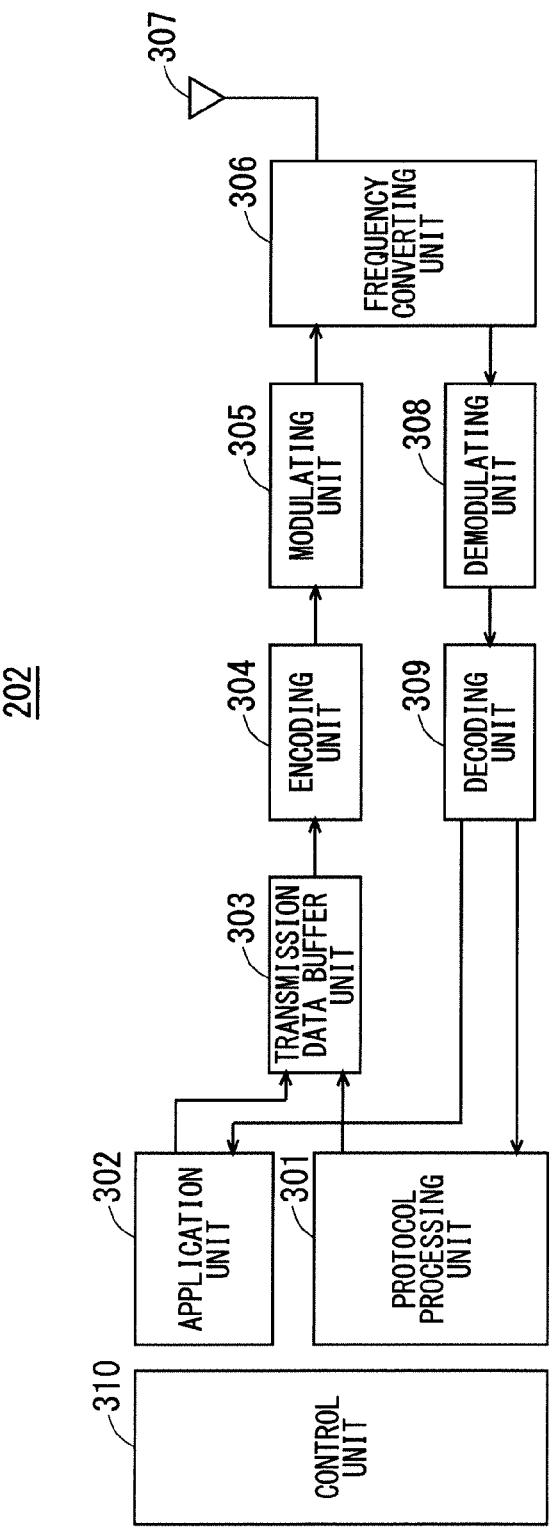
FIG. 3 is a block diagram showing the configuration of a user equipment 202 shown in FIG. 2, which is a communication terminal according to the present invention.

FIG. 3 is a block diagram showing the configuration of the user equipment 202 of FIG. 2 that is a communication terminal according to the present invention. The transmission process of the user equipment 202 shown in FIG. 3 is described. First, a transmission data buffer unit 303 stores the control data from a protocol processing unit 301 and the user data from an application unit 302. The data stored in the transmission data buffer unit 303 is passed to an encoding unit 304, and is subjected to an encoding process such as error correction. There may exist the data output from the transmission data buffer unit 303 directly to a modulating unit 305 without the encoding process. The data encoded by the encoding unit 304 is modulated by the modulating unit 305. The modulated data is converted into a baseband signal, and the baseband signal is output to a frequency converting unit 306 and is then converted into a radio transmission frequency. After that, a transmission signal is transmitted from an antenna 307 to the base station 203.

The user equipment 202 executes the reception process as follows. The radio signal from the base station 203 is received through the antenna 307. The received signal is converted from a radio reception frequency into a baseband signal by the frequency converting unit 306 and is then demodulated by a demodulating unit 308. The demodulated data is passed to a decoding unit 309, and is subjected to a decoding process such as error correction. Among the pieces of decoded data, the control data is passed to the protocol processing unit 301, and the user data is passed to the application unit 302. A series of processes by the user equipment 202 is controlled by a control unit 310. This means that, though not shown in FIG. 3, the control unit 310 is connected to the individual units 301 to 309.

FIG. 4 is a block diagram showing the configuration of the base station 203 of FIG. 2 that is a base station according to the present invention. The transmission process of the base station 203 shown in FIG. 4 is described. An EPC communication unit 401 performs data transmission and reception between the base station 203 and the EPC (such as the MME unit 204), HeNBGW 205 and others. A communication with another base station unit 402 performs data transmission and reception to and from another base station. The EPC communication unit 401 and the communication with another base station unit 402 each transmit and receive information to and from a protocol processing unit 403. The control data from the protocol processing unit 403, and the user data and the control data from the EPC communication unit 401 and the communication with another base station unit 402 are stored in a transmission data buffer unit 404.

The data stored in the transmission data buffer unit 404 is passed to an encoding unit 405, and then an encoding process such as error correction is performed for the data. There may exist the data output from the transmission data buffer unit 404 directly to a modulating unit 406 without the encoding process. The encoded data is modulated by the modulating unit 406. The modulated data is converted into a baseband signal, and the baseband signal is output to a frequency converting unit 407 and is then converted into a radio transmission frequency. After that, a transmission signal is transmitted from an antenna 408 to one or a plurality of user equipments 202.

The reception process of the base station 203 is executed as follows. A radio signal from one or a plurality of user equipments 202 is received through the antenna 408. The received signal is converted from a radio reception frequency into a baseband signal by the frequency converting unit 407, and is then demodulated by a demodulating unit 409. The demodulated data is passed to a decoding unit 410 and then subjected to a decoding process such as error correction. Among the pieces of decoded data, the control data is passed to the protocol processing unit 403, the EPC communication unit 401, or the communication with another base station unit 402, and the user data is passed to the EPC communication unit 401 and the communication with another base station unit 402. A series of processes by the base station 203 is controlled by a control unit 411. This means that, though not shown in FIG. 4, the control unit 411 is connected to the individual units 401 to 410.

Figure 5:
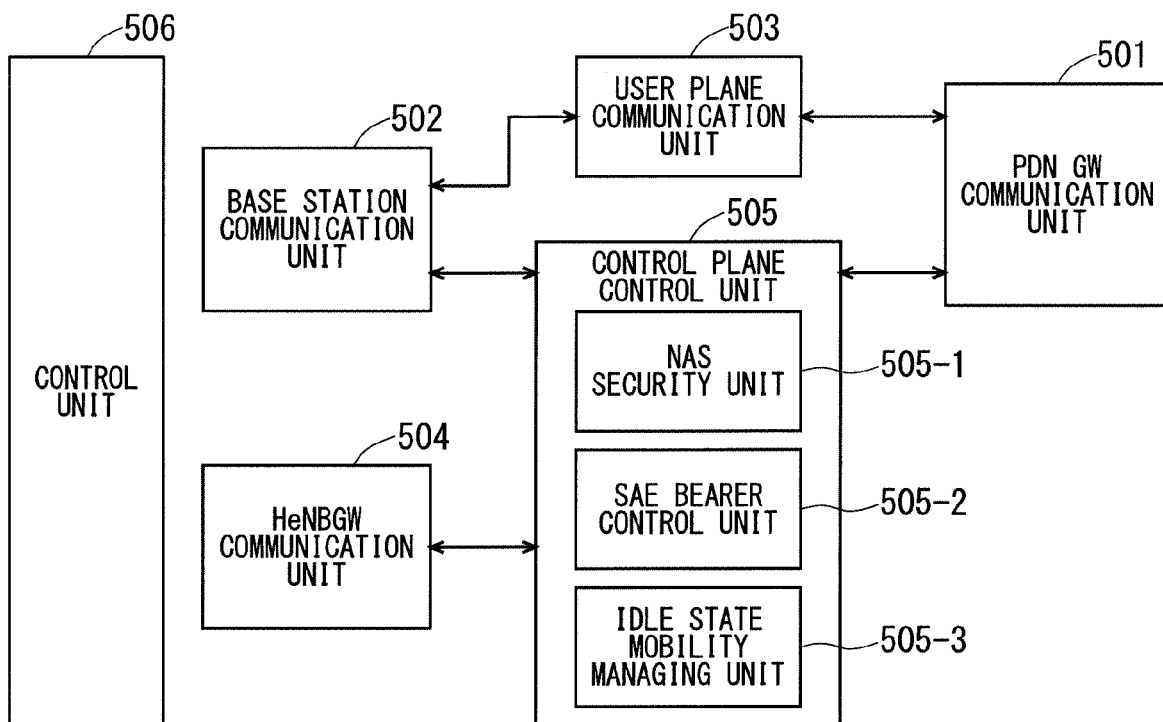
FIG. 5 is a block diagram showing the configuration of an MME according to the present invention.

FIG. 5 is a block diagram showing the configuration of the MME according to the present invention. FIG. 5 shows the configuration of an MME 204*a* included in the MME unit 204 shown in FIG. 2 described above. A PDN GW communication unit 501 performs data transmission and reception between the MME 204*a* and the PDN GW. A base station communication unit 502 performs data transmission and reception between the MME 204*a* and the base station 203 by means of the S1 interface. In a case where the data received from the PDN GW is user data, the user data is passed from the PDN GW communication unit 501 to the base station communication unit 502 via a user plane communication unit 503 and is then transmitted to one or a plurality of base stations 203. In a case where the data received from the base station 203 is user data, the user data is passed from the base station communication unit 502 to the PDN GW communication unit 501 via the user plane communication unit 503 and is then transmitted to the PDN GW.

In a case where the data received from the PDN GW is control data, the control data is passed from the PDN GW communication unit 501 to a control plane control unit 505. In a case where the data received from the base station 203 is control data, the control data is passed from the base station communication unit 502 to the control plane control unit 505.

A HeNBGW communication unit 504 is provided in a case where the HeNBGW 205 is provided, which performs data transmission and reception between the MME 204*a* and the HeNBGW 205 by means of the interface (IF) according to an information type. The control data received from the HeNBGW communication unit 504 is passed from the HeNBGW communication unit 504 to the control plane control unit 505. The processing results of the control plane control unit 505 are transmitted to the PDN GW via the PDN GW communication unit 501. The processing results of the control plane control unit 505 are transmitted to one or a plurality of base stations 203 by means of the S1 interface via the base station communication unit 502, and are transmitted to one or a plurality of HeNBGWs 205 via the HeNBGW communication unit 504.

The control plane control unit 505 includes a NAS security unit 505-1, an SAE bearer control unit 505-2, and an idle state mobility managing unit 505-3, and performs an overall process for the control plane (hereinafter also referred to as a "C-plane"). The NAS security unit 505-1 provides, for example, security of a non-access stratum (NAS) message. The SAE bearer control unit 505-2 manages, for example, a system architecture evolution (SAE) bearer. The idle state mobility managing unit 505-3 performs, for example, mobility management of an idle state (LTE-IDLE state which is merely referred to as idle as well), generation and control of a paging signal in the idle state, addition, deletion, update, and search of a tracking area of one or a plurality of user equipments 202 being served thereby, and tracking area list management.

The MME 204a distributes a paging signal to one or a plurality of base stations 203. In addition, the MME 204a performs mobility control of an idle state. When the user equipment is in the idle state and an active state, the MME 204a manages a list of tracking areas. The MME 204a begins a paging protocol by transmitting a paging message to the cell belonging to a tracking area in which the UE is registered. The idle state mobility managing unit 505-3 may manage the CSG of the Home-eNBs 206 to be connected to the MME 204a, CSG IDs, and a whitelist.

Figure 6:
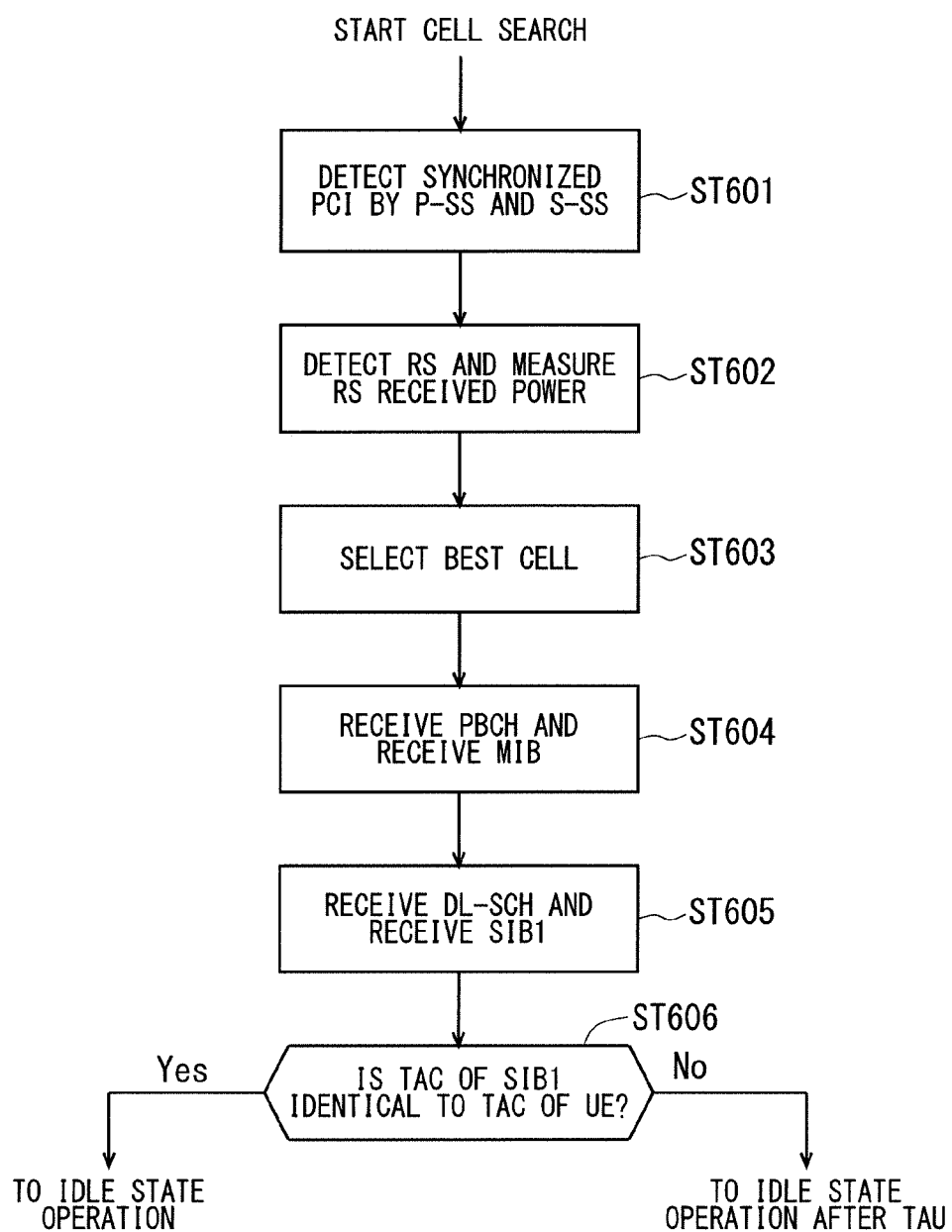
FIG. 6 is a flowchart showing an outline from a cell search to an idle state operation performed by a communication terminal (UE) in the LTE communication system.

An example of a cell search method in a mobile communication system is described next. FIG. 6 is a flowchart showing an outline from a cell search to an idle state operation performed by a communication terminal (UE) in the LTE communication system. When starting a cell search, in Step ST601, the communication terminal synchronizes slot timing and frame timing by a primary synchronization signal (P-SS) and a secondary synchronization signal (S-SS) transmitted from a neighbor base station.

The P-SS and S-SS are collectively referred to as a synchronization signal (SS). Synchronization codes, which correspond one-to-one to PCIs assigned per cell, are assigned to the synchronization signals (SSs). The number of PCIs is currently studied in 504 ways. The 504 ways of PCIs are used for synchronization, and the PCIs of the synchronized cells are detected (specified).

In Step ST602, next, the user equipment detects a cell-specific reference signal (CRS) being a reference signal (RS) transmitted from the base station per cell and measures the reference signal received power (RSRP). The codes corresponding one-to-one to the PCIs are used for the reference signal RS. Separation from another cell is enabled by correlation using the code. The code for RS of the cell is calculated from the PCI specified in Step ST601, so that the RS can be detected and the RS received power can be measured.

In Step ST603, next, the user equipment selects the cell having the best RS received quality, for example, the cell having the highest RS received power, that is, the best cell, from one or more cells that have been detected up to Step ST602.

In Step ST604, next, the user equipment receives the PBCH of the best cell and obtains the BCCH that is the broadcast information. A master information block (MIB) containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as a transmission bandwidth configuration (dl-bandwidth)), the number of transmission antennas, and a system frame number (SFN).

In Step ST605, next, the user equipment receives the DL-SCH of the cell based on the cell configuration information of the MIB, to thereby obtain a system information block (SIB) 1 of the broadcast information BCCH. The SIB1 contains the information about the access to the cell, information about cell selection, and scheduling information on another SIB (SIBk; k is an integer equal to or greater than two). In addition, the SIB1 contains a tracking area code (TAC).

In Step ST606, next, the communication terminal compares the TAC of the SIB1 received in Step ST605 with the TAC portion of a tracking area identity (TAI) in the tracking area list that has already been possessed by the communication terminal. The tracking area list is also referred to as a TAI list. TAI is the identification information for identifying tracking areas and is composed of a mobile country code (MCC), a mobile network code (MNC), and a tracking area code (TAC). MCC is a country code. MNC is a network code. TAC is the code number of a tracking area.

If the result of the comparison of Step ST606 shows that the TAC received in Step ST605 is identical to the TAC included in the tracking area list, the user equipment enters an idle state operation in the cell. If the comparison shows that the TAC received in Step ST605 is not included in the tracking area list, the communication terminal requires a core network (EPC) including, for example, MME to change a tracking area through the cell for performing tracking area update (TAU).

The device configuring a core network (hereinafter, also referred to as a "core-network-side device") updates the tracking area list based on an identification number (such as UE-ID) of a communication terminal transmitted from the communication terminal together with a TAU request signal. The core-network-side device transmits the updated tracking area list to the communication terminal. The communication terminal rewrites (updates) the TAC list of the communication terminal based on the received tracking area list. After that, the communication terminal enters the idle state operation in the cell.

Widespread use of smartphones and tablet terminal devices explosively increases traffic in cellular radio communications, causing a fear of insufficient radio resources all over the world. To increase spectral efficiency, thus, it is studied to downsize cells for further spatial separation.

In the conventional configuration of cells, the cell configured by an eNB has a relatively-wide-range coverage. Conventionally, cells are configured such that relatively-wide-range coverages of a plurality of cells configured by a plurality of macro eNBs cover a certain area.

When cells are downsized, the cell configured by an eNB has a narrow-range coverage compared with the coverage of a cell configured by a conventional eNB. Thus, in order to cover a certain area as in the conventional case, a larger number of downsized eNBs than the conventional eNBs are required.

In the description below, a "macro cell" refers to a cell having a relatively wide coverage, such as a cell configured by a conventional eNB, and a "macro eNB" refers to an eNB configuring a macro cell. A "small cell" refers to a cell having a relatively narrow coverage, such as a downsized cell, and a "small eNB" refers to an eNB configuring a small cell.

The macro eNB may be, for example, a "wide area base station" described in Non-Patent Document 7.

The small eNB may be, for example, a low power node, local area node, or hotspot. Alternatively, the small eNB may be a pico eNB configuring a pico cell, a femto eNB configuring a femto cell, HeNB, remote radio head (RRH), remote radio unit (RRU), remote radio equipment (RRE), or relay node (RN). Still alternatively, the small eNB may be a "local area base station" or "home base station" described in Non-Patent Document 7.

FIG. 7 shows the concept of the cell configuration in which macro eNBs and small eNBs coexist. The macro cell configured by a macro eNB has a relatively-wide-range coverage 701. A small cell configured by a small eNB has a coverage 702 whose range is narrower than that of the coverage 701 of a macro eNB (macro cell).

When a plurality of eNBs coexist, the coverage of the cell configured by an eNB may be included in the coverage of the cell configured by another eNB. In the cell configuration shown in FIG. 7, as indicated by a reference "704" or "705", the coverage 702 of the small cell configured by a small eNB may be included in the coverage 701 of the macro cell configured by a macro eNB.

As indicated by the reference "705", the coverages 702 of a plurality of, for example, two small cells may be included in the coverage 701 of one macro cell. A user equipment (UE) 703 is included in, for example, the coverage 702 of the small cell and performs communication via the small cell.

In the cell configuration shown in FIG. 7, as indicated by a reference "706", the coverage 701 of the macro cell configured by a macro eNB may overlap the coverages 702 of the small cells configured by small eNBs in a complicated manner.

As indicated by a reference "707", the coverage 701 of the macro cell configured by a macro eNB need not overlap the coverages 702 of the small cells configured by small eNBs.

Further, as indicated by a reference "708", the coverages 702 of a large number of small cells configured by a large number of small eNBs may be configured in the coverage 701 of one macro cell configured by one macro eNB.

In NR, the UE receives a command from the base station, and transitions to an RRC_INACTIVE state. To the UE using DC configuration, an MgNB issues a command to transition to the RRC_INACTIVE state. The MgNB makes an inquiry to an SgNB about whether data passing through an SCG bearer and an SCG split bearer is inactive, i.e., whether data passing through the bearers is not conducted. The SgNB transmits a notification of an inactivity state of the data passing through all of the SCG bearer and the SCG split bearer used by the UE. Based on the notification, the MgNB issues a command to the UE to transition to the RRC_INACTIVE state. In this manner, the MgNB can cause the UE to transition to the RRC_INACTIVE state, after correctly reflecting the inactive state of the data passing through the SCG bearer/SCG split bearer.

Further, the base station transmits paging to the UE in the RRC_INACTIVE state. To the UE having DC configuration and being in the RRC_INACTIVE state, the MgNB transmits paging. The SgNB notifies the MgNB of generation of data passing through the SCG bearer and/or the SCG split bearer. The UE transmits a request for RRC connection resume to the MgNB. The MgNB issues a command of RRC connection resume to the UE. Further, the MgNB transmits, to the SgNB, a request for RRC connection resume with the UE. The SgNB notifies the MgNB of a response to RRC connection resume with the UE. In this manner, the MgNB can cause the UE to restore to RRC_CONNECTED from the RRC_INACTIVE state that is caused due to generation of data passing through the SCG bearer and/or the SCG split bearer.

When the above method is employed, the following problems occur. For example, when data using the SCG bearer and/or the SCG split bearer is continuously conducted, the SgNB notifies the MgNB that the data passing through the bearer(s) is activated, in response to the inquiry made to the SgNB by the MgNB. Therefore, the MgNB cannot cause the UE to transition to the RRC_INACTIVE state. Because the MgNB checks a conduction state of the data using the bearer(s) at required times and appropriately performs UE state management, the inquiry needs to be repeatedly transmitted to the SgNB. Further, the state notification is repeatedly performed from the SgNB to the MgNB. As a result, the signaling amount of an interface between the base stations is increased, and the processing amount of the MgNB and the SgNB is increased.

Solutions to the above problems are disclosed below.

The SgNB notifies, during communication between the SgNB and a connected UE, that data passing through the SgNB is inactive. The data passing through the SgNB may be data using the SCG bearer, data passing through the SCG split bearer, or data passing through the MCG split bearer. The transmission of the notification may be performed when the data satisfies an inactive condition. The transmission of the notification may be performed either only once or a plurality of times. For example, the SgNB may transmit the notification a plurality of times, during transition between a case where the data satisfies the inactive condition and a case where the data does not satisfy the inactive condition. As another example, the SgNB may periodically transmit the notification.

The MgNB need not make an inquiry to the SgNB about whether data passing through the SgNB is inactive. In this manner, for example, the signaling amount of an interface between the base stations can be reduced.

The MgNB may notify the SgNB of a command to start evaluation of inactivity of data passing through the SgNB. Based on the command, the SgNB may start evaluation of inactivity of data passing through the SgNB. As another example, the MgNB need not notify the SgNB of the command to start the evaluation. The SgNB may automatically start the evaluation. For example, the SgNB may start the evaluation when the DC configuration is established. In this manner, for example, the signaling amount of an interface between the base stations can be reduced.

A determination condition for determining, by the SgNB, whether data passing through the SgNB is inactive may be defined in a standard in advance.

As another example, a higher NW device may determine the determination condition, and may notify a gNB served by the higher NW device of the determination condition. For example, the above higher NW device may be an Access and Mobility Management Function (AMF), or may be a Session Management Function (SMF). The determination condition may be different for each UE, or may be different for each gNB. This enables flexible configuration for each UE, or for each gNB.

The higher NW device may notify the MgNB of the determination condition determined by the higher NW device. The MgNB may notify the SgNB of the determination condition. As another example, the higher NW device may determine the determination condition, and may notify a gNB served by the higher NW device of the determination condition. The higher NW device can notify only the MgNB and the SgNB of the determination condition, and therefore the signaling amount between the higher NW device and the base station can be reduced.

As another example, the MgNB may determine the determination condition. The MgNB may notify a secondary base station of the determined determination condition. The determination of the determination condition and/or the notification of the determination condition to the SgNB performed by the MgNB may be employed when the MgNB makes the above inquiry to the SgNB, or may be employed when the MgNB does not make the above inquiry. The determination condition may be included in signaling in a sequence of establishing DC with the SgNB, or may be included in the inquiry made by the MgNB to the SgNB about whether data passing through the SCG bearer and the SCG split bearer is inactive. The determination condition may be included in the above command to start the evaluation of inactivity of data passing through the SgNB.

As another example, the SgNB may determine the determination condition. For example, this can reduce the signaling amount in the notification of the determination condition.

The above determination condition may be given based on time. For example, if the SgNB and the UE are not communicated for a certain time period or longer, the SgNB may determine that data is inactive. The above certain time period may be given for each bearer. Further, the above time period may be given depending on the number of UEs that are in a state of RRC_CONNECTED. In this manner, for example, by reducing a time period for determining inactivity of data when there are a large number of UEs that are in a state of RRC_CONNECTED, communication efficiency of the entire system can be enhanced.

The above time period may be determined based on information about the UE. For example, based on information indicating a UE for IoT, the above time period may be set shorter than that for a normal UE. As another example, based on information about a battery capacity, the above time period may be set shorter for a UE that has a low battery capacity. In this manner, for example, power consumption in the UE can be reduced.

The MgNB and/or the SgNB may notify an eNB/gNB in a RAN area related to paging of a UE AS context in advance. The above UE AS context may include information of either the MgNB or the SgNB, or may include information of both the MgNB and the SgNB. For example, only the MgNB may notify a base station in a RAN area related to paging of a UE AS context including information of both the MgNB and the SgNB. As another example, each of the MgNB and the SgNB may notify a base station in a RAN area related to paging of a UE AS context including information of the gNB itself. In this manner, for example, communication can be promptly started after paging, when UE mobility occurs.

As another example, each of the MgNB and the SgNB may transmit a notification of a UE AS context including information of both the MgNB and the SgNB. For example, the notification may be performed when RAN areas related to paging of each of the MgNB and the SgNB are different. For example, this enables state control of the UE in the above case.

The eNB/gNB may make an inquiry about the UE AS context to another eNB/gNB in the RAN area related to the paging. The inquiry may be made at the time of random access processing between the UE and the eNB/gNB. The above "another eNB/gNB" may notify the eNB/gNB of the UE AS context. The above UE AS context may include information of either the MgNB or the SgNB, or may include information of both the MgNB and the SgNB. This can reduce the signaling amount of an interface between the base stations.

A downlink data notification transmitted from the SgNB to the MgNB may include information of a random access preamble used by the UE for performing random access processing with the SgNB. The information of a random access preamble for the SgNB in the downlink data notification may be performed in addition to a notification of a random access preamble at the time of DC configuration.

The information of a random access preamble may be different from or the same as information of a random access preamble notified from the SgNB to the MgNB at the time of DC configuration. In this manner, for example, random access processing between the UE and the SgNB can be promptly performed. Further, information about transmission power of the random access preamble from the UE may be included. This can produce an effect similar to the above. Further, information about a beam of the SgNB used for communication between the SgNB and the UE may be included. In this manner, the UE can promptly perform SgNB beam acquisition. Further, other information necessary for paging may be included. For example, such other information may be information about an identifier of the UE, may be information about a PDU session, or may be information about a QoS flow. Information about a RAN area to which the SgNB belongs and that is used for paging may be included.

Paging from the MgNB to the UE may include information indicating generation of data in the SgNB. For example, the information may be an identifier indicating generation of data in the SgNB, or may be an identifier of the SgNB. Further, information that is the same as the above information for the downlink data notification transmitted from the SgNB to the MgNB may be included. This can produce an effect similar to the effect produced by the information included in the downlink data notification.

Paging from the MgNB to the UE may include information indicating generation of data in the MgNB. The information may be similar to the information indicating generation of data in the SgNB. Further, information about a random access preamble used by the UE for performing random access processing with the MgNB may be included. In this manner, for example, random access processing between the UE and the MgNB can be promptly performed. Further, information about transmission power of the random access preamble from the UE may be included. This can produce an effect similar to the above. Further, information about a beam of the MgNB used for communication between the MgNB and the UE may be included. In this manner, the UE can promptly perform MgNB beam acquisition.

The UE may start random access processing with the MgNB, based on the paging. The UE may transmit a request for RRC connection resume to the MgNB. The UE may transmit the request after a random access response from the MgNB. The MgNB may issue a command of RRC connection resume to the UE. The command may be issued after the request transmitted from the UE to the MgNB. Based on the command, the UE may restore to an RRC_CONNECTED state.

The UE may start random access processing with the SgNB. The random access processing performed by the UE with the SgNB may be performed after the UE restores to the RRC_CONNECTED state. In this manner, complexity of the design of the communication system can be avoided. Alternatively, the random access processing may be performed while the UE is in the RRC_INACTIVE state. For example, the UE may transmit a random access preamble to the SgNB before receiving a random access response from the MgNB. As another example, the UE may transmit a random access preamble to the SgNB after receiving a random access response from the MgNB. In this manner, for example, the UE can promptly resume transmission and reception of data to and from the SgNB.

Figure 8:
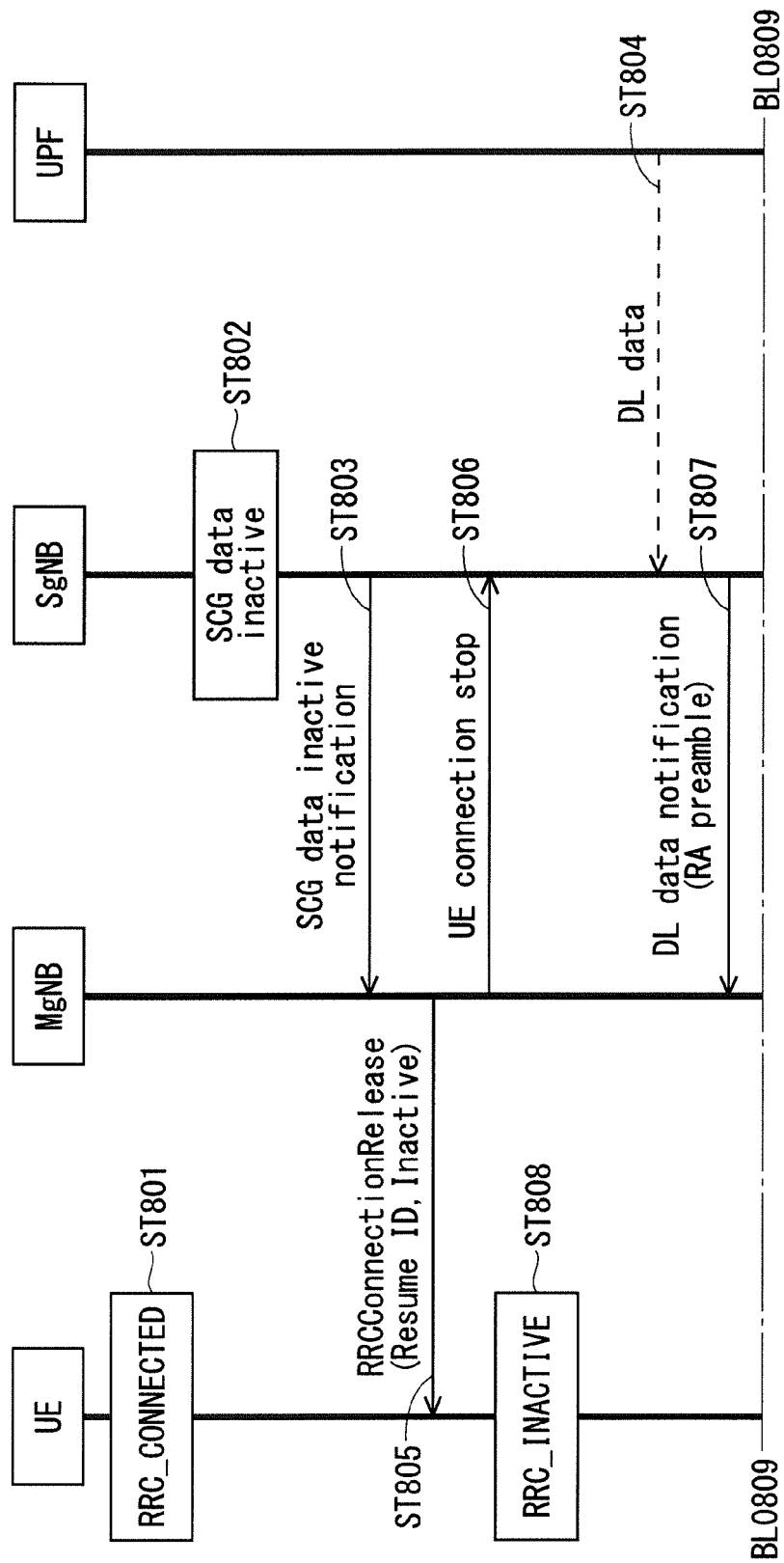
FIG. 8 is a sequence diagram illustrating operation in which the UE transitions to an RRC_INACTIVE state and operation in which the UE restores to an RRC_CONNECTED state, according to the first embodiment.
Figure 9:
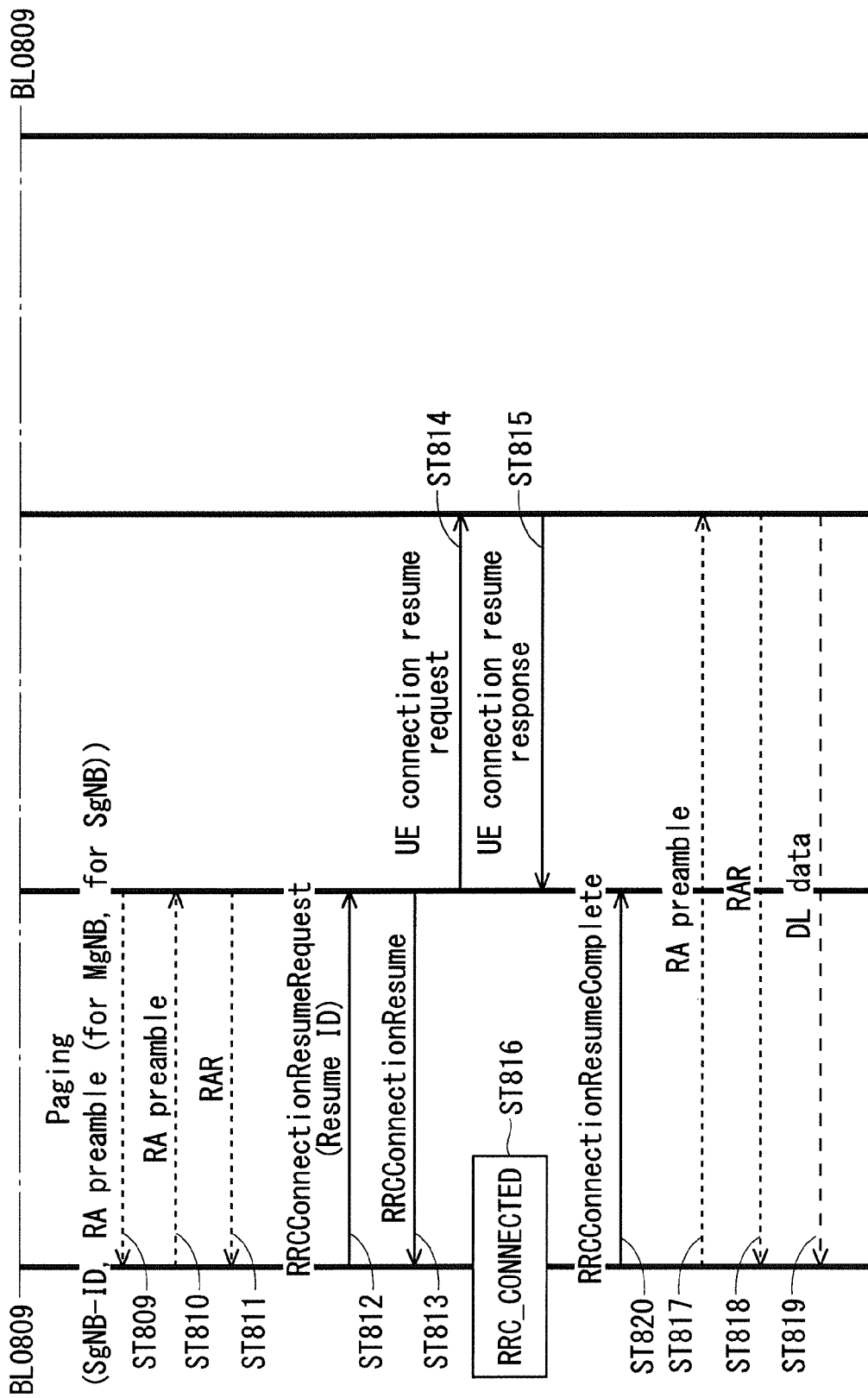
FIG. 9 is the sequence diagram illustrating operation in which the UE transitions to an RRC_INACTIVE state and operation in which the UE restores to an RRC_CONNECTED state, according to the first embodiment.

FIG. 8 and FIG. 9 are sequence diagrams illustrating operation in which the UE transitions to the RRC_INAC- TIVE state and operation in which the UE restores to the RRC_CONNECTED state, according to the first embodiment. FIG. 8 and FIG. 9 continue at the position of a boundary line BL0809. FIG. 8 and FIG. 9 illustrate an example in which the MgNB does not make an inquiry to the SgNB about whether data passing through the SgNB is inactive.

In Step ST801 illustrated in FIG. 8, the UE is in the RRC_CONNECTED state. In Step ST802, the SgNB determines that data passing through the SgNB has turned inactive. In Step ST803, the SgNB notifies the MgNB that all data using bearer(s) passing through the SgNB is inactive.

In Step ST805 illustrated in FIG. 8, the MgNB issues a command to the UE to transition to the RRC_INACTIVE state, based on the above notification received from the SgNB in Step ST803 and the inactivity of data using the bearer(s) passing through the MgNB. The command includes an identifier used for restoration to RRC_CONNECTED, such as a resume ID. Further, as the command, RRC connection release (RRCConnectionRelease) signaling may be used. The RRC connection release signaling includes information indicating that the UE is to be transitioned to RRC_INACTIVE. Based on Step ST805, the UE transitions to the RRC_INACTIVE state in Step ST808.

In the example illustrated in FIG. 8, RRC connection release signaling is used in Step ST805, but other RRC signaling may be used. The above "other RRC signaling" may also include an identifier used for restoration to RRC_CONNECTED, and may include information indicating that the UE is to be transitioned to RRC_INACTIVE.

In Step ST806 illustrated in FIG. 8, the MgNB notifies the SgNB of connection stop with the UE. Based on Step ST806, the SgNB stops connection with the UE. For example, the connection stop may be a stop of the SCG bearer, an SCG side path of the SCG split bearer, or an SCG side path of the MCG split bearer.

In Step ST804 illustrated in FIG. 8, downlink data from a UPF is transmitted to the SgNB. In Step ST807, the SgNB notifies the MgNB of generation of downlink data for the UE. In the notification, information of a random access preamble used by the UE for performing random access processing with the SgNB may be notified.

Steps ST809 to ST813, ST816, and ST820 illustrated in FIG. 9 illustrate a procedure for restoration from the RRC_INACTIVE state to the RRC_CONNECTED state between the MgNB and the UE. In Step ST809, the MgNB transmits paging to the UE. The paging may include an identifier of the SgNB. Further, information of a random access preamble used for performing random access processing with each of the MgNB and the SgNB may be notified.

In Step ST810 illustrated in FIG. 9, the UE transmits a random access preamble to the MgNB, and in Step ST811, the MgNB notifies the UE of a random access response. In Step ST812, the UE transmits a request for restoration to RRC_CONNECTED to the MgNB. The request includes the identifier used for restoration to RRC_CONNECTED, which is notified from the MgNB to the UE in Step ST805. For example, as the request, RRC connection resume request (RRCConnectionResumeRequest) signaling may be used. Based on the request and the identifier of Step ST812, the MgNB determines whether the UE is to be restored to the RRC_CONNECTED state. In Step ST813, the MgNB issues a command to the UE to restore to the RRC_CONNECTED state. In Step ST816, the UE restores to the RRC_CONNECTED state. In Step ST820, the UE notifies the MgNB that the UE has restored to the RRC_CONNECTED state.

For example, as the notification, RRC connection resume complete (RRCConnectionResumeComplete) signaling may be used.

In Steps ST814 and ST815 illustrated in FIG. 9, connection between the SgNB and the UE is resumed. The resumption may be resumption of the SCG bearer, the SCG side path of the SCG split bearer, or the SCG side path of the MCG split bearer. In Step ST814, the MgNB transmits, to the SgNB, a request for connection resume with the UE. In Step ST815, the SgNB notifies the MgNB that the SgNB has resumed connection with the UE.

In Steps ST817 and ST818 illustrated in FIG. 9, random access processing between the UE and the SgNB is performed. In Step ST817, a random access preamble is transmitted from the UE to the SgNB. The random access preamble may be the random access preamble notified from the MgNB to the UE in Step ST829. In Step ST818, a random access response is notified from the SgNB to the UE.

In Step ST819 illustrated in FIG. 9, downlink data including the data transmitted from the UPF to the SgNB in Step ST804 is transmitted from the SgNB to the UE. In this manner, downlink communication passing through the SgNB is resumed.

FIG. 8 and FIG. 9 illustrate an example in which random access processing between the UE and the SgNB is performed during the RRC_CONNECTED state, but the random access processing may be performed during the RRC_INACTIVE state. For example, Steps ST817 and ST818 may be performed between Steps ST809 and ST816. Step ST817 may be performed before Step ST810, may be performed after Step ST810, or may be performed after Step ST811. In this manner, for example, communication between the UE and the SgNB can be promptly resumed.

According to the first embodiment, the inquiry about an inactive state of data using the SCG bearer and the SCG split bearer and/or the signaling amount between the base stations concerning notification can be reduced. Further, even when data passing through the SgNB is generated, the MgNB can cause the UE to transition to the RRC_CONNECTED state. In this manner, communication using DC can be efficiently implemented.

According to the first embodiment, the following configuration is provided, for example.

Provided is a communication system including: a communication terminal device; and a plurality of base station devices configured to perform radio communication with the communication terminal device. More specifically, the plurality of base station devices include a master base station device and a secondary base station device that are configured to provide at least one bearer for the communication terminal device. When the secondary base station device detects a data inactive state for all the bearers, the secondary base station device notifies the master base station device of occurrence of the data inactive state regardless of absence of an inquiry from the master base station device, the data inactive state being a state in which downlink data for the communication terminal device is inactive. When the master base station device receives the notification about the occurrence of the data inactive state, the master base station device transmits a command to the communication terminal device to transition from an RRC_CONNECTED state to an RRC_INACTIVE state. Based on the command from the master base station device, the communication terminal device transitions to the RRC_INACTIVE state.

Note that, in this configuration, at least one of the master base station device and the secondary base station device may hold information about connection with the communication terminal device, even after the communication terminal device transitions to the RRC_INACTIVE state.

According to the first embodiment, the following configuration is also provided, for example.

Provided is a communication system including: a communication terminal device; and a plurality of base station devices configured to perform radio communication with the communication terminal device. More specifically, the plurality of base station devices include a master base station device and a secondary base station device that are configured to provide at least one bearer for the communication terminal device. When the secondary base station device detects generation of downlink data for the communication terminal device being in an RRC_INACTIVE state, the secondary base station device notifies the master base station device of the generation of the downlink data. When the master base station device receives the notification about the generation of the downlink data, the master base station device transmits paging to the communication terminal device. When the communication terminal device receives the paging, the communication terminal device transmits a request for restoration to an RRC_CONNECTED state to the master base station device. In this case, the paging includes at least one of information about connection between the communication terminal device and the master base station device, and information about connection between the communication terminal device and the secondary base station device.

The above configuration can be variously modified based on the disclosure and the suggestion of the Description including the first embodiment. The above configuration and its modified configuration can solve the above problems, and can produce the above effects.

First Modification of First Embodiment

In the state control of the UE using DC configuration, the following problems occur. Specifically, there is no definition as to operation of the UE, the MgNB, and the SgNB, when downlink data for the UE is transmitted from the higher NW device to the MgNB or to the SgNB immediately after a notification of a transition command to transition to the RRC_INACTIVE state is transmitted from the MgNB to the UE. Thus, for example, there is a problem that recognition of a UE state varies among the UE, the MgNB, and the SgNB. A similar problem occurs even when uplink data is generated in the UE immediately after the MgNB notifies the UE of the transition command.

Solutions to the above problems are disclosed below.

The UE once transitions to the RRC_INACTIVE state, and then restores to the RRC_CONNECTED state. The MgNB may issue a transition command to the UE to transition to the RRC_INACTIVE state.

The above operation may be employed when downlink data is generated. Specifically, the MgNB may transmit paging to the UE. The transmission of the paging from the MgNB to the UE may be performed immediately after the transition command to the RRC_INACTIVE state is issued. The MgNB may transmit the paging to the UE, based on reception of downlink data from the higher NW device. Alternatively, the paging may be transmitted to the UE, based on a notification indicating generation of downlink data from the SgNB to the MgNB. The SgNB may transmit the notification to the MgNB, based on reception of the downlink data from the higher NW device.

The SgNB may transmit the notification indicating the generation of the downlink data to the MgNB, before a notification of UE connection stop notified from the MgNB to the SgNB. This can reduce the processing amount of the SgNB. Alternatively, the notification indicating the downlink generation may be transmitted after the notification of UE connection stop. In this manner, complexity of the design of the communication system can be avoided.

The operation that the UE once transitions to the RRC_INACTIVE state and then restores to the RRC_CONNECTED state may be employed when uplink data is generated. Specifically, the UE may start random access processing with the MgNB. Subsequent processing may be similar to that when downlink data is generated. Further, even when uplink data is generated, the UE may perform the random access processing performed with the SgNB after the UE restores to the RRC_CONNECTED state or while the UE is in the RRC_INACTIVE state. The random access processing performed by the UE with the SgNB may be performed after receiving a random access response from the MgNB, or may be performed before receiving a random response access from the MgNB. Transmission of a random access preamble from the UE to the SgNB may be performed before transmission of a random access preamble from the UE to the MgNB. This can produce an effect similar to that when downlink data is generated.

As an example of the sequence that the UE once transitions to the RRC_INACTIVE state and then restores to the RRC_CONNECTED state may be a sequence that Step ST804 of FIG. 8 is arranged between Step ST803 and Step ST806. The sequence that the UE once transitions to the RRC_INACTIVE state and then restores to the RRC_CONNECTED state may be a sequence that Step ST807 of FIG. 8 is arranged before Step ST806, or may be a sequence that Step ST807 of FIG. 8 is arranged after Step ST806.

Another solution is presented. The UE cancels transition to the RRC_INACTIVE state. In this manner, for example, latency before the resumption of transmission and reception of data between the UE and the SgNB can be reduced.

The MgNB need not notify the UE of RRC connection release (RRCConnectionRelease). For example, the above operation may be employed when DL data transmission from the UPF to the SgNB and downlink data notification from the SgNB to the MgNB are performed before the timing at which the MgNB transmits RRC connection release signaling to the UE. In the above case, the MgNB need not notify the SgNB of a UE connection stop command. In this manner, for example, communication between the UE and the SgNB can be promptly resumed.

Another example is disclosed. In the UE, a standby time period may be set between reception of an RRC_INACTIVE state transition command from the MgNB and the start of RRC_INACTIVE state transition processing. The UE may cancel the transition to the RRC_INACTIVE state, based on uplink data for the MgNB and/or the SgNB generated within the standby time period. The transition may be cancelled based on reception of downlink data from the MgNB and/or the SgNB. The transition may be cancelled based on a command transmitted from the MgNB to cancel the RRC_INACTIVE state transition. The UE transitions to the RRC_INACTIVE state after the standby time period elapses.

The standby time period may be set in the MgNB. The MgNB may cancel the transition of the UE to the RRC_INACTIVE state, based on generation of downlink data passing through the MCG bearer or the MCG split bearer during the standby time period. The transition may be cancelled based on reception of a downlink data notification from the SgNB. The transition of the UE to the RRC_INACTIVE state may be cancelled based on information from the UE about uplink data, such as uplink data, an SR, and a BSR. The MgNB may determine that the UE has transitioned to the RRC_INACTIVE state after the standby time period elapses.

The standby time period may be set both in the UE and the MgNB. The standby time period in the UE and the MgNB may be the same or different. The UE and/or the MgNB may separately set a standby time period related to uplink data and a standby time period related to downlink data. The standby time period related to uplink data and the standby time period related to downlink data may be the same or different. For example, the base station may set the standby time period related to uplink data to be longer than the standby time period set in the UE. As another example, the UE may set the standby time period related to downlink data to be longer than the standby time period set in the MgNB. In this manner, for example, recognition of a UE RRC state can be prevented from being inconsistent between the UE and the MgNB, when the standby time period related to uplink data in the UE is exceeded during HARQ retransmission of uplink data.

The standby time period may be defined in a standard. In this manner, complexity of the design of the communication system can be avoided. As another example, the MgNB may determine the standby time period. The MgNB may notify the UE of the standby time period. As the notification of the standby time period, signaling used at the time of configuring DC may be used. For example, the MgNB may include information about the standby time period in RRC connection reconfiguration signaling, to thereby notify the UE of the information.

A method in which the UE cancels transition to the RRC_INACTIVE state is disclosed. The MgNB may notify the UE of a command to cancel transition to the RRC_INACTIVE state. Based on the command, the UE may cancel transition to the RRC_INACTIVE state. The command may be RRC-dedicated signaling. As the RRC-dedicated signaling, for example, RRC connection release cancel (RRCConnectionReleaseCancel) signaling may be newly provided. The command may include an identifier used for restoration to RRC_CONNECTED, such as a resume ID.

As the above RRC-dedicated signaling, other signaling may be used. For example, RRC connection resume (RRCConnectionResume) may be used. The RRC connection resume signaling may include information indicating cancellation of transition to the RRC_INACTIVE state. Further, an identifier used for restoration to RRC_CONNECTED, such as a resume ID, may be included. In this manner, by reducing the increase of the number of types of RRC signaling, complexity of the system can be avoided.

The MgNB may notify the UE of the cancel command, based on generation of downlink data passing through the MgNB within the above standby time period. In the above, the downlink data passing through the MgNB may be downlink data using the MCG bearer, may be downlink data using the MCG split bearer, or may be downlink data using the SCG split bearer. The MgNB may notify the UE of the cancel command, based on reception of a downlink data notification from the SgNB within the standby time period.

Figure 10:
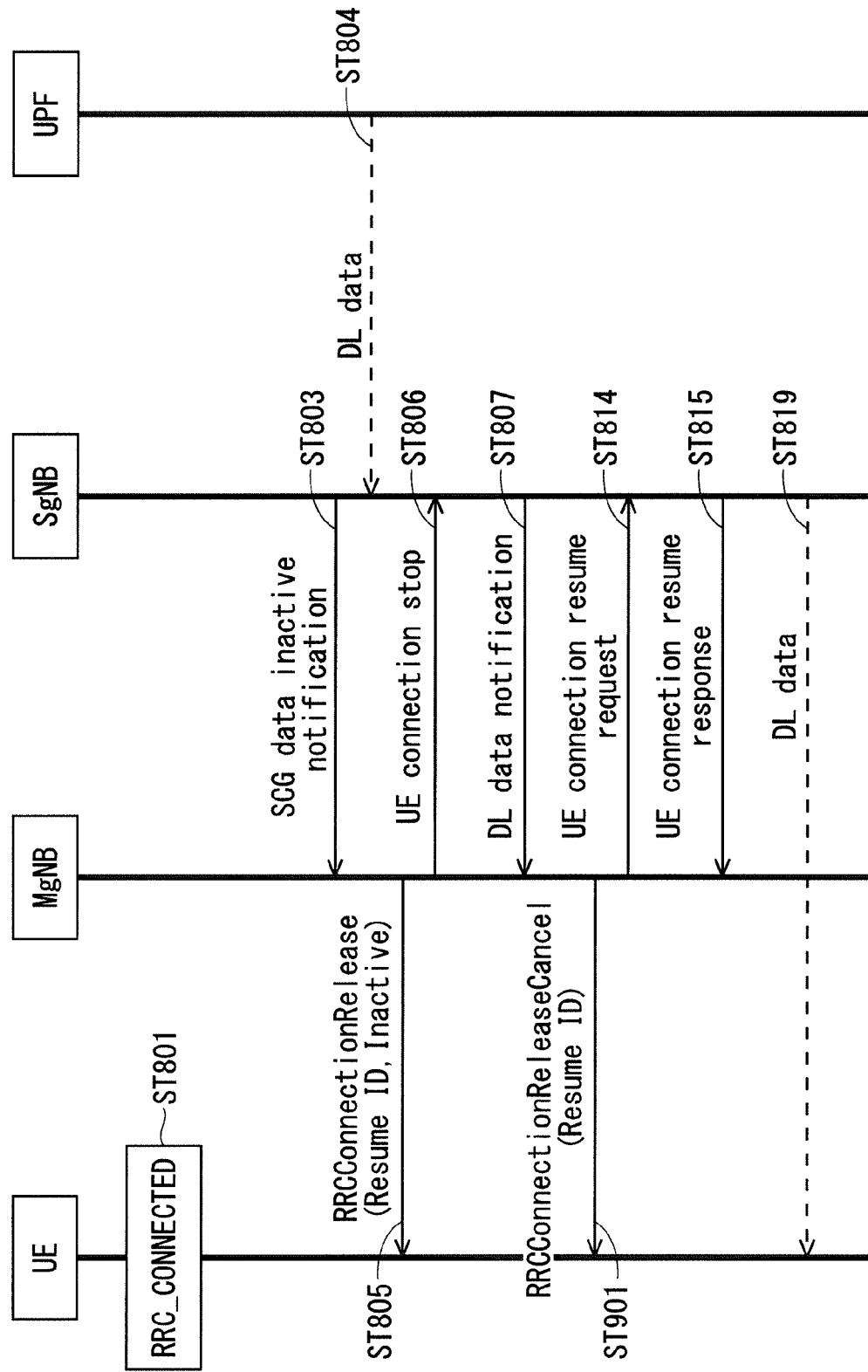
FIG. 10 is a sequence diagram illustrating operation in which RRC_INACTIVE state transition of the UE is cancelled based on an RRC_INACTIVE state transition cancel command from an MgNB, according to a first modification of the first embodiment.

FIG. 10 is a sequence diagram illustrating operation in which the RRC_INACTIVE state transition of the UE is cancelled based on an RRC_INACTIVE state transition cancel command from the MgNB. As with the case of FIG. 8 and FIG. 9, FIG. 10 illustrates an example in which downlink data for the UE is transmitted from the UPF to the SgNB immediately after an SCG data inactive notification transmitted from the SgNB to the MgNB. The sequence illustrated in FIG. 10 includes the same steps as those of the sequence illustrated in FIG. 8 and FIG. 9. Thus, the same steps are denoted by the same step numbers, and common description is omitted.

Steps ST801 to ST807 of FIG. 10 are the same as those of FIG. 8, and thus description thereof is omitted.

In FIG. 10, after the downlink data notification of Step ST807 is received by the MgNB within a certain time period from transmission of the RRC_INACTIVE transition command of Step ST805, in Step ST901, the MgNB issues a command to the UE to cancel RRC_INACTIVE transition. The command includes an identifier used for restoration to RRC_CONNECTED, such as a resume ID. Further, as the command, for example, RRC connection release cancel (RRCConnectionReleaseCancel) signaling may be used. Based on Step ST901, the UE cancels transition to the RRC_INACTIVE state, and maintains the RRC_CONNECTED state.

In the example illustrated in FIG. 10, RRC connection release cancel signaling is used in Step ST901, but other RRC signaling may be used. The above "other RRC signaling" may also include an identifier used for restoration to RRC_CONNECTED. For example, RRC connection resume (RRCConnectionResume) may be used. The RRC connection resume signaling may include information indicating cancellation of transition to the RRC_INACTIVE state.

Steps ST814 and ST815 of FIG. 10 are the same as those of FIG. 9, and thus description thereof is omitted.

In FIG. 10, the UE maintains the RRC_CONNECTED state, and thus does not perform random access processing with the MgNB and the SgNB, unlike FIG. 8 and FIG. 9.

Step ST819 illustrated in FIG. 10 is the same as that of FIG. 9, and thus description thereof is omitted.

In FIG. 10, the SgNB may transmit the downlink data notification illustrated in Step ST807 to the MgNB before receiving the UE connection stop command illustrated in Step ST806. The MgNB need not notify the SgNB of a UE connection stop command. The operation that the MgNB does not notify the SgNB of a UE connection stop command may be employed when the SgNB transmits a downlink data notification to the MgNB before receiving a UE connection stop command. The same operation as that for the above UE connection stop command may apply to a UE connection resume request and a UE connection resume response. In this manner, the signaling amount of an interface between the base stations can be reduced.

Further, the MgNB may transmit the UE connection stop command transmitted to the SgNB, after a certain time period elapses from reception of the SCG data inactive notification. For example, the above certain time period may be the same as the standby time period set between reception of the RRC_INACTIVE state transition command from the MgNB and the start of RRC_INACTIVE state transition processing in the UE. In this manner, for example, the SgNB can know a time period taken before the UE transitions to RRC_INACTIVE, and therefore UE control in the SgNB is facilitated.

Another method in which the UE cancels transition to the RRC_INACTIVE state is disclosed. Based on reception of downlink data, the UE cancels transition to the RRC_INACTIVE state. The downlink data transmission from the MgNB to the UE may be performed immediately after the RRC_INACTIVE state transition command transmitted from the MgNB to the UE. The SgNB may transmit downlink data to the UE. The SgNB may transmit the downlink data immediately after the SCG data inactive notification. The downlink data transmitted to the UE by the MgNB and/or the SgNB may be data passing through the MCG bearer and/or the MCG split bearer, or may be data passing through the SCG bearer and/or the SCG split bearer. The SgNB may transmit a downlink data notification to the MgNB. This facilitates UE state management in the MgNB. The MgNB may transmit the UE connection stop command transmitted to the SgNB, after the above standby time period elapses. This enables the SgNB to know a time period taken before the UE transitions to RRC_INACTIVE, and therefore SgNB control is facilitated.

Another method in which the UE cancels transition to the RRC_INACTIVE state is disclosed. Based on transmission of uplink data to the MgNB and/or the SgNB, the UE cancels transition to the RRC_INACTIVE state. This obviates the need for the RRC_INACTIVE state transition cancel command transmitted from the MgNB to the UE, and therefore the signaling amount can be reduced. The uplink data may be data passing through the MCG bearer and/or the MCG split bearer, or may be data passing through the SCG bearer and/or the SCG split bearer. An SR may be used instead of the uplink data. The SR may be an SR transmitted to the MgNB, or may be an SR transmitted to the SgNB. Alternatively, a buffer status report (BSR) may be used. The BSR may be a BSR transmitted to the MgNB, or may be a BSR transmitted to the SgNB. The MgNB and/or the SgNB may determine that transition of the UE to the RRC_INACTIVE state has been canceled, based on the fact that an uplink data buffer amount included in the BSR is not empty. The SgNB may transmit, to the MgNB, a notification indicating that the SgNB has received the uplink data from the UE. This enables the MgNB to know a state of uplink data passing through the SgNB, and therefore state control in the MgNB is facilitated. The above uplink data notification may be transmitted to the MgNB when the SgNB receives an SR from the UE, or may be transmitted to the MgNB when the SgNB receives a BSR from the UE.

FIG. 11 is a sequence diagram illustrating operation in which the RRC_INACTIVE state transition of the UE is cancelled based on generation of uplink data. FIG. 11 illustrates an example in which an SR for uplink data transmission is transmitted from the UE to the SgNB immediately after an SCG data inactive notification transmitted from the SgNB to the MgNB. The sequence illustrated in FIG. 11 includes the same steps as those of the sequence illustrated in FIG. 8 and FIG. 9. Thus, the same steps are denoted by the same step numbers, and common description is omitted.

Steps ST801, ST803, ST805, and ST806 of FIG. 11 are the same as those of FIG. 8, and thus description thereof is omitted.

In Step ST1001 illustrated in FIG. 11, the UE transmits an SR to the SgNB, based on generation of uplink data from the UE to the SgNB immediately after reception of the UE connection stop command of Step ST806. In Step ST1002, the SgNB notifies the UE of a grant for uplink data transmission, and in Step ST1003, the SgNB transmits an uplink data notification to the MgNB.

Steps ST814 and ST815 of FIG. 11 are the same as those of FIG. 9, and thus description thereof is omitted.

In FIG. 11, the UE maintains the RRC_CONNECTED state. In Step ST1004, the UE transmits uplink data to the SgNB, and in Step ST1005, the SgNB transmits the uplink data to the UPF.

In the example illustrated in FIG. 11, the RRC_CONNECTED state is maintained based on the transmission of an SR in Step ST1001, but a BSR may be used. Alternatively, uplink data transmission itself may be used. In this manner, for example, the RRC_CONNECTED state can be maintained also in grant-free uplink data transmission.

Further, in the example illustrated in FIG. 11, the SgNB transmits an uplink data notification to the MgNB after the grant for uplink data, but the uplink data notification may be transmitted before the grant for uplink data. For example, this enables the MgNB to promptly know the UE state.

In FIG. 11, the SR transmission illustrated in Step ST1001 and the uplink data notification illustrated in Step ST1003 may be performed before the UE connection stop command illustrated in Step ST806. The MgNB need not notify the SgNB of the UE connection stop command illustrated in Step ST806. For example, the operation that the MgNB does not notify the SgNB of the UE connection stop command may be employed when the uplink data notification transmitted from the SgNB to the MgNB is performed before the UE connection stop command. In a similar manner, the MgNB need not notify the SgNB of the UE connection resume request illustrated in Step ST814, or the SgNB need not notify the MgNB of the UE connection resume response illustrated in Step ST815. In this manner, for example, the signaling amount of an interface between the base stations can be reduced.

Further, the MgNB may transmit the UE connection stop command to be transmitted to the SgNB, after the above standby time period elapses. This enables the SgNB to know a time period taken before the UE transitions to RRC_INACTIVE, and therefore SgNB control is facilitated.

The methods disclosed in the first modification may be employed for a base station and a UE not having DC configuration. For example, the base station and the UE not having DC configuration may be a configuration that a UE connects to one base station, or may be a configuration of multi-connectivity (abbreviated as MC). This can produce an effect similar to that of the DC configuration.

According to the first modification, malfunction when transmission and reception data is generated immediately after the UE receives an RRC_INACTIVE transition command from the MgNB can be prevented and robustness of the system can be enhanced.

Second Modification of First Embodiment

As a method of mobility of the UE in the RRC_INACTIVE state, a procedure combining inter-gNB resume, master node (MN) handover, and secondary node change (SN change) is used.

When the above method is employed, the following problems occur. Specifically, which entity selects a target SgNB for the UE in the RRC_INACTIVE state has not been disclosed. Thus, there is a problem that the UE in the RRC_INACTIVE state cannot perform SgNB mobility.

Solutions to the above problems are disclosed below.

The UE determines an SgNB. When determining an SgNB, the UE uses cell re-selection. The UE determines the cell detected in the cell re-selection as the SgNB.

The UE may periodically perform neighboring cell measurement. The cycle may be defined in a standard. Alternatively, the cycle may be the same as the DRX cycle.

Alternatively, the UE may perform the neighboring cell measurement when receiving paging. This can reduce the processing amount of the UE in the RRC_INACTIVE state.

The UE notifies the MgNB of information of the determined SgNB. For example, the information may be an identifier of the SgNB, or may be an identifier of the cell belonging to the SgNB, such as a physical cell ID (Physical Cell Identity) of a PSCell. The information may be included in RRC-dedicated signaling from the UE to the MgNB, such as a RRC connection resume request (RRCConnectionResumeRequest), or may be included in small data that can be transmitted during the RRC_INACTIVE state.

Figure 13:
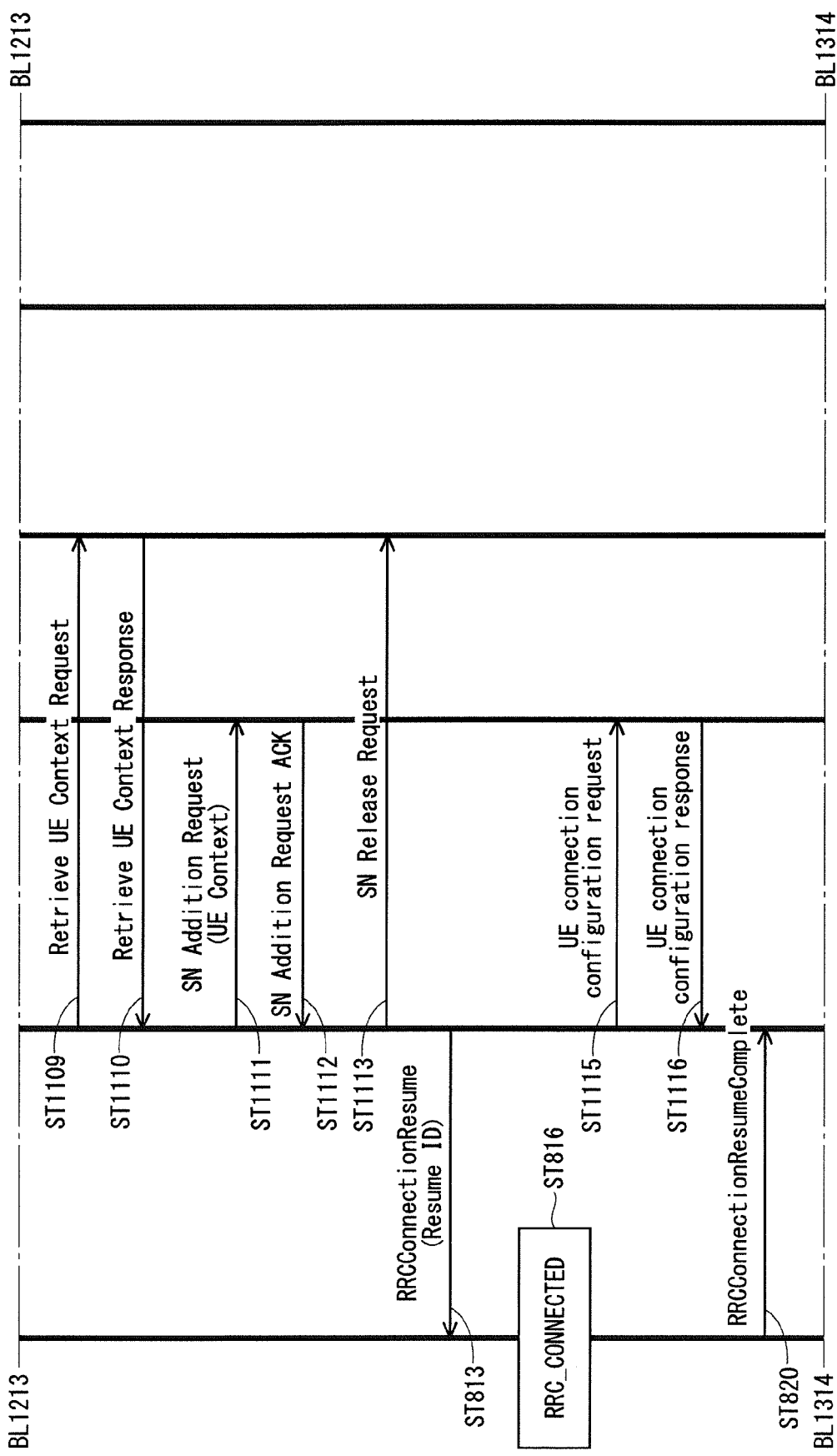
FIG. 13 is the sequence diagram illustrating operation in which the UE in the RRC_INACTIVE state determines an SgNB, according to the second modification of the first embodiment.
Figure 14:
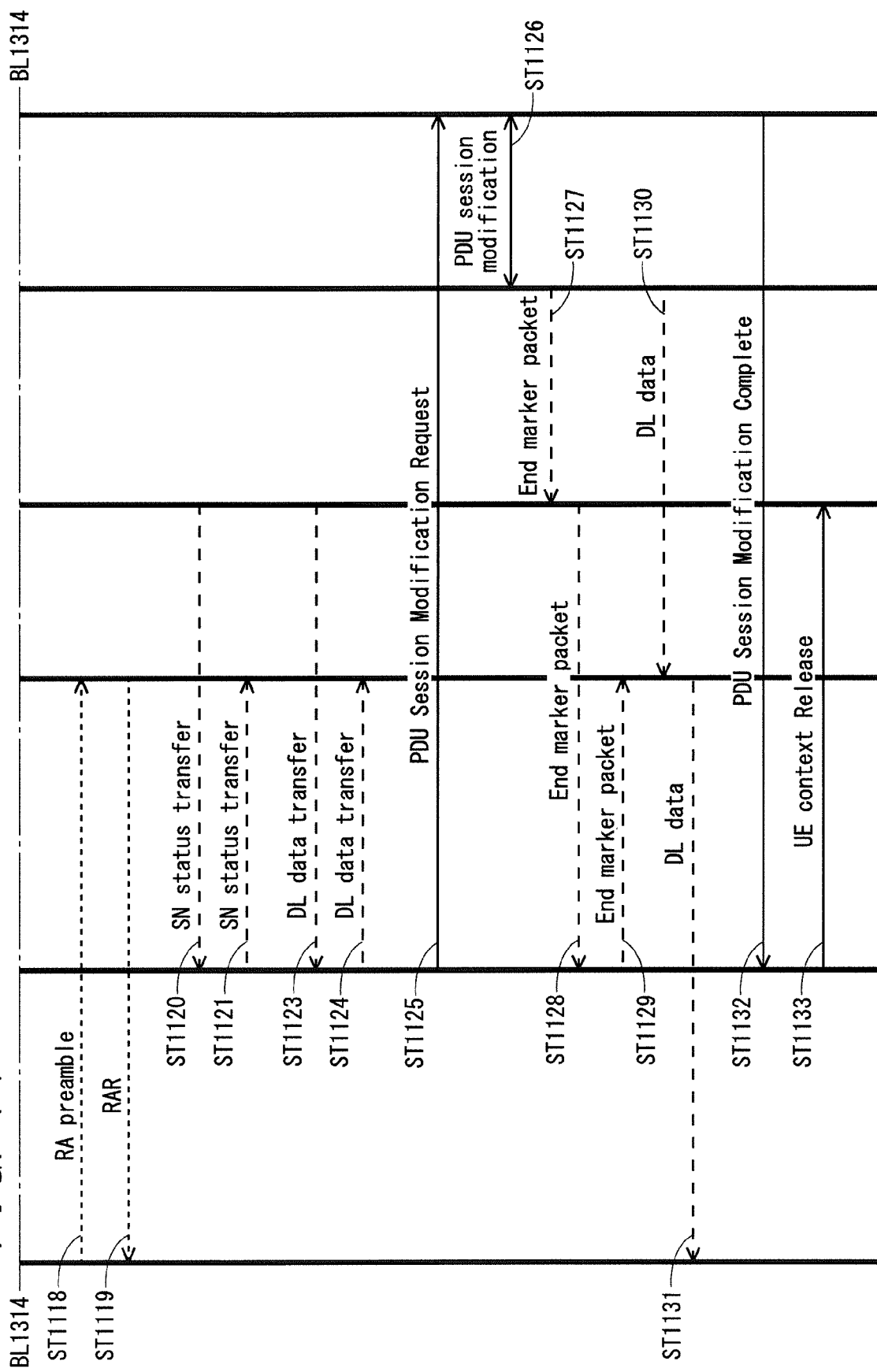
FIG. 14 is the sequence diagram illustrating operation in which the UE in the RRC_INACTIVE state determines an SgNB, according to the second modification of the first embodiment.

FIG. 12 to FIG. 14 are sequence diagrams illustrating operation in which the UE in the RRC_INACTIVE state determines an SgNB. FIG. 12 to FIG. 14 continue at the positions of boundary lines BL1213 and BL1314. FIG. 12 to FIG. 14 illustrate an example in which SgNB mobility occurs and the SgNB is switched from an S-SgNB to a T-SgNB, during the RRC_INACTIVE state of the UE using DC configuration. In FIG. 12 to FIG. 14, the UE restores to RRC_CONNECTED, based on generation of downlink data passing through the SgNB. The sequence illustrated in FIG. 12 to FIG. 14 includes the same steps as those of the sequence illustrated in FIG. 8 and FIG. 9. Thus, the same steps are denoted by the same step numbers, and common description is omitted.

In Step ST1101 illustrated in FIG. 12, the UE is in the RRC_INACTIVE state. In Step ST1102, the UE determines a target SgNB. In the example of FIG. 12 to FIG. 14, the target SgNB corresponds to the T-SgNB. When determining an SgNB, the UE may use cell re-selection.

In Step ST1103 illustrated in FIG. 12, the UPF transmits downlink data to the S-SgNB being a source SgNB, since the UPF does not know yet that the SgNB for the UE is changed to the T-SgNB. In Step ST1104, the S-SgNB transmits a downlink data notification to the MgNB. The downlink data notification of Step ST1104 may be similar to that of Step ST807 of FIG. 8.

Steps ST809 to Step ST811 of FIG. 12 are the same as those of FIG. 9, and thus description thereof is omitted.

In Step ST1108 of FIG. 12, the UE transmits a request for restoration to RRC_CONNECTED to the MgNB. The request includes information of the target SgNB determined by the UE. The UE may transmit a notification of the request, using RRC connection resume request (RRCConnectionResumeRequest) signaling.

In Step ST1109 of FIG. 13, the MgNB transmits a request for a UE context (UE Context) to the S-SgNB. In Step ST1110, the S-SgNB transmits a UE context to the MgNB. In Step ST1109, the MgNB may include, in the request, information indicating a request for information for a secondary base station out of the UE context. In Step ST1110, the SgNB may transmit, to the MgNB, only information for a secondary base station out of the UE context. In this manner, for example, the signaling amount concerning UE context transmission can be reduced.

In Step ST1111 of FIG. 13, the MgNB notifies the T-SgNB of a secondary base station addition request (SN Addition Request). The request may include the UE context acquired from the S-SgNB. In the example of FIG. 12 to FIG. 14, the T-SgNB determines to receive the request. In Step ST1112, the T-SgNB transmits a notification of a positive response (secondary base station addition request positive response; SN Addition Request ACK) for the request. In Step ST1113, the MgNB notifies the S-SgNB of a secondary base station release request (SN Release Request).

Steps ST813, ST816, and ST820 of FIG. 13 are the same as those of FIG. 9, and thus description thereof is omitted.

In Step ST1115 illustrated in FIG. 13, the MgNB transmits, to the T-SgNB, a request for connection configuration with the UE. In Step ST1116, the T-SgNB notifies the MgNB that the configuration has completed.

In Steps ST1118 and ST1119 illustrated in FIG. 14, random access processing is performed between the UE and the T-SgNB. The processing of Steps ST1118 and ST1119 is similar to that of Steps ST817 and ST818 illustrated in FIG. 9, respectively.

Steps ST1120 and ST1121 illustrated in FIG. 14 are processing of transferring a PDCP sequence number reception/transmission state from the S-SgNB to the T-SgNB, through the MgNB. In Step ST1120, the S-SgNB transfers, to the MgNB, a reception/transmission state of a PDCP sequence number to be transmitted and received to and from the UE. In Step ST1121, the MgNB transfers, to the T-SgNB, the state received from the S-SgNB in Step ST1120.

Steps ST1123 and ST1124 illustrated in FIG. 14 are processing of transferring downlink transmission data stored in a PDCP buffer of the S-SgNB to the T-SgNB, through the MgNB. In Step ST1123, the S-SgNB transfers a PDCP PDU stored in the PDCP buffer to the MgNB. In Step ST1124, the MgNB transfers, to the T-SgNB, the PDCP PDU received from the S-SgNB in Step ST1123. The data transferred in Steps ST1123 and ST1124 may include the data transmitted from the UPF to the S-SgNB in Step ST1103.

In Step ST1125 illustrated in FIG. 14, the MgNB notifies the SMF of a PDU session modification request (PDU Session Modification Request). The PDU session modified in the request may be a PDU session passing through the SCG. Further, in Step ST1126, the SMF and the UPF modify the PDU session included in the PDU session modification request of Step ST1125. Also in Step ST1126, the PDU session may be modified between the AMF and the UPF, in a similar manner to Step ST1125.

In FIG. 12 to FIG. 14, the SMF may be an AMF. Further, the SMF may be connected between the UPF and the AMF, and the AMF may be connected to each of the gNBs, i.e., the MgNB, the T-SgNB, and the S-SgNB. In this manner, for example, flexibility of the configuration of the communication system can be enhanced. The same may apply hereinafter in the present invention.

In Step ST1127 illustrated in FIG. 14, an end marker is attached to the last packet when a route for packets transmitted from the UPF is switched from the S-SgNB to the T-SgNB, and the end marker is transmitted from the UPF to the S-SgNB. In Steps ST1128 and ST1129, the packet to which the end marker is attached is transferred from the S-SgNB to the T-SgNB, through the MgNB. In Step ST1128, the packet is transferred from the S-SgNB to the MgNB, and in Step ST1129, the packet is transferred from the MgNB to the T-SgNB.

In Step ST1130 illustrated in FIG. 14, the route for packets transmitted from the UPF is switched from the S-SgNB to the T-SgNB, and packets are transmitted from the UPF to the T-SgNB. In Step ST1131, the packets transmitted in Step ST1130 are transmitted from the T-SgNB to the UE.

In Step ST1132 illustrated in FIG. 14, the SMF notifies the MgNB that the PDU session modification has completed. In Step ST1133, the MgNB issues a command to the S-SgNB to release the UE context notified to the MgNB in Step ST1110, and the S-SgNB releases the UE context. Also in Step ST1132, an AMF may perform the notification instead of the SMF, in a similar manner to Steps ST1125 and ST1126.

In the example illustrated in FIG. 12 to FIG. 14, the UE determines a target SgNB by using cell re-selection, but measurement configuration notified from the MgNB may be used. The measurement configuration may be configuration acquired from the MgNB when the UE is in the RRC_CO-NNECTED state. For example, this can enhance flexibility of an SgNB determination method.

When determining an SgNB, the UE may determine a cell that is detected first among cells satisfying a predetermined condition as the SgNB. In this manner, for example, SgNB detection can be promptly performed. Alternatively, a cell with the most satisfactory condition may be determined as the SgNB. This can enhance reliability of communication.

Another solution is presented. The MgNB determines an SgNB. The MgNB determines an SgNB by using a measurement result notified from the UE.

The UE may periodically perform the measurement. The cycle may be defined in a standard. Alternatively, the cycle may be the same as the DRX cycle. Alternatively, the cycle may be individually notified from the MgNB to a UE. Alternatively, the cycle may be broadcast from the MgNB to UEs served by the MgNB.

Alternatively, the UE may perform the measurement when receiving paging. This can reduce the processing amount of the UE in the RRC_INACTIVE state.

The UE may notify the MgNB of the measurement result. The UE may perform the notification by using small data that can be transmitted during the RRC_INACTIVE state. In this manner, the measurement result can be promptly notified. As another example, the measurement result may be notified as a measurement report. Alternatively, the measurement result may be included in RRC connection resume request (RRCConnectionResumeRequest) signaling.

When determining an SgNB, the MgNB may use criteria for cell re-selection. The UE may notify the MgNB of a measurement result used for cell re-selection.

Figure 15:
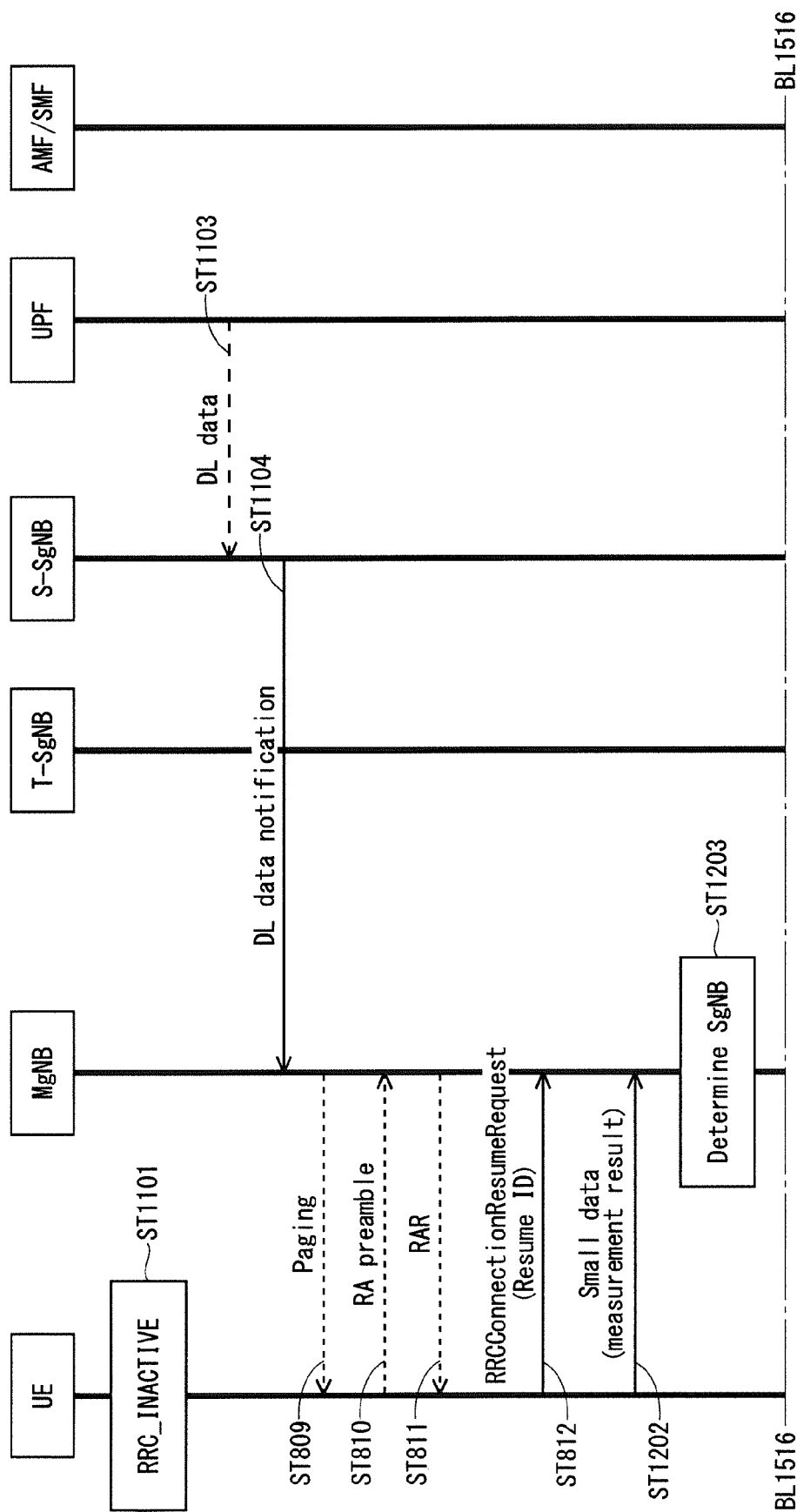
FIG. 15 is a sequence diagram illustrating operation in which the MgNB determines an SgNB, during communication with the UE in the RRC_INACTIVE state, according to the second modification of the first embodiment.
Figure 16:
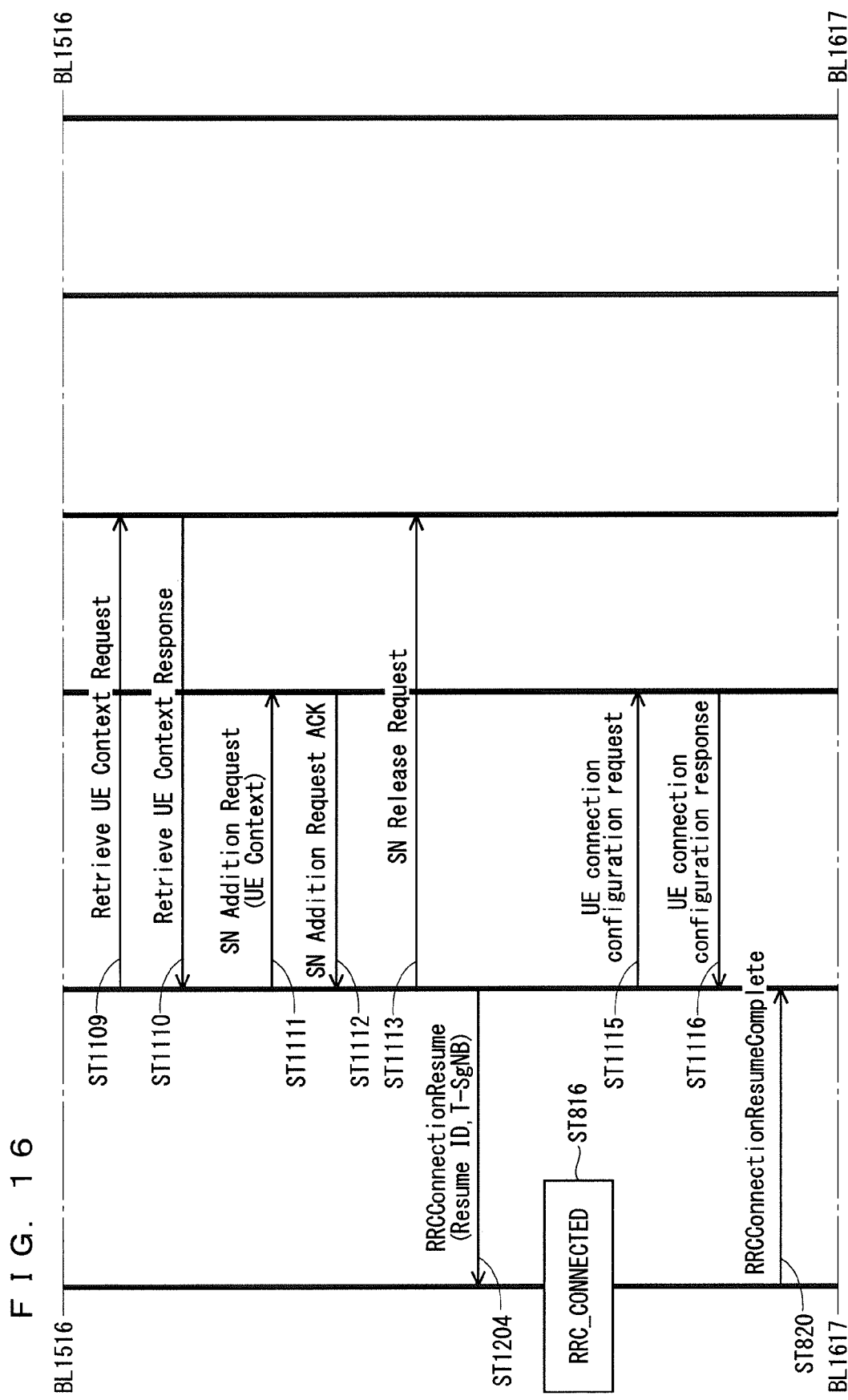
FIG. 16 is the sequence diagram illustrating operation in which the MgNB determines an SgNB, during communication with the UE in the RRC_INACTIVE state, according to the second modification of the first embodiment.
Figure 17:
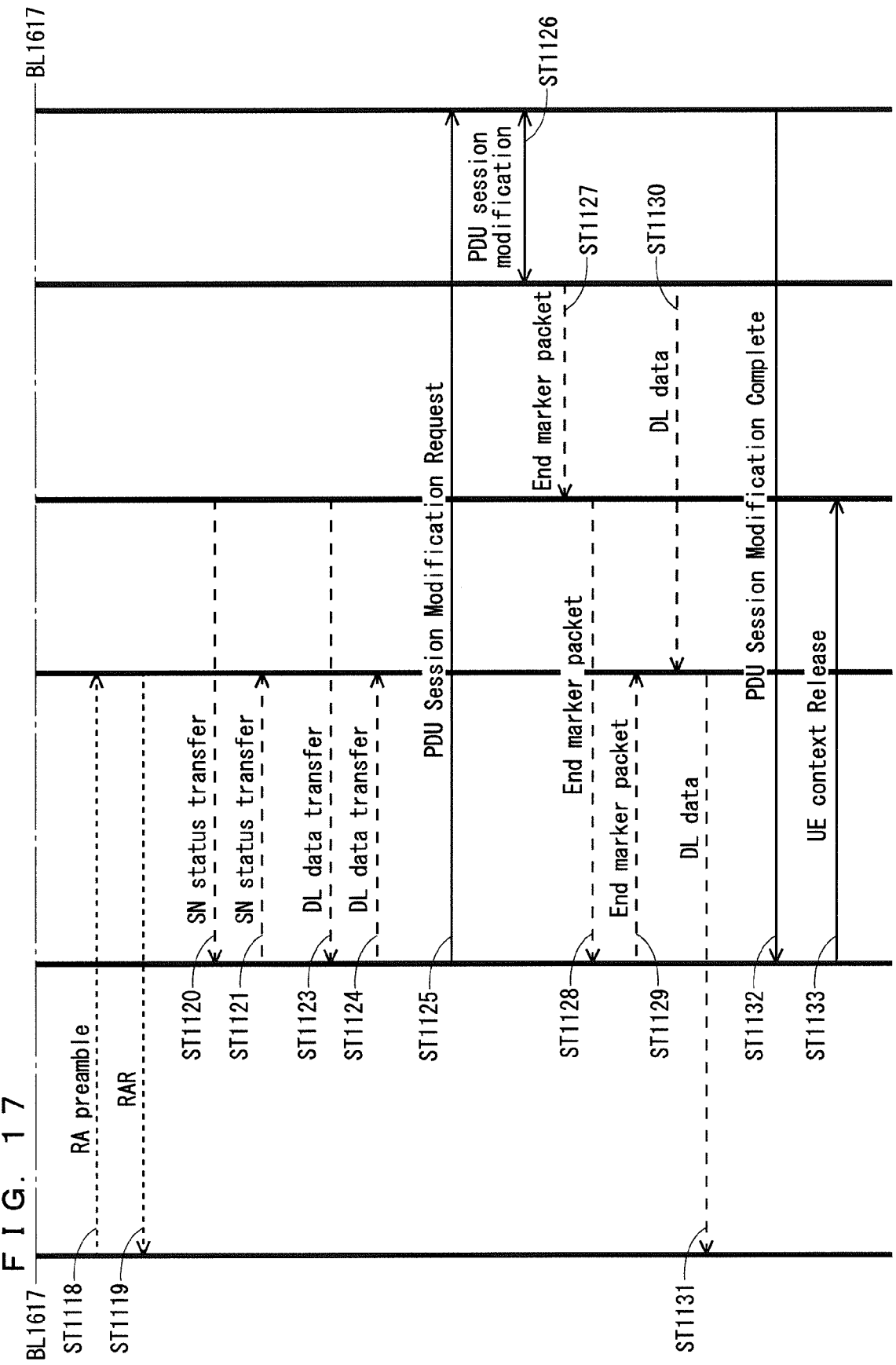
FIG. 17 is the sequence diagram illustrating operation in which the MgNB determines an SgNB, during communication with the UE in the RRC_INACTIVE state, according to the second modification of the first embodiment.

FIG. 15 to FIG. 17 are sequence diagrams illustrating operation in which the MgNB determines an SgNB, during communication with the UE in the RRC_INACTIVE state. FIG. 15 to FIG. 17 continue at the positions of boundary lines BL1516 and BL1617. FIG. 15 to FIG. 17 illustrate a case where the UE notifies the MgNB of a measurement result, by using small data that can be transmitted during the RRC_INACTIVE state. In FIG. 15 to FIG. 17, the UE restores to RRC_CONNECTED, based on generation of downlink data passing through the SgNB. The sequence illustrated in FIG. 15 to FIG. 17 includes the same steps as those of the sequences illustrated in FIG. 8 and FIG. 9 and FIG. 12 to FIG. 14. Thus, the same steps are denoted by the same step numbers, and common description is omitted.

Steps ST1101, ST1103, and ST1104 illustrated in FIG. 15 are similar to those of FIG. 12, and thus description thereof is omitted. FIG. 15 is different from FIG. 12 in that FIG. 15 omits SgNB determination in the UE, which is illustrated in Step ST1102 of FIG. 12.

Steps ST809 to ST812 of FIG. 15 are similar to those of FIG. 9, and thus description thereof is omitted.

In Step ST1202 illustrated in FIG. 15, the UE notifies the MgNB of a measurement result. In the example of FIG. 15, the notification is included in small data that can be transmitted during the RRC_INACTIVE state. Further, configuration concerning the measurement may be notified from the MgNB to the UE when the UE is in the RRC_CONNECTED state. In Step ST1203, the MgNB determines a target SgNB. In the determination, the measurement result notified from the UE in Step ST1202 may be used. The example of FIG. 15 to FIG. 17 illustrates a case where a T-SgNB is determined as the target SgNB.

Steps ST1109 to ST1113 of FIG. 16 are similar to those of FIG. 13, and thus description thereof is omitted.

In Step ST1204 illustrated in FIG. 16, a command to transition to RRC_CONNECTED is issued from the MgNB to the UE, in a similar manner to Step ST813 of the FIG. 13. The command of Step ST1204 includes information of the target SgNB determined by the MgNB. For example, the information of the target SgNB may be an identifier of the SgNB, or may be an identifier of a PSCell, such as a physical cell identifier. Based on Step ST1204, the UE recognizes that the target SgNB is the T-SgNB.

The sequence of Step ST816 in FIG. 16 and FIG. 17 and later is similar to that of FIG. 13 and FIG. 14, and thus description thereof is omitted.

Another solution is presented. Both a case where the MgNB determines an SgNB and a case where the UE determines an SgNB are provided. Information about an entity that determines an SgNB may be defined in a standard, the information may be notified from the MgNB to the UE, or the information may be notified from the higher NW device, such as the SMF or the AMF, to the MgNB and/or the UE.

As an example in which an entity that determines an SgNB is defined in a standard, presence/absence of MgNB mobility in the UE in the RRC_INACTIVE state may be used. For example, the UE may determine an SgNB when MgNB mobility occurs, or a target MgNB may determine an SgNB when MgNB mobility occurs. In the above, the UE may determine MgNB mobility.

When the UE determines an SgNB, for example, cell re-selection may be used. Alternatively, measurement configuration notified from the MgNB during the RRC_CONNECTED state may be used.

When determining an SgNB, for example, the UE may determine a cell that is detected first among cells satisfying a certain condition as the target MgNB, and may determine a cell that is detected second as the target SgNB. In this manner, for example, the UE can promptly determine the MgNB and the SgNB.

As another example, a cell with the most satisfactory condition may be determined as the MgNB, and a cell with the second most satisfactory condition may be determined as the SgNB. This can enhance reliability of communication. Alternatively, conversely, a cell with the most satisfactory condition may be determined as the SgNB, and a cell with the second most satisfactory condition may be determined as the MgNB. For example, this can enhance a transmission rate and reliability in U-Plane communication, when C-Plane communication is assigned for the MgNB and U-Plane communication is assigned for the SgNB.

When the MgNB determines an SgNB, for example, measurement configuration notified from the MgNB to the UE during the RRC_CONNECTED state may be used. Alternatively, measurement configuration used for cell re-selection may be used.

Figure 18:
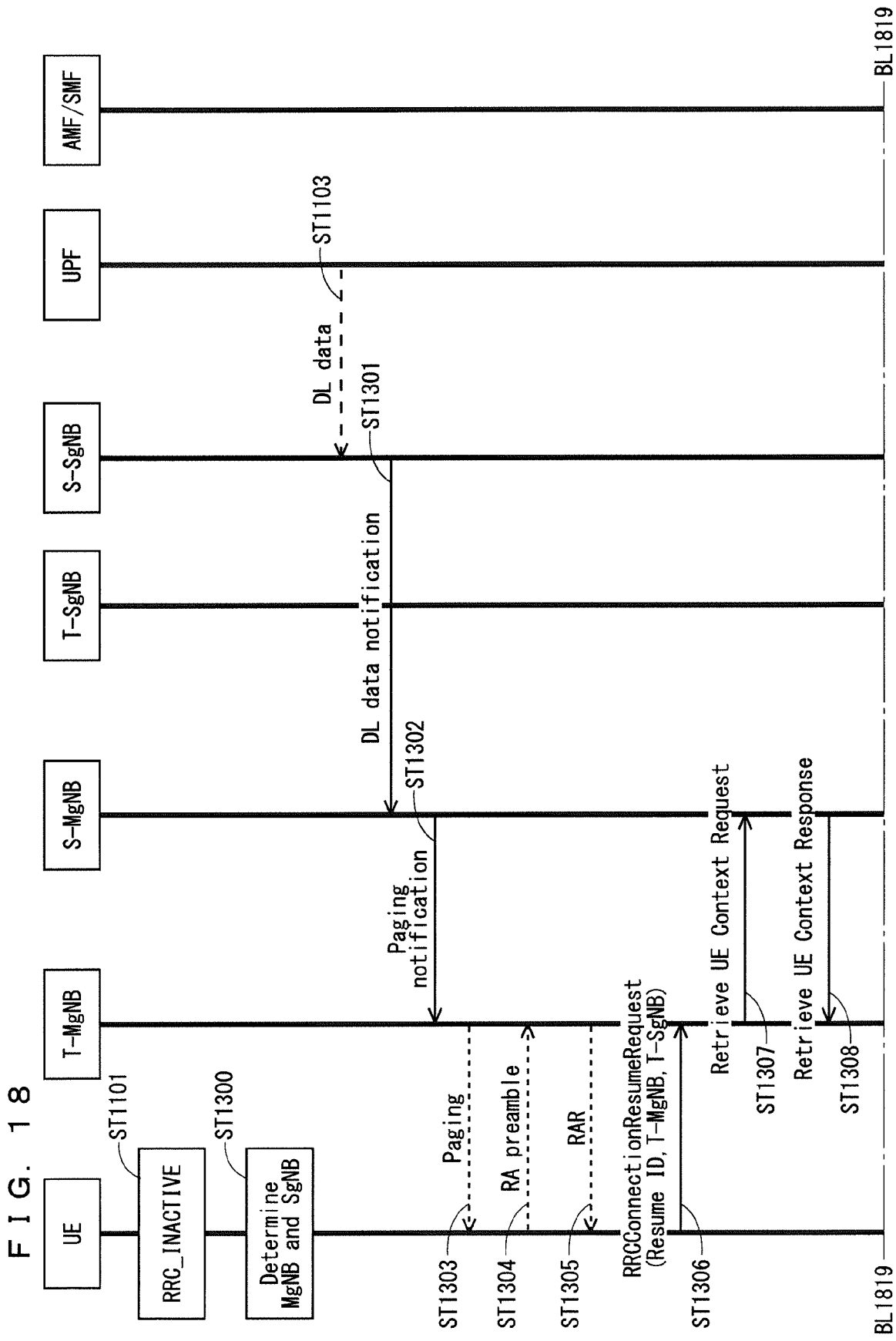
FIG. 18 is a sequence diagram illustrating operation in which the UE in the RRC_INACTIVE state determines a target MgNB and a target SgNB, according to the second modification of the first embodiment.
Figure 19:
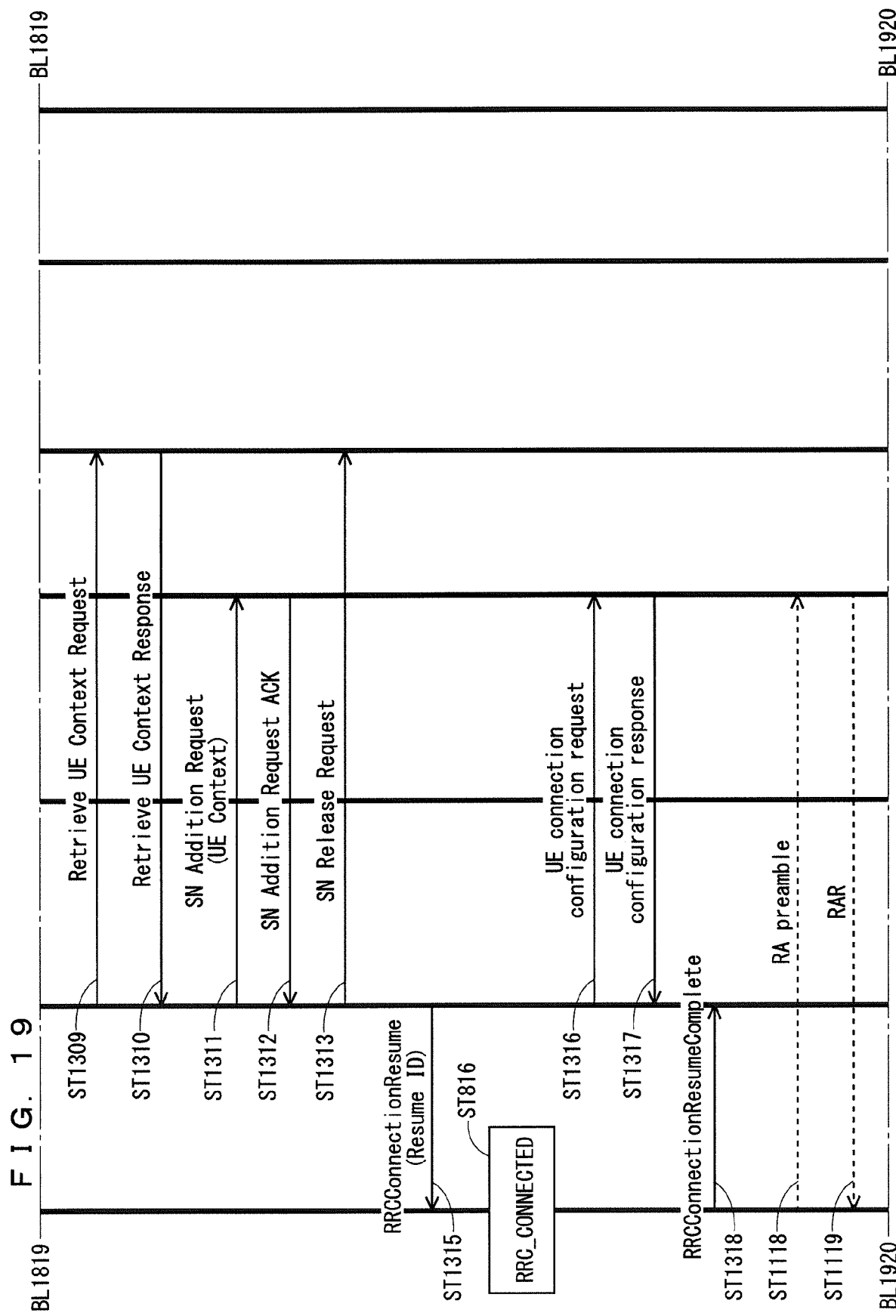
FIG. 19 is the sequence diagram illustrating operation in which the UE in the RRC_INACTIVE state determines a target MgNB and a target SgNB, according to the second modification of the first embodiment.
Figure 20:
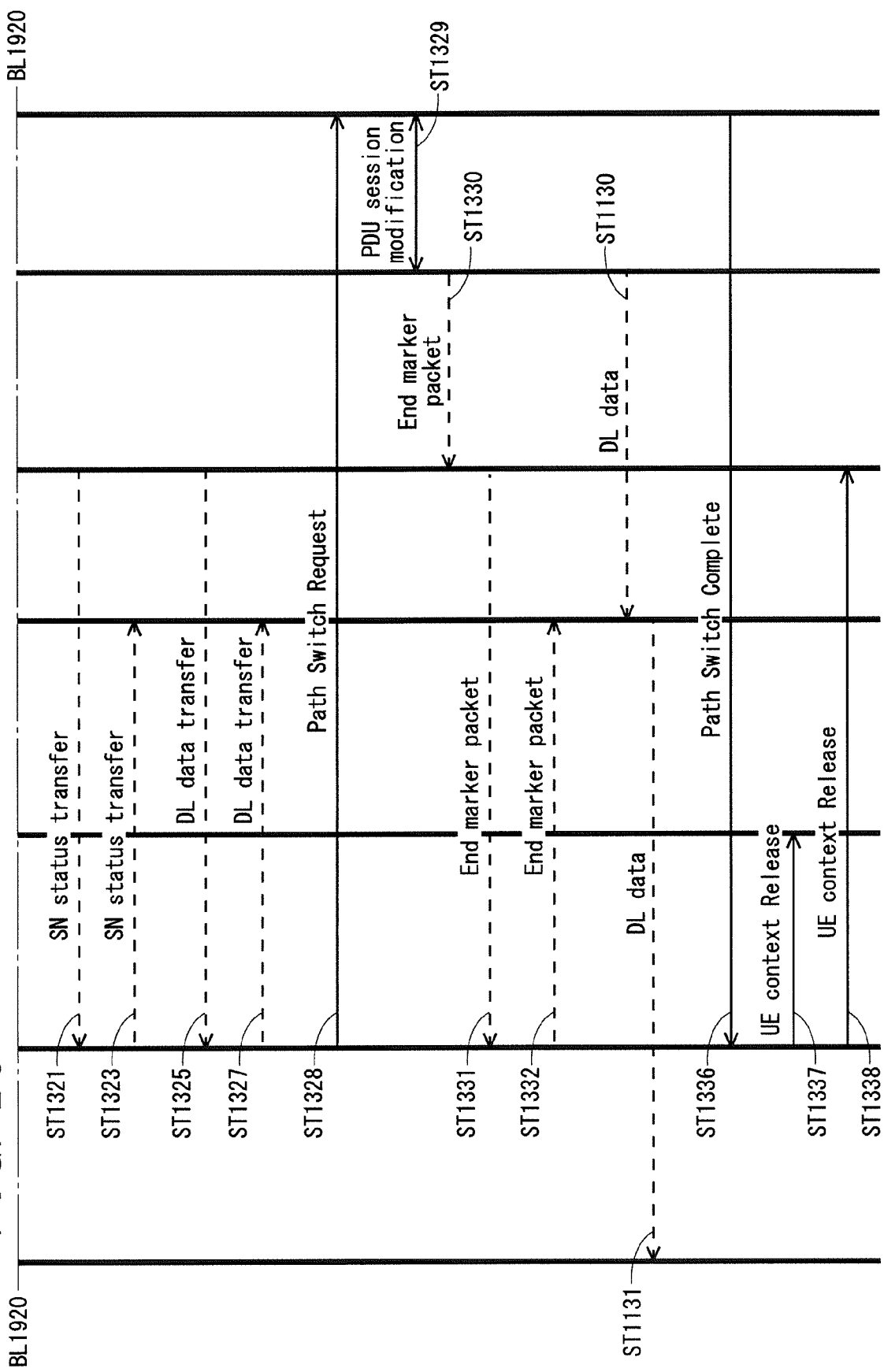
FIG. 20 is the sequence diagram illustrating operation in which the UE in the RRC_INACTIVE state determines a target MgNB and a target SgNB, according to the second modification of the first embodiment.

FIG. 18 to FIG. 20 are sequence diagrams illustrating operation in which the UE in the RRC_INACTIVE state determines a target MgNB and a target SgNB. FIG. 18 to FIG. 20 continue at the positions of boundary lines BL1819 and BL1920. The example of FIG. 18 to FIG. 20 illustrates a case where a source MgNB and a target MgNB are respectively represented as an S-MgNB and a T-MgNB, and a source SgNB and a target SgMB are respectively represented as an S-SgNB and a T-SgNB. In FIG. 18 to FIG. 20, the UE restores to RRC_CONNECTED, based on generation of downlink data passing through the SgNB. Further, in FIG. 18 to FIG. 20, the S-MgNB and the T-MgNB belong to the same RAN area. The sequence illustrated in FIG. 18 to FIG. 20 includes the same steps as those of the sequences illustrated in FIG. 8 and FIG. 9 and FIG. 12 to FIG. 14. Thus, the same steps are denoted by the same step numbers, and common description is omitted.

Steps ST1101 and ST1103 of FIG. 18 are similar to those of FIG. 12, and thus description thereof is omitted.

In Step ST1300 illustrated in FIG. 18, the UE determines a T-MgNB and a T-SgNB as the target MgNB and the target SgNB, respectively.

In Step ST1301 illustrated in FIG. 18, the S-SgNB notifies the S-MgNB of generation of downlink data. In Step ST1302, the S-MgNB notifies the T-MgNB belonging to the same RAN area of information of paging for the UE.

In Step ST1303 illustrated in FIG. 18, the T-MgNB transmits the paging to the UE, by using the information of the paging notified in Step ST1302. In Steps ST1304 and ST1305, the UE performs random access processing with the T-MgNB. The random access processing is similar to that of Step ST810 and Step ST811 illustrated in FIG. 9.

In Step ST1306 illustrated in FIG. 18, the UE notifies the T-MgNB of a request for restoration to the RRC_CONNECTED state. In Step ST1306, RRC connection resume request (RRCConnectionResumeRequest) signaling may be used, in a similar manner to Step ST812 of FIG. 9. Further, the notification of Step ST1306 may include information indicating the target MgNB and the target SgNB determined by the UE. In the example of FIG. 18, information of the T-MgNB and the T-SgNB is included.

Steps ST1307 and ST1308 illustrated in FIG. 18 illustrate transfer processing of a UE context concerning the MgNB. In Step ST1307, the T-MgNB transmits a request for a UE context to the S-MgNB. In Step ST1308, the S-MgNB transmits a UE context to the T-MgNB. In Step ST1307, the T-MgNB may include, in the request, information indicating a request for information for a master base station out of the UE context. In Step ST1308, the S-MgNB may transmit, to the T-MgNB, only information for a master base station out of the UE context. In this manner, for example, the signaling amount concerning UE context transmission can be reduced.

Steps ST1309 to ST1311 illustrated in FIG. 19 illustrate transfer processing of a UE context concerning the SgNB, and SgNB addition processing. The UE context is transferred from the S-SgNB to the T-SgNB, through the T-MgNB. In Steps ST1309 to ST1311, processing similar to Steps ST1109 to ST1111 illustrated in FIG. 13 is performed, respectively. In Step ST1312, the T-SgNB transmits, to the T-MgNB, a positive response for the secondary base station addition request. In Step ST1313, the T-MgNB transmits a secondary base station release request to the S-SgNB.

In Step ST1315 illustrated in FIG. 19, the T-MgNB transmits, to the UE, a command to transition to RRC_CONNECTED. The command may be similar to that of Step ST813 of FIG. 9.

In Step ST816 illustrated in FIG. 19, the UE transitions to RRC_CONNECTED. In Step ST1318, the UE notifies the T-MgNB that the UE has completed the transition to RRC_CONNECTED.

Steps ST1316 and ST1317 illustrated in FIG. 19 are the same as Steps ST814 and ST815 illustrated in FIG. 9, except that the MgNB is replaced by the T-MgNB and the SgNB is replaced by the T-SgNB.

Steps ST1118 and ST1119 of FIG. 19 are similar to those of FIG. 14, and thus description thereof is omitted.

Steps ST1321 to ST1327 illustrated in FIG. 20 are the same as Steps ST1120 to ST1124 illustrated in FIG. 14, except that the MgNB is replaced by the T-MgNB.

In the example of FIG. 20, in Steps ST1321 and ST1325, a PDCP sequence number reception/transmission state and a PDCP PDU are directly transferred from the S-SgNB to the T-MgNB, but those may be transferred through the S-MgNB. For example, this enables switching of both the MgNB and the SgNB even when connection between the S-SgNB and the T-MgNB is not established.

In Step ST1328 illustrated in FIG. 20, the T-MgNB transmits a communication path switch request (Path Switch Request) to the SMF. The request may include a PDU session switch request in the MgNB and the SgNB. In Step ST1329, communication path switch is performed between the SMF and the UPF. PDU session switch in the MgNB and the SgNB may be performed. Further, in Steps ST1328 and ST1329, an AMF may be used instead of the SMF.

Steps ST1330 to ST1332 illustrated in FIG. 20 are the same as Steps ST1127 to ST1129 illustrated in FIG. 14, except that the MgNB is replaced by the T-MgNB. In Step ST1331, data may be transferred through the S-MgNB, in a similar manner to Steps ST1321 and ST1325.

Steps ST1130 and ST1131 of FIG. 20 are similar to those of FIG. 14, and thus description thereof is omitted.

In Step ST1336 illustrated in FIG. 20, the SMF notifies the T-MgNB of communication path switch complete (Path Switch Complete). In Step ST1337, the T-MgNB transmits, to the S-MgNB, a command to release the UE context for the MgNB. In Step ST1338, the T-MgNB transmits, to the S-SgNB, a command to release the UE context for the SgNB.

Step ST1338 illustrated in FIG. 20 illustrates an example in which the release of the UE context for the SgNB is notified from the T-MgNB, but may be notified through the S-MgNB. Alternatively, the S-MgNB may notify the S-SgNB of the command to release the UE context for the SgNB. In Step ST1337, the T-MgNB may include, for the S-MgNB, a command to release the UE context for the SgNB. This can reduce the signaling amount of an interface between the base stations.

Another solution is presented. The higher NW device determines an SgNB. The higher NW device may be an AMF, or may be an SMF. The higher NW device notifies the MgNB of information of the determined SgNB. The MgNB notifies the UE of the information of the SgNB.

The higher NW device may determine an SgNB by using a load condition of a gNB served by the higher NW device. For example, the load condition may be a load of an interface between base stations, may be a processing load, may be a radio resource load, may be the number of accommodated UEs, or may be a combination of the above pieces of information. In this manner, for example, an SgNB can be determined depending on a load condition of a gNB, and therefore the communication system can be optimized.

The MgNB and/or the SgNB may notify an eNB/gNB in a RAN area related to paging of the UE AS context in advance. In the above notification, a method similar to that of the first embodiment may be used. In this manner, for example, communication can be promptly started after paging, when UE mobility occurs.

Alternatively, the eNB/gNB may make an inquiry about the UE AS context to another eNB/gNB in the RAN area related to the paging. The inquiry may be made at the time of random access processing between the UE and the eNB/gNB. The above "another eNB/gNB" may notify the eNB/gNB of the UE AS context. The above UE AS context may include information of either the MgNB or the SgNB, or may include information of both the MgNB and the SgNB. This can reduce the signaling amount of an interface between the base stations.

By using the second modification, SgNB mobility can be performed in the UE in the RRC_INACTIVE state.

Second Embodiment

The UE having DC configuration transmits small data to the MgNB, during the RRC_INACTIVE state. The MgNB may change bearer configuration when the UE transitions to RRC_INACTIVE. For example, the change of the bearer configuration may be a change from the SCG bearer to the MCG bearer. As another example, the change may be a change from the SCG bearer to the SCG split bearer. In this manner, data that has been using the SCG bearer before the bearer change can also be communicated with low latency, by means of small data transmission.

When the above method is employed, the following problems occur. Specifically, the signaling amount is increased between the MgNB and the SgNB, because the bearer configuration is changed when the UE transitions to RRC_INACTIVE.

Solutions to the above problems are disclosed below.

The UE transmits small data to the SgNB. The UE may transmit small data to the MgNB. Specifically, the DC configuration may be employed also in small data transmission in RRC_INACTIVE. In this manner, the need for the bearer change between the MgNB and the SgNB is obviated, and therefore the signaling amount of an interface between the base stations can be reduced.

The small data may be data of the SCG bearer, may be data of the SCG split bearer, may be data of the MCG split bearer, or may be MCG data. For example, when small data of the MCG split bearer is transmitted to the SgNB, small data transmission can be promptly performed even when a radio channel condition between the UE and the MgNB is deteriorated.

The UE may determine a transmission target base station, based on information of the bearer through which the small data passes. For example, small data using the MCG bearer or the MCG split bearer may be transmitted to the MgNB. Small data using the SCG bearer or the SCG split bearer may be transmitted to the SgNB. For example, this obviates the need for conduction of an interface between the base stations, and therefore small data notification from the UE to the higher NW device can be promptly performed.

In the above, the UE may determine a transmission target base station, based on information of a measurement result of a downlink signal. For example, if a measurement result of the SgNB is more satisfactory than that of the MgNB, the UE may transmit small data using the MCG split bearer or the SCG split bearer to the SgNB. For example, the above downlink signal may be a synchronization signal (SS). Further, for example, information of the measurement result may be RSRP, or may be RSRQ. In this manner, the UE performs small data communication by using a base station having satisfactory communication quality, and therefore reliability of communication can be enhanced.

In the above, the UE may determine a transmission target base station, based on a combination of information of the bearer through which the small data passes and information of the measurement result of the downlink signal. For example, small data using the MCG bearer may be transmitted to the MgNB. Small data using the SCG bearer may be transmitted to the SgNB. The UE may determine a transmission target of small data using the MCG split bearer or the SCG split bearer, based on information of the measurement result of the downlink signal. In this manner, both of prompt small data notification and reliability enhancement can be achieved at the same time.

In small data transmission from the UE to the SgNB, the UE may transmit a random access preamble to the SgNB. The SgNB may transmit a random access response to the UE. The above random access response may be transmitted after transmission of the random access preamble from the UE to the SgNB.

The UE may transmit a request for restoration to RRC_CONNECTED to the SgNB. The request may be transmitted after transmission of the random access response from the SgNB to the UE.

The UE may include, in the request, an identifier used for restoration to RRC_CONNECTED, such as a resume ID. Further, the UE may include, in the request, information indicating the MgNB, such as an identifier of the MgNB. In this manner, for example, malfunction due to an overlap of numbers with a resume ID issued by an SgNB as a master base station for another UE can be prevented. As another example, the UE may include, in the request, an identifier of the UE. In this manner, for example, an effect similar to the above can be produced.

The SgNB may make an inquiry to the MgNB about the identifier used for restoration. The inquiry may include an identifier of the UE.

The MgNB may notify the SgNB of the identifier used for restoration. The notification may include information indicating the MgNB. Alternatively, the notification may include an identifier of the UE. The notification may be performed after the inquiry made from the SgNB to the MgNB, or may be performed in advance. The above notification performed in advance may be included in a UE connection stop notification transmitted from the MgNB to the SgNB, or may be notified as separate signaling. The MgNB may notify the SgNB of the identifier used for restoration.

The SgNB may hold information of the identifier used for restoration. The SgNB may hold the information of the identifier used for restoration, in combination with the information indicating the MgNB or in combination with the identifier of the UE. In this manner, for example, malfunction due to an overlap of numbers with a resume ID issued by an SgNB as a master base station for another UE can be prevented.

The UE may transmit small data to the SgNB. The transmission may be performed after restoration to RRC_CONNECTED performed by the UE for the SgNB. The small data may be data passing through the SCG bearer, may be data passing through the SCG split bearer, or may be a bearer passing through the MCG split bearer.

The SgNB may notify the UE of a response for a request for restoration to RRC_CONNECTED. The response may be a command that the UE maintain the RRC_INAVTIVE state. The response may include an identifier used for restoration to RRC_CONNECTED, may include information indicating the MgNB, or may include an identifier of the UE.

The SgNB need not notify the UE of a response for a request for restoration to RRC_CONNECTED. Instead of the response, the SgNB may notify a response for the small data.

The identifier used for restoration to RRC_CONNECTED, such as a resume ID, may include information indicating the MgNB. For example, a part of the resume ID may be the same as the ID of the MgNB. In this manner, for example, a unique identifier is used for restoration among gNBs, and therefore control performed by the MgNB and the SgNB is facilitated.

Figure 21:
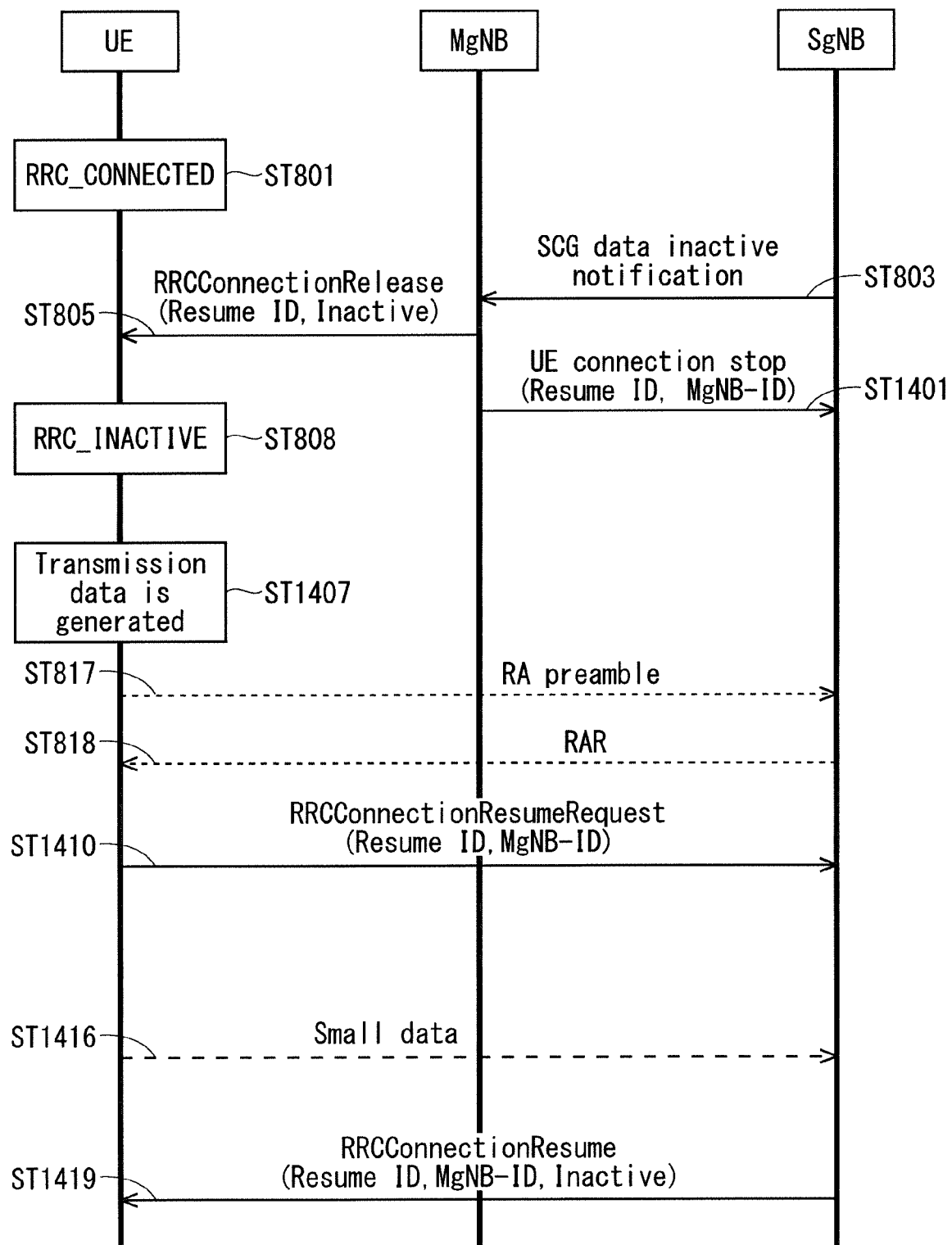
FIG. 21 is a sequence diagram illustrating small data transmission from the UE to the SgNB, according to a second embodiment.

FIG. 21 is a sequence diagram illustrating operation when the UE transmits small data to the SgNB. The sequence illustrated in FIG. 21 includes the same steps as those of the sequence illustrated in FIG. 8 and FIG. 9. Thus, the same steps are denoted by the same step numbers, and common description is omitted.

Steps ST801, ST803, ST805, and ST808 of FIG. 21 are similar to those of FIG. 8, and thus description thereof is omitted.

In Step ST1401 illustrated in FIG. 21, the MgNB notifies the SgNB of UE connection stop. The notification includes a resume ID and an ID of the MgNB. As another example, a resume ID that partially includes the ID of the MgNB may be included. The SgNB holds the resume ID and the ID of the MgNB.

In Step ST1407 illustrated in FIG. 21, uplink transmission data from the UE to the SgNB is generated. In Steps ST817 and ST818 illustrated in FIG. 21, the UE performs random access processing with the SgNB. Steps ST817 and ST818 of FIG. 21 are similar to those of FIG. 9.

In Step ST1410 of FIG. 21, the UE transmits a request for restoration to RRC_CONNECTED to the SgNB. The request may include the resume ID, or may include the identifier of the MgNB.

In Step ST1416 of FIG. 21, the UE performs small data transmission to the SgNB. The small data may be data passing through the SCG bearer, may be data passing through the SCG split bearer, or may be a bearer passing through the MCG split bearer.

In Step ST1419 illustrated in FIG. 21, the SgNB notifies the UE of a command to maintain the RRC_INACTIVE state. The command may include the resume ID, or may include the identifier of the MgNB.

The UE may transmit small data to both the MgNB and the SgNB. For example, the UE may transmit small data using the MCG bearer or the MCG split bearer to the MgNB. The UE may transmit small data using the SCG bearer or the SCG split bearer to the SgNB.

Figure 22:
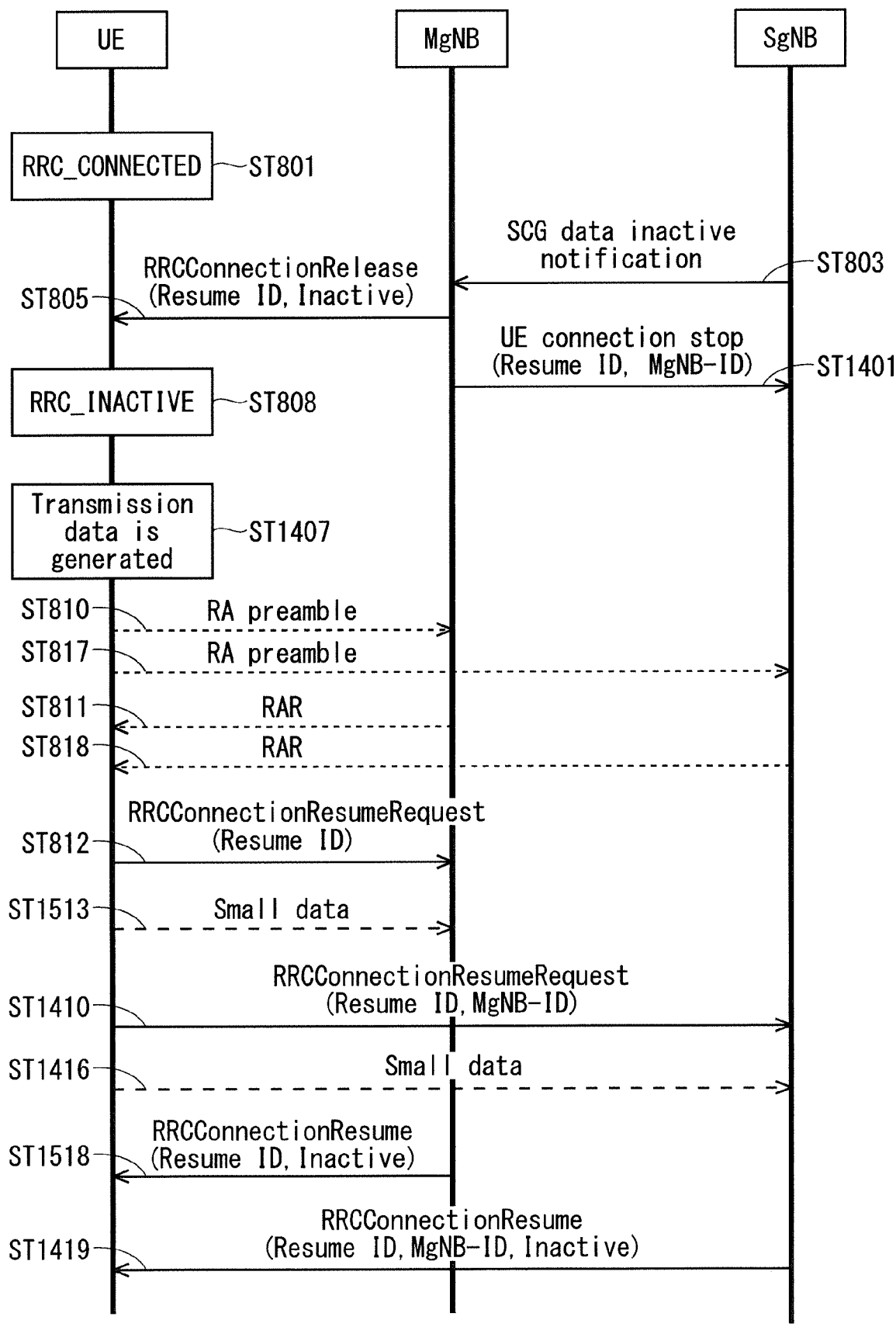
FIG. 22 is a sequence diagram illustrating small data transmission from the UE to the MgNB and the SgNB, according to the second embodiment.

FIG. 22 is a sequence diagram illustrating operation when the UE transmits small data to the MgNB and the SgNB. The sequence illustrated in FIG. 22 includes the same steps as those of the sequences illustrated in FIG. 8 and FIG. 9 and FIG. 21. Thus, the same steps are denoted by the same step numbers, and common description is omitted.

The sequence from Step ST801 to ST1407 of FIG. 22 is similar to that of FIG. 21, and thus description thereof is omitted.

In Steps ST810 and ST811 illustrated in FIG. 22, the UE performs random access processing with the MgNB. In Steps ST817 and ST818, the UE performs random access processing with the SgNB. Steps ST810, ST811, ST817, and ST818 of FIG. 22 are similar to those of FIG. 9.

Step ST812 of FIG. 22 is similar to that of FIG. 9. In Step ST1513, the UE transmits small data to the MgNB. The small data may be data passing through the MCG bearer, may be data passing through the MCG split bearer, or may be a bearer passing through the SCG split bearer.

In Step ST1410 of FIG. 22, the UE transmits a request for restoration to RRC_CONNECTED to the SgNB. The request may include a resume ID, or may include an identifier of the MgNB. The request may include both. The request may include a resume ID that partially includes the identifier of the MgNB.

In Step ST1416 of FIG. 22, the UE performs small data transmission to the SgNB. The small data may be data passing through the SCG bearer, may be data passing through the SCG split bearer, or may be a bearer passing through the MCG split bearer.

In Step ST1518 illustrated in FIG. 22, the MgNB notifies the UE of a command to maintain the RRC_INACTIVE state. The command may include the resume ID.

In Step ST1419 illustrated in FIG. 22, the SgNB notifies the UE of a command to maintain the RRC_INACTIVE state. The command may include the resume ID or may include the identifier of the MgNB.

FIG. 21 and FIG. 22 illustrate an example in which the UE maintains the RRC_INACTIVE state, but the UE may transition to RRC_CONNECTED. In transition of the UE to RRC_CONNECTED, the sequence illustrated in the first embodiment may be employed.

By using the second embodiment, small data transmission to the SgNB is enabled. As a result, the need for the bearer change during RRC_INACTIVE transition is obviated, and therefore the signaling amount of an interface between the base stations can be reduced.

According to the second embodiment, the following configuration is provided, for example.

Provided is a communication system including: a communication terminal device; and a plurality of base station devices configured to perform radio communication with the communication terminal device. More specifically, the plurality of base station devices include a master base station device and a secondary base station device that are configured to provide at least one bearer for the communication terminal device. The communication terminal device being in an RRC_INACTIVE state performs random access processing with the secondary base station device, transmits a request to the secondary base station device for restoration to an RRC_CONNECTED state after the random access processing, and transmits uplink data to the secondary base station device as small data that can be transmitted during the RRC_INACTIVE state before the communication terminal device restores to the RRC_CONNECTED state.

Note that, in this configuration, the communication terminal device in the RRC_INACTIVE state may perform random access processing with the master base station device, may transmit a request to the master base station device for restoration to the RRC_CONNECTED state after the random access processing, and may transmit uplink data to the master base station device as the small data before the communication terminal device restores to the RRC_CONNECTED state.

The above configuration can be variously modified based on the disclosure and the suggestion of the Description including the second embodiment. The above configuration and its modified configuration can solve the above problems, and can produce the above effects.

First Modification of Second Embodiment

As a method of communication requiring low latency and high reliability, packet duplication may be used. As a method of packet duplication, the DC configuration may be used or the CA configuration may be used.

When the above method is employed for communication that is not frequently used but requires low latency and high reliability, such as emergency communication in the event of an earthquake etc. and an emergency control signal used in automated driving etc., the following problems occur. In such low-frequency communication, the UE transitions to the RRC_INACTIVE state. However, how packet duplication in the RRC_INACTIVE state is performed has not been disclosed. As a result, there is a problem that communication that is not frequently used but requires low latency and high reliability cannot be implemented.

Solutions to the above problems are disclosed below.

Packet duplication is employed for small data transmission that can be performed by the UE in the RRC_INACTIVE state.

The DC configuration may be used for the above packet duplication for small data. The configuration may be a configuration similar to that of the second embodiment.

For the UE and the SgNB, the MgNB may perform configuration for performing packet duplication. For example, the above configuration may be included in configuration of the DC configuration and may be collectively performed. In this manner, for example, configuration of packet duplication at the time of small data transmission can be omitted, and therefore small data transmission can be promptly started.

In the above, a default operation/stop state of the packet duplication may be set to "operate". In this manner, for example, small data transmission can be promptly started.

The UE may perform random access processing with both the MgNB and the SgNB. The random access processing performed by the UE with the SgNB may be performed after receiving a random access response from the MgNB, or may be performed before receiving a random response access from the MgNB. Transmission of a random access preamble from the UE to the SgNB may be performed before transmission of a random access preamble from the UE to the MgNB. The random access processing may be performed when uplink transmission data is generated.

Figure 23:
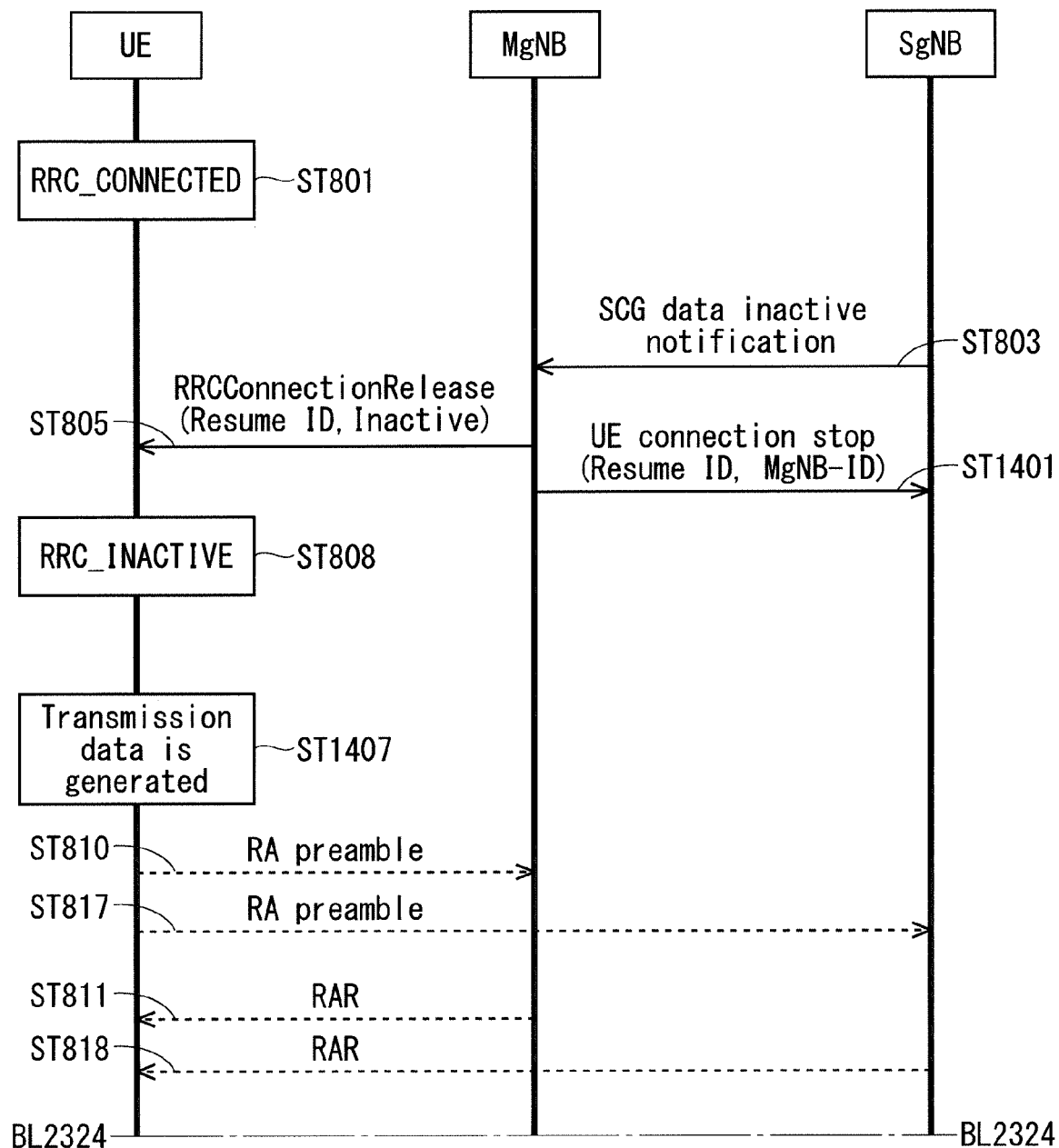
FIG. 23 is a sequence diagram illustrating operation when DC is used for packet duplication for small data, according to a first modification of the second embodiment.
Figure 24:
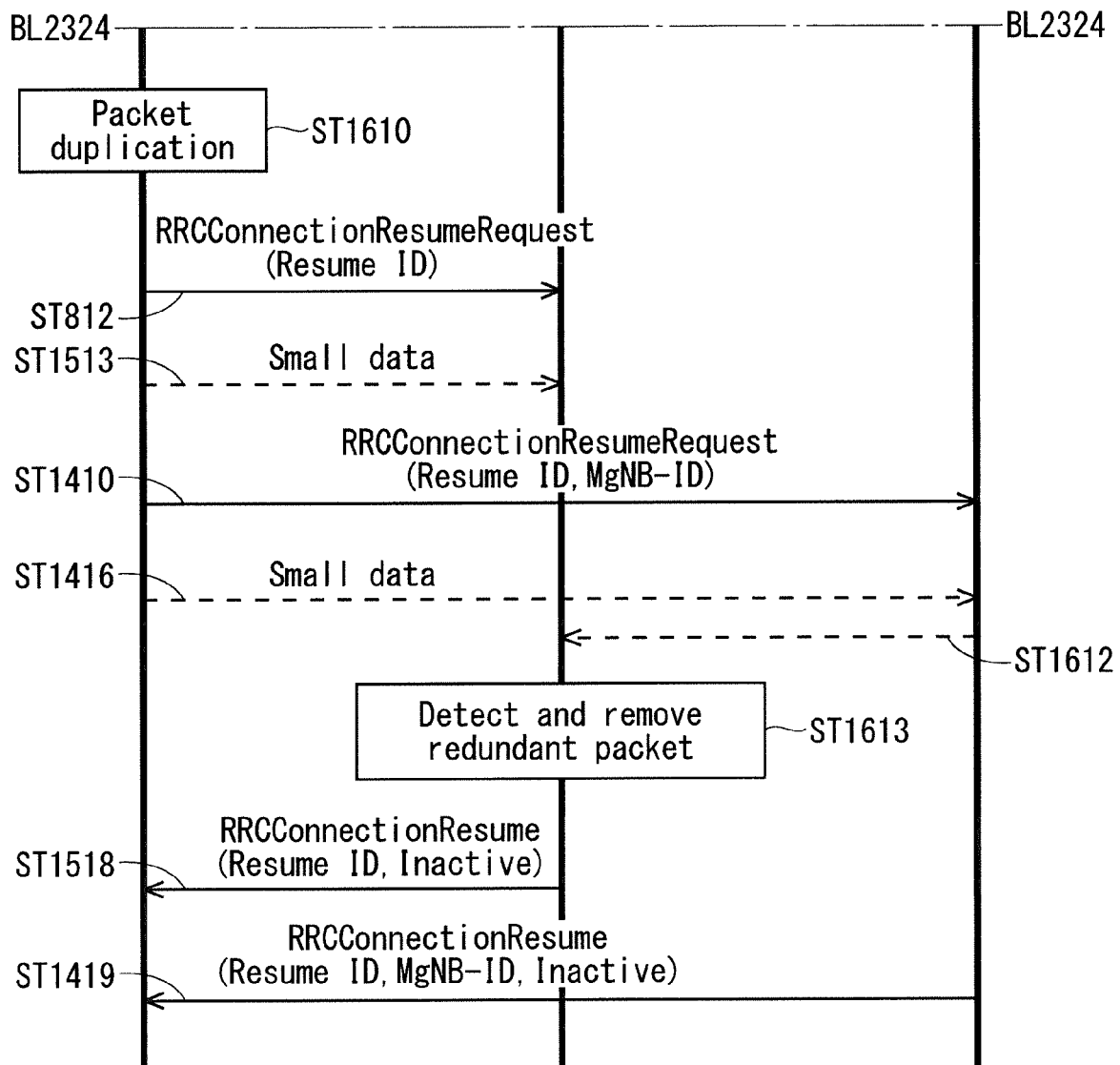
FIG. 24 is the sequence diagram illustrating operation when DC is used for packet duplication for small data, according to the first modification of the second embodiment.

FIG. 23 and FIG. 24 are sequence diagrams illustrating operation when DC is used for packet duplication for small data. FIG. 23 and FIG. 24 continue at the position of a boundary line BL2324. In FIG. 23 and FIG. 24, packet duplication is performed by using the MCG split bearer. The sequence illustrated in FIG. 23 and FIG. 24 includes the same steps as those of the sequences illustrated in FIG. 8 and FIG. 9, FIG. 21, and FIG. 22. Thus, the same steps are denoted by the same step numbers, and common description is omitted.

The steps from Step ST801 to ST818 of FIG. 23 are similar to those of FIG. 22, and thus description thereof is omitted.

In Step ST1610 illustrated in FIG. 24, the UE performs packet duplication for uplink transmission data.

The steps from Step ST812 to ST1410 of FIG. 24 are similar to those of FIG. 22, and thus description thereof is omitted.

In Step ST1416 illustrated in FIG. 24, the UE transmits, to the SgNB, remaining packets not transmitted in Step ST1513 among the packets duplicated in Step ST1610, as small data. In Step ST1612, the SgNB transfers, to the MgNB, the uplink transmission data received from the UE in Step ST1416. In Step ST1613, the MgNB detects redundancy of the uplink transmission data, and removes and deletes one piece of the redundant uplink transmission data.

Steps ST1518 and ST1419 of FIG. 24 are the same as those of FIG. 22, and thus description thereof is omitted.

The CA configuration may be used for packet duplication for small data. The UE and the gNB may hold information about connection between the terminal and the base station, such as a UE AS context. The UE AS context may be held when the UE transitions to the RRC_INACTIVE state.

As with the case of the packet duplication using the DC configuration, the gNB may notify an eNB/gNB in a RAN area related to paging of the UE AS context in advance, and the eNB/gNB may make an inquiry about the UE AS context to another eNB/gNB in the RAN area related to the paging.

The base station may perform configuration for performing packet duplication to the UE. For example, the above configuration may be included in configuration of the CA configuration for the UE, and may be collectively performed. For example, the above configuration may be included in RRC connection reconfiguration signaling for the UE. In this manner, for example, configuration of packet duplication at the time of small data transmission can be omitted, and therefore small data transmission can be promptly started.

In the above, a default operation/stop state of the packet duplication may be set to "operate". In this manner, for example, small data transmission can be promptly started.

The UE may perform random access processing with both the PCell and the SCell of the gNB. The random access processing performed by the UE with the SCell may be performed after receiving a random access response from the PCell, or may be performed before receiving a random response access from the PCell. Transmission of a random access preamble from the UE to the SCell may be performed before transmission of a random access preamble from the UE to the PCell. In this manner, data transmission using the SCell can be promptly performed. Alternatively, those may be performed at different timings. The random access processing may be performed when uplink transmission data is generated.

Figure 25:
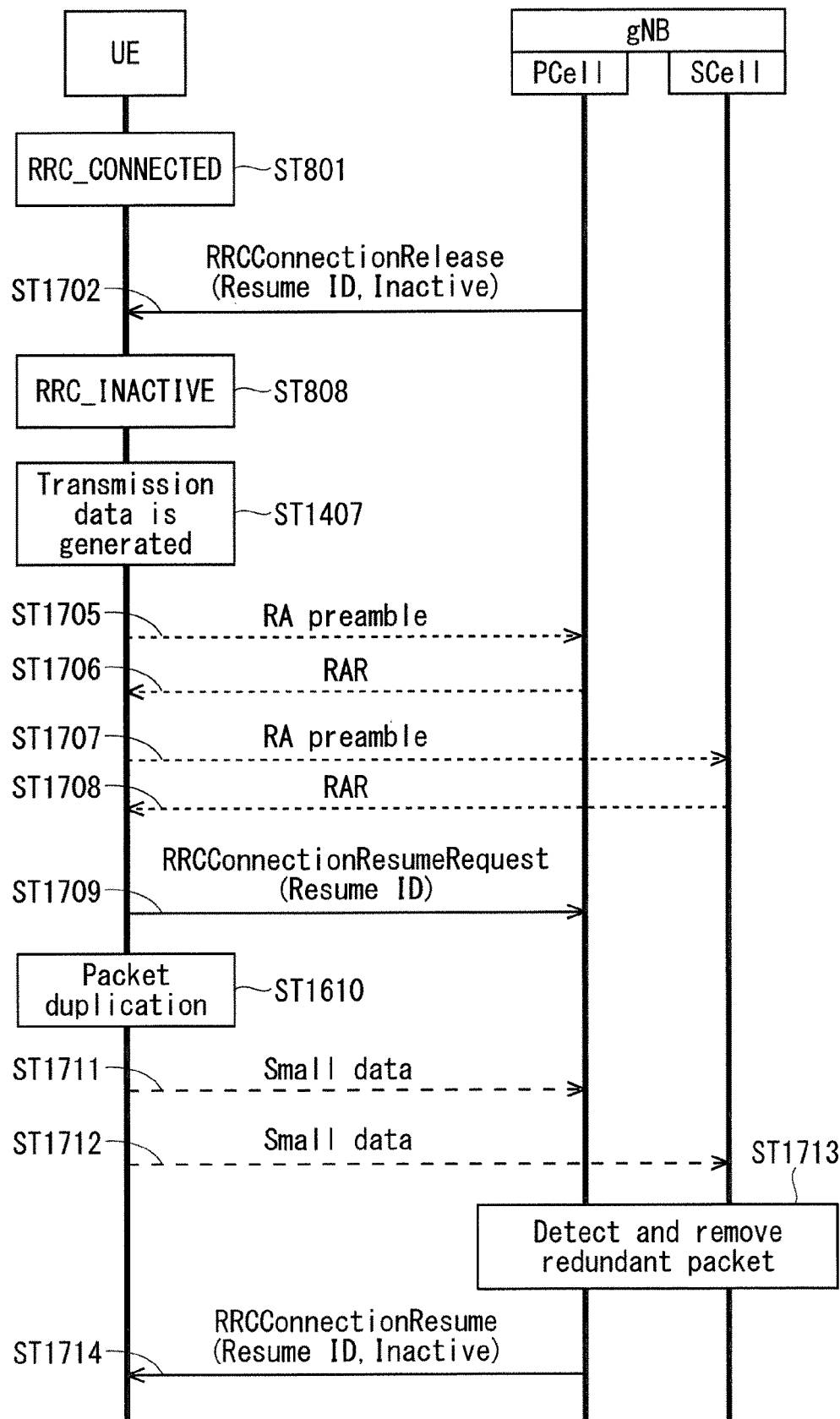
FIG. 25 is a sequence diagram illustrating operation when CA is used for packet duplication for small data, according to the first modification of the second embodiment.

FIG. 25 is a sequence diagram illustrating operation when CA is used for packet duplication for small data. In the example of FIG. 25, packet duplication is performed by using the PCell and the SCell. Further, in the example of FIG. 25, the gNB transmits signaling for the UE by using the PCell. The sequence illustrated in FIG. 25 includes the same steps as those of the sequences illustrated in FIG. 8 and FIG. 9 and FIG. 21. Thus, the same steps are denoted by the same step numbers, and common description is omitted.

Step ST801 of FIG. 25 is similar to that of FIG. 8, and thus description thereof is omitted.

In Step ST1702 illustrated in FIG. 25, the gNB issues a command of RRC_INACTIVE transition to the UE, through the PCell. The command may be similar to that of Step ST805 of FIG. 8.

Steps ST808 and ST1407 of FIG. 25 are similar to those of FIG. 21, and thus description thereof is omitted.

In Steps ST1705 and ST1706 illustrated in FIG. 25, the UE performs random access processing with the PCell, and in Steps ST1707 and ST1708, the UE performs random access processing with the SCell.

In Step ST1709 of FIG. 25, the UE transmits a request for RRC connection resume to the gNB, through the PCell. The request may be similar to that of Step ST812 of FIG. 9.

In Step ST1610 illustrated in FIG. 25, the UE performs the packet duplication for the uplink transmission data. In Step ST1711, the UE transmits one piece of the duplicated uplink transmission data to the gNB as small data, through the PCell. In Step ST1712, the UE transmits the other piece of the duplicated uplink transmission data to the gNB as small data, through the SCell. In Step ST1713, the gNB detects reduncdancy of the uplink transmission data, and removes one piece of the redundant uplink transmission data.

In Step ST1714 illustrated in FIG. 25, the MgNB notifies the UE of a command to maintain the RRC_INACTIVE state. In Step ST1714, the command may be a command to transition to the RRC_CONNECTED state.

According to the first modification, communication that is not frequently used but requires low latency and high reliability can be implemented.

Third Embodiment

For a UE mounted on an unmanned aerial vehicle, transmission power control different from that for a ground terminal is employed. For example, for the UAV-UE, a limitation may be set to maximum transmission power. As another example, different transmission power may be set for a Target-SIR ground terminal and the UAV-UE. This can reduce uplink interference from the UAV-UE to the base station.

When the above method is employed, the following problems occur. Specifically, the above transmission power control reduces even the transmission power for a serving cell, and therefore reception quality of a signal transmitted from the UAV-UE to the serving cell is deteriorated.

Solutions to the above problems are disclosed below.

Repetition is employed for uplink transmission.

The repetition may be performed when the above transmission power reduction method is employed. In this manner, for example, uplink interference power can be reduced, and at the same time, reliability of uplink transmission can be secured.

An example of a case where the above transmission power reduction method is employed may be a difference whether a UE is a UAV-UE or a normal UE. For example, the transmission power reduction method may be employed for a UAV-UE.

Another example may be a difference whether a UE is a UE in a ground mode or a UE in a flight mode. For example, the transmission power reduction method may be employed for a UE in a flight mode. The UE may be a UAV-UE, or may be a normal UE.

As another example, whether the transmission power reduction method is employed may be determined based on information of an altitude of a UE. For example, when an altitude of a UE is high, the transmission power reduction method may be employed. The UE may be a UAV-UE, or may be a normal UE.

As another example, whether the transmission power reduction method is employed may be determined based on information of a reception interference level of a base station. For example, the transmission power reduction method may be employed for a UE, in communication with a base station with a high reception interference level. The UE may be a UAV-UE, or may be a normal UE.

In the uplink transmission, as an example of a channel and/or a signal to which repetition is employed, the following (1) to (5) are disclosed.
(1) PUSCH
(2) PUCCH
(3) PRACH
(4) RS
(5) Combination of the above (1) to (4)

The above RS in (4) may be a DMRS, may be an SRS, or may be both. Repetition of the SRS may be repetition in which an SRS transmission cycle is shortened, or may be repetition in which a symbol for repetition transmission is newly added.

The UAV-UE may perform frequency hopping for each repetition to perform transmission to the base station. The UAV-UE may change RBs for an uplink transmission signal for each repetition number.

Regarding the above frequency hopping, the UAV-UE may perform frequency hopping for each repetition to perform transmission to the base station. A pattern of the hopping may be given for each cell. For example, the pattern of the hopping may be given based on a cell ID, such as a PCI.

As an example of the above frequency hopping, an offset may be set for RBs to be transmitted by the UAV-UE, for each repetition. The offset may be given for each cell. For example, the offset may be determined based on a cell ID, such as a PCI.

FIG. 26 is a pattern diagram illustrating an example in which frequency hopping patterns different for each cell are given to the UAV-UE. FIG. 26 illustrates an example of a PUSCH. Further, FIG. 26 illustrates an example in which repetition of uplink transmission from the UAV-UE is performed three times.

An example using Cell #1 of FIG. 26 is described. In the initial transmission of a PUSCH, the UAV-UE performs transmission to the base station by using an RB 1801. In the first retransmission, the UAV-UE performs transmission to the base station by using an RB 1802, which is one RB higher in the frequency direction than the initial transmission. Also in the second and third retransmissions, in a similar manner, the UAV-UE performs transmission to the base station by using an RB 1803 and an RB 1804, which are each one RB higher in the frequency direction than the respective first and second retransmissions.

An example using Cell #2 of FIG. 26 is described. In the initial transmission of a PUSCH, the UAV-UE performs transmission to the base station by using an RB 1811. In the first retransmission, the UAV-UE performs transmission to the base station by using an RB 1812, which is two RBs higher in the frequency direction than the initial transmission. Also in the second and third retransmissions, in a similar manner, the UAV-UE performs transmission to the base station by using an RB 1813 and an RB 1814, which are each two RBs higher in the frequency direction than the respective first and second retransmissions.

FIG. 26 illustrates an example in which a frequency domain used for each uplink transmission is one RB, but the frequency domain may be a plurality of RBs. The plurality of RBs may be consecutive in the frequency direction, or a non-consecutive frequency domain, e.g., an intermittent frequency domain, may be used.

FIG. 26 illustrates an example in which the frequency domain used for each uplink transmission is given by using an offset in the frequency direction, but the frequency domain may be given based on an accumulation of offsets in the frequency direction and a residue of the entire frequency domain that are available for the UAV-UE. For example, in the example of FIG. 26, it is assumed that the frequency domain allocated for the PUSCH used by the UAV-UE is 10 RBs, and a frequency offset of each time is 7 RBs. In this case, the initial transmission may be performed by using the lowest RB in the frequency direction, the first retransmission may be performed by using the eighth lowest RB, the second retransmission may be performed by using the fifth lowest RB, and the third retransmission may be performed by using the second lowest RB. In this manner, for example, the number of patterns of frequency hopping can be increased, and therefore the number of accommodated UAV-UEs can be increased.

As another example, the pattern of the hopping may be given for each UAV-UE. In this manner, for example, a frequency pattern different from that for other UAV-UEs can be used. As a result, for example, uplink interference power in the base station can be reduced.

The base station may notify the UE of a pattern of frequency hopping. For example, L1/L2 signaling may be used for the notification. In this manner, for example, the base station can perform prompt frequency resource allocation. As another example, MAC signaling may be used. In this manner, for example, high-reliability notification can be performed by means of HARQ retransmission. As another example, RRC signaling may be used. In this manner, for example, a large amount of information can be notified.

Regarding the notification, the base station may transmit a notification of the hopping pattern in each repetition. This enables flexible scheduling in the base station. Alternatively, the frequency hopping pattern for the initial transmission and repetition may be collectively notified. In this manner, complexity of processing of the UE can be avoided.

The base station may broadcast a pattern of frequency hopping to UEs served by the base station. In this manner, for example, the signaling amount can be reduced.

As another example, the hopping pattern may be given in a standard in advance. For example, the hopping pattern may be determined by using an identifier of the UE. In this manner, for example, the signaling amount between the base station and the UAV-UE can be reduced.

The third embodiment discloses a case of uplink communication, but may be employed in downlink communication. In this manner, for example, downlink interference power from the base station to the UAV-UE can be reduced. Further, reliability of downlink communication can be secured.

For example, in the above downlink communication, a PDSCH may be used. The base station may perform repetition of a PDSCH, for the UAV-UE. Frequency hopping may be performed.

As another example, in the above downlink communication, a PDCCH may be used. The base station may perform repetition of DCI included in a PDCCH to the UAV-UE.

As another example, in the above downlink communication, an E-PDCCH may be used. The base station may perform repetition of an E-PDCCH to the UAV-UE. Frequency hopping may be performed.

The third embodiment illustrates a case of a UAV-UE, but may be employed for a normal UE. For example, the methods illustrated in the third embodiment may also be employed for a normal UE, using information indicating a high altitude of a UE. In this manner, for example, interference power can be reduced and reception quality can be secured as with the case of the UAV-UE, even when a normal UE is mounted on a UAV to be flown.

According to the third embodiment, received signal power can be increased in the base station and/or the UAV-UE, by means of repetition. Further, by using frequency resources different from those for other UAV-UEs by means of frequency hopping, uplink and/or downlink interference power can be reduced. In this manner, reception quality of communication between the base station and the UAV-UE can be enhanced.

According to the third embodiment, the following configuration is provided, for example.

Provided is a communication system including: a communication terminal device; and a plurality of base station devices configured to perform radio communication with the communication terminal device. More specifically, when an altitude difference between a position of the communication terminal device and a position of the base station device is equal to or more than a threshold, at least one of the communication terminal device and the base station device performs repetition control of repeatedly transmitting a transmission object. Note that in this configuration, the repetition control may include control of causing hopping of a transmission frequency for the transmission object.

The above configuration can be variously modified based on the disclosure and the suggestion of the Description including the third embodiment. The above configuration and its modified configuration can solve the above problems, and can produce the above effects.

First Modification of Third Embodiment

Another method of reducing uplink interference from the UAV-UE is disclosed.

A limitation is set to a UE multiplex number on a PUCCH. The multiplex number may be the number of UEs multiplexed on one RB of a PUCCH.

For example, the UE multiplex number on a PUCCH may be set different between a normal UE and a UAV-UE. For example, the UE multiplex number on a PUCCH for the UAV-UE may be set smaller than the multiplex number on a PUCCH for the normal UE.

As another example, the UE multiplex number on a PUCCH may be set different between a UE in a ground mode and a UE in a flight mode. For example, the UE multiplex number on a PUCCH for the UE in the flight mode may be set smaller than the multiplex number on a PUCCH for the UE in the ground mode. The UE may be a UAV-UE, or may be a normal UE.

As another example, the UE multiplex number on a PUCCH may be set different, based on information of an altitude of a UE. For example, the UE multiplex number on a PUCCH for a UE at a higher altitude may be set smaller than the multiplex number on a PUCCH for a UE at a lower altitude. The UE may be a UAV-UE, or may be a normal UE.

As another example, the UE multiplex number on a PUCCH may be set different, based on information of a reception interference level of a base station. For example, the UE multiplex number on a PUCCH may be set smaller in communication with a base station with a high reception interference level, and the UE multiplex number on a PUCCH may be set larger in communication with a base station with a low reception interference level. The UE may be a UAV-UE, or may be a normal UE. In this manner, for example, communication quality between a base station and a UE can be secured in a certain degree or more.

The above UE multiplex number may be defined in a standard in advance. For example, a parameter indicating the UE multiplex number on a PUCCH for the UAV-UE may be newly provided. As another example, a parameter indicating the UE multiplex number on a PUCCH for the flight mode may be newly provided. In this manner, for example, control of the UE multiplex number in the base station is facilitated.

As another example, the higher NW device may determine the above UE multiplex number. For example, the higher NW device may be an MME, or may be an AMF. The higher NW device may notify the base station of the above UE multiplex number. In this manner, for example, interference power can be flexibly controlled, depending on the number of accommodated UEs.

As another example, the base station may determine the above UE multiplex number. For example, the base station may determine the above UE multiplex number, based on the number of beams. In this manner, for example, flexible control depending on the number of beams can be performed.

In the first modification, the multiplex number with a limitation may be prioritized over the multiplex number without a limitation. For example, when both a UAV-UE and a normal UE are present among connected UEs, the base station may use the multiplex number with a limitation. In this manner, interference power in the base station can be reduced even when both a UAV-UE and a normal UE are present.

As another example, the multiplex number without a limitation may be prioritized over the multiplex number with a limitation. For example, when both a UAV-UE and a normal UE are present among connected UEs, the base station may use the multiplex number without a limitation. In this manner, the base station can accommodate a large number of UEs.

According to the first modification, the number of UEs multiplexed on a PUCCH per RB can be reduced, and therefore uplink interference can be reduced.

Fourth Embodiment

Selection of a serving cell in the UAV-UE is performed based on RSRP. For example, in cell selection and/or cell re-selection, the UAV-UE selects a cell with the highest RSRP. Alternatively, the UAV-UE reports an RSRP measurement result to a serving cell. The serving cell determines a handover destination, based on the measurement result.

When the above method is employed, the following problems occur. Specifically, there is a problem that uplink transmission power for a serving cell is not necessarily reduced when the serving cell is determined based on a downlink RSRP measurement result, because RS transmission power is different for each cell.

Solutions to the above problems are disclosed below. Path loss is used for selection of a serving cell. The UAV-UE measures path loss of a cell.

Path loss may be used for cell selection and/or cell re-selection. For example, as a threshold used for cell selection and/or cell re-selection, a condition of path loss may be used.

The UAV-UE may switch a condition of path loss and a condition of RSRP. For example, the UAV-UE may use a condition of path loss, when transmission power control different from that for the ground which is described in the third embodiment, is used. Further, the UE may use a condition of RSRP, when transmission power the same as that for the ground is used. In this manner, complexity of the design of the UAV-UE can be avoided.

The threshold may be defined in a standard in advance, or may be broadcast from the base station to UEs.

As another example, the above threshold may be individually notified from the base station to a UE. The individual notification from the base station to a UE may be performed when the UE is in the RRC_CONNECTED state. The UE may use the threshold included in the notification, when the UE transitions from the RRC_CONNECTED state to an RRC_IDLE state or to the RRC_INACTIVE state. This enables flexible cell re-selection control for each UE.

A combination of path loss and RSRP may be used for cell selection and/or cell re-selection. For example, as a threshold used for cell selection and/or cell re-selection, a condition of path loss may be used, a condition of RSRP may be used, or a combination of conditions of path loss and RSRP may be used. As another example, a threshold of path loss and a threshold of RSRP may be used. For example, the threshold of RSRP may be used as a minimum required value of RSRP. The threshold of RSRP may be employed for the UAV-UE. In this manner, for example, minimum reception power in the UAV-UE can be secured, and at the same time, uplink interference can be reduced.

As a method of determining a cell selection and/or re-selection destination for the UAV-UE, for example, the UAV-UE may select a cell with low path loss. The cell may be a cell with the lowest path loss. In this manner, for example, interference in a cell can be reduced along with reduction in transmission power from the UAV-UE.

As another example of the determination method, a threshold may be set for path loss. The UAV-UE may select a cell with path loss lower than the threshold. For example, the cell may be a cell that is detected first among cells with path loss lower than the threshold. In this manner, for example, the UAV-UE can promptly select a cell in which transmission power can be reduced to a certain degree or less.

As another example of the determination method, both path loss and RSRP may be used. For example, a threshold of RSRP may be used. For example, the UAV-UE may select a cell with low path loss among cells with RSRP at the threshold or more. For example, the cell may be a cell with the lowest path loss. In this manner, for example, downlink reception power in the UAV-UE can be secured in a certain degree or more, and at the same time, interference in a cell can be reduced along with reduction in transmission power from the UAV-UE.

As another example of the determination method using both path loss and RSRP, a threshold of path loss may be used. For example, the UAV-UE may select a cell with high RSRP among cells with path loss at the threshold or less. For example, the cell may be a cell with the highest RSRP. In this manner, for example, interference in a cell can be reduced in a certain degree or more, and at the same time, downlink reception power in the UAV-UE can be secured.

As another solution to the above problems, path loss may be used for a handover.

The UAV-UE may perform path loss measurement. The UAV-UE may include information of the measured path loss in measurement report signaling to the base station. Alternatively, a measurement report for transmitting a notification of a path loss measurement result may be newly provided.

In the measurement report, an event trigger using path loss may be newly provided. In this manner, the UAV-UE can promptly notify a serving cell of a cell measurement result that satisfies a certain condition related to path loss.

A parameter used for the above event trigger may be newly provided. For example, the parameter may be a threshold of path loss, or may be a difference between path loss of a serving cell and path loss of a neighboring cell. The parameter may be broadcast from the base station to UEs, or may be individually notified to each UE. Alternatively, the parameter may be individually notified to a UAV-UE.

The above event trigger may include a condition of path loss. For example, the above event trigger may be provided by newly adding a condition of path loss to an existing event trigger. For example, an event trigger using RSRP, RSRQ, and path loss may be provided. In this manner, not only interference to a cell can be reduced, but also reception power can be secured and reception quality can be secured in the UAV-UE.

The UAV-UE may switch an event trigger including a condition of path loss and a conventional event trigger including a condition of RSRP. For example, the UAV-UE may use an event trigger including a condition of path loss, when transmission power control different from that for the ground, which is described in the third embodiment, is used.

Further, the UAV-UE may use an event trigger including a condition of RSRP, when transmission power the same as that for the ground is used. In this manner, complexity of the design of the UAV-UE can be avoided.

A cell may derive path loss for a handover using path loss. The UAV-UE may notify a serving cell of RSRP from a serving cell and/or a neighboring cell. The serving cell and the neighboring cell may transmit a notification of RS transmission power of their cells between the cells. The serving cell may derive path loss by using the RSRP notified from the UE and the RS transmission power notified between the cells. In this manner, the processing amount of the UE can be reduced.

The serving cell may use path loss for determination of a handover destination for the UAV-UE. As a determination method, for example, the serving cell may determine a cell with low path loss. This can reduce uplink interference from the UAV-UE.

The serving cell may switch methods of determining a handover destination for the UAV-UE. For example, the serving cell may use path loss for determination of a handover destination for the UAV-UE, when the UAV-UE uses transmission power control different from that for the ground, which is described in the third embodiment. Further, the serving cell may use RSRP for determination of a handover destination for the UAV-UE, when the UAV-UE uses transmission power the same as that for the ground. In this manner, for example, complexity of the design of the communication system can be avoided.

As another example, a cell with path loss at a certain threshold or less may be determined. For example, the cell may be a cell that is detected first by the serving cell, among cells at the above certain threshold or less. In this manner, a cell that can reduce uplink interference from the UAV-UE in a certain degree or more can be promptly detected.

As another example, a cell with low path loss may be selected among cells with RSRP at a certain threshold or more. In this manner, certain reception power in the UAV-UE can be secured, and at the same time, uplink interference from the UAV-UE can be reduced.

As another example, a cell with high RSRP may be selected among cells with certain path loss or less. In this manner, uplink interference from the UAV-UE can be reduced in a certain degree or more, and at the same time, reception power in the UAV-UE can be secured.

The fourth embodiment illustrates a case of a UAV-UE, but may be employed for a normal UE. For example, the methods illustrated in the fourth embodiment may also be employed for a normal UE, using information indicating a high altitude of a UE. In this manner, for example, interference power can be reduced and reception quality can be secured as with the case of the UAV-UE, even when a normal UE is mounted on a UAV to be flown.

The fourth embodiment illustrates a case of using path loss, but transmission power of a cell may be used. For example, a cell with transmission power at a certain threshold or less may be selected as a cell selection/re-selection destination and/or a handover destination. In this manner, for example, downlink interference power from the cell to another UE can be reduced.

According to the fourth embodiment, a cell allowing transmission with low uplink transmission power can be detected. The use of path loss for cell selection and/or cell re-selection enables selection of a cell allowing transmission from the UAV-UE with low transmission power. Further, the use of path loss for a handover enables a handover of a serving cell to a cell that allows the UAV-UE to perform transmission with low transmission power. As a result, uplink interference power in the UAV-UE can be reduced.

According to the fourth embodiment, the following configuration is provided, for example.

Provided is a communication system including: a communication terminal device; and a plurality of base station devices configured to perform radio communication with the communication terminal device. More specifically, when an altitude difference between a position of the communication terminal device and a position of the base station device is equal to or more than a threshold, at least one of cell selection, cell re-selection, and handover destination cell determination is performed based on information of path loss.

The above configuration can be variously modified based on the disclosure and the suggestion of the Description including the fourth embodiment. The above configuration and its modified configuration can solve the above problems, and can produce the above effects.

First Modification of Fourth Embodiment

For example, when a handover to a cell with low path loss is performed in the above fourth embodiment, the following problems occur. Specifically, if the UAV-UE repeats the handover, a handover failure may be more liable to occur. There is a problem that a handover failure hinders control of the UAV-UE, causing a fall of a flying UAV-UE, for example.

In the first modification, solutions to the above problems are disclosed.

As a method of determining a cell selection and/or re-selection destination, for example, the UAV-UE may select a cell with high path loss. The cell may be a cell with the highest path loss. In this manner, for example, the UAV-UE can select a cell with wide coverage.

As another example of the determination method, a threshold may be set for path loss. The UAV-UE may select a cell with path loss higher than the threshold. For example, the cell may be a cell that is detected first among cells with path loss higher than the threshold. In this manner, for example, the UAV-UE can promptly select a cell with certain coverage or wider.

As another example of the determination method, both path loss and RSRP may be used. For example, a threshold of RSRP may be used. For example, the UAV-UE may select a cell with high path loss among cells with RSRP at the threshold or more. For example, the cell may be a cell with the highest path loss. For example, this enables selection of a wide-coverage cell in which downlink reception power in the UAV-UE can be secured in a certain degree or more.

As another example of the determination method using both path loss and RSRP, a threshold of path loss may be used. For example, the UAV-UE may select a cell with high RSRP among cells with path loss at the threshold or more. For example, the cell may be a cell with the highest RSRP. In this manner, for example, a cell with certain coverage or wider can be selected, and downlink reception power in the UAV-UE can be secured.

Another solution is disclosed. As a method of selecting a handover destination in the fourth embodiment, for example, the serving cell may select a cell with high path loss. In this manner, a cell with wide cell coverage can be detected.

As another example, a cell with path loss at a certain threshold or more may be selected. For example, the cell may be a cell that is detected first by the serving cell, among cells at the above certain threshold or more. In this manner, a cell with certain coverage or wider can be promptly detected.

As another example, a cell with high path loss may be selected among cells with RSRP at a certain threshold or more. In this manner, certain reception power in the UAV-UE can be secured, and at the same time, a cell with wide cell coverage can be detected.

As another example, a cell with high RSRP may be selected among cells with certain path loss or more. In this manner, a cell with certain coverage or wider can be detected, and reception power in the UAV-UE can be secured.

Another solution is disclosed. A cell accessed by the UAV-UE may be set different between C-Plane and U-Plane. The DC configuration may be used. In this manner, for example, reliability of communication can be enhanced.

In the above, a method of selecting a C-Plane cell may be different from that of a U-Plane cell. For example, the methods disclosed in the first modification may be used for selection of a C-Plane cell. The methods disclosed in the fourth embodiment may be used for selection of a U-Plane cell. In this manner, robustness of communication between the UAV-UE and the base station can be secured, and at the same time, uplink interference power in the base station can be reduced.

The first modification illustrates a case of a UAV-UE, but may be employed for a normal UE. For example, the methods illustrated in the first modification may also be employed for a normal UE, using information indicating a high altitude of a UE. In this manner, for example, a wide cell can be selected as with the case of the UAV-UE even when a normal UE is mounted on a UAV to be flown.

In the first modification, transmission power of a cell may be used, as with the case of the fourth embodiment. For example, a cell with transmission power at a certain threshold or more may be selected as a cell selection/re-selection destination and/or a handover destination. In this manner, for example, a cell with wide cell coverage can be selected, and the number of times of handover can be reduced. As a result, a handover failure can be less liable to occur.

According to the methods illustrated in the first modification, when the UAV-UE uses a cell with high path loss, a cell with wide cell coverage can be used. When a cell with wide cell coverage is used, the number of times of handover can be reduced. As a result, a handover failure can be less liable to occur. Further, when the first modification is employed for cell selection/cell re-selection, the UAV-UE can be less liable to go out of a coverage area.

Fifth Embodiment

In communication between the UAV-UE and the base station, the following problems occur. Specifically, there is a problem that the methods described in the third embodiment, the first modification of the third embodiment, the fourth embodiment, and the first modification of the fourth embodiment lose effectiveness occurs, because a radio propagation condition differs depending on an altitude at which the UAV-UE communicates with the base station, and uplink interference to the base station therefore differs depending on an altitude.

In the fifth embodiment, solutions to the above problems are presented.

In the UAV-UE, a communication mode is newly provided. For example, the communication mode may be a communication mode for a flying UAV-UE (the communication mode may be hereinafter referred to as a flight mode). In the flight mode, the UAV-UE may perform communication by using parameter configuration different from that of a conventional communication mode, for example a normal mode. For example, the parameter in the flight mode may be the parameter illustrated in the third embodiment, the first modification of the third embodiment, the fourth embodiment, and the first modification of the fourth embodiment. The base station may broadcast the parameter in the flight mode to UAV-UEs. The parameter in the normal mode may be included. As an example of the broadcasting, system information may be used.

Alternatively, the base station may notify the UAV-UE of the parameter in the flight mode. The parameter in the normal mode may be included. The notification may be performed in advance from the base station to the UAV-UE. For example, as the notification, RRC-dedicated signaling may be used. In this manner, for example, the signaling amount from the base station to the UE can be reduced.

The notification may be transmitted a plurality of times from the base station to the UAV-UE. For example, each time a communication mode is switched, the base station may transmit the parameter of a communication mode after the switching to the UAV-UE. For example, as the notification, RRC-dedicated signaling may be used. A configured parameter may be variable in one mode. In this manner, for example, flexibility of operation can be enhanced even in the same flight mode, depending on a radio wave condition for the base station at the time point of mode switching.

As another example, when the parameter in the flight mode is changed while the UAV-UE communicates in the flight mode, a parameter for the flight mode after the change may be notified from the base station to the UAV-UE. The same may apply to the normal mode. In this manner, for example, the base station can flexibly change a parameter, and therefore flexibility of the communication system can be enhanced.

The UAV-UE may switch between the normal mode and the flight mode during communication. In this manner, for example, appropriate transmission power control can be performed during each of takeoff, landing, and flight.

The UAV-UE may determine the switching. The UAV-UE may determine the switching, and employ the switching for the UAV-UE. The UAV-UE may notify the base station of the switching. For example, this can reduce the processing amount of the base station.

RRC signaling may be used for the notification. This enables transmission of a large amount of data, and therefore, for example, information of the measurement result used for the switching can be included. In this manner, for example, appropriate control of the UAV-UE in the base station is facilitated.

As another example of the notification, MAC signaling may be used. In this manner, high reliability can be secured by means of HARQ retransmission, and prompt notification can be performed.

As another example of the notification, L1/L2 signaling may be used. In this manner, further prompt notification can be performed.

The UAV-UE may determine the switching, based on RSRP. The UAV-UE may determine the switching, based on path loss. The UAV-UE may determine the switching, based on a combination of both. In the determination, a threshold of RSRP and/or path loss may be set. For example, the UAV-UE may determine transition from the normal mode to the flight mode, based on detection of a predetermined number of cells or more that satisfy a condition using the threshold of each of RSRP and path loss. In this manner, for example, the UAV-UE can switch between the normal mode and the flight mode, without using positioning information. Therefore, complexity of the design of the UAV-UE can be avoided.

The threshold of RSRP and/or path loss in the determination may be defined in a standard in advance, may be broadcast from the base station to UAV-UEs, or may be individually notified from the base station to a UAV-UE. The same may apply to the above predetermined number.

FIG. 27 is a sequence diagram illustrating operation in which the UAV-UE determines a communication mode. FIG. 27 illustrates an example in which parameters in the normal mode and the flight mode are notified from the base station to the UAV-UE in advance. The example of FIG. 27 illustrates a case where the UAV-UE switches from the normal mode to the flight mode, and then switches to the normal mode again. Further, in the example of FIG. 27, the switching of the communication mode is notified from the UAV-UE to the base station by using L1/L2 signaling.

In Step ST1901 illustrated in FIG. 27, the base station notifies the UAV-UE of an RRC parameter. The RRC parameter includes parameters in the normal mode and the flight mode.

In Step ST1902 illustrated in FIG. 27, the UAV-UE performs downlink signal measurement. A measurement target may be RSRP, may be path loss, or may be a combination of both.

In Step ST1903 illustrated in FIG. 27, the UAV-UE determines that a flight mode transition condition is satisfied, based on the measurement result of Step ST1902. The UAV-UE transitions to the flight mode. The UAV-UE performs uplink transmission, by using the parameter for the flight mode acquired in Step ST1901. In Step ST1904, the UAV-UE notifies the base station that the UAV-UE has transitioned to the flight mode, by using L1/L2 signaling.

In Step ST1905 illustrated in FIG. 27, the UAV-UE performs downlink signal measurement. A measurement target may be the same as that of Step ST1902.

In Step ST1906 illustrated in FIG. 27, the UAV-UE determines that a normal mode transition condition is satisfied, based on the measurement result of Step ST1905. The UAV-UE transitions to the normal mode. The UAV-UE performs uplink transmission, by using the parameter for the normal mode acquired in Step ST1901. In Step ST1907, the UAV-UE notifies the base station that the UAV-UE has transitioned to the normal mode, by using L1/L2 signaling.

FIG. 27 illustrates an example in which parameters in the normal mode and the flight mode are notified from the base station to the UAV-UE in advance, but the parameters may be notified from the base station to the UAV-UE a plurality of times. For example, in Step ST1901, the parameter notified from the base station to the UAV-UE may be a parameter for the normal mode. Further, after Step ST1904, a parameter for the flight mode may be notified from the base station to the UAV-UE. In a similar manner, after Step ST1907, a parameter for the normal mode may be notified from the base station to the UAV-UE. In this manner, for example, for the UAV-UE that does not often switch between the normal mode and the flight mode, the signaling amount with the base station can be reduced. As another example, when the parameter in the flight mode is changed while the UAV-UE communicates in the flight mode as illustrated in Step ST1903, a parameter for the flight mode after the change may be notified from the base station to the UAV-UE. The same may apply to the normal mode illustrated in Step ST1906. In this manner, for example, the base station can flexibly change a parameter, and therefore flexibility of the communication system can be enhanced.

As another example of the switching, the base station may make a determination. A command of the switching may be issued from the base station to the UAV-UE. In this manner, for example, UAV-UE control in the base station is facilitated.

RRC signaling may be used for the command. For example, the command may be included in other RRC signaling. This can reduce the signaling amount.

As another example of the command, MAC signaling may be used. In this manner, high reliability can be secured by means of HARQ retransmission, and prompt notification can be performed.

As another example of the command, L1/L2 signaling may be used. In this manner, further prompt notification can be performed.

The base station may determine the switching based on RSRP, may determine the switching based on path loss, or may determine the switching based on a combination of both. The determination in the base station may be similar to the above determination in the UAV-UE.

The base station may determine the switching based on a cell, may determine the switching based on a beam, or may determine the switching based on a combination of both. For example, the cell and/or the beam may be a cell and/or a beam requiring interference reduction using the flight mode. The base station may notify the UAV-UE of information of the cell and/or the beam. The information may be an identifier of the cell and/or the beam. The UAV-UE may perform the switching, based on the information of the cell and/or the beam. For example, when the UAV-UE communicates with the base station by using the cell and/or the beam, the UAV-UE may switch from the normal mode to the flight mode. In this manner, for example, efficient operation of the communication system can be performed, in such a manner that interference is reduced for a cell and/or a beam requiring interference reduction, and that transmission and reception quality is secured for another cell and/or beam.

The switching between a communication mode and a communication mode disclosed in the fifth embodiment may be employed for a normal UE. For example, the communication mode and the switching may be employed for a normal UE present at a high place. A condition for the switching employed for a normal UE may be the same as or different from the condition employed for a UAV-UE. For example, this enables control of interference to the base station, which is caused by uplink transmission power from a normal UE that presents at a high place such as a roof of a building.

The fifth embodiment may apply to the third embodiment, the first modification of the third embodiment, the fourth embodiment, and the first modification of the fourth embodiment. Specifically, the UAV-UE in the third embodiment, the first modification of the third embodiment, the fourth embodiment, and the first modification of the fourth embodiment may be a UE in the flight mode. The UE in the flight mode may be a UAV-UE, or may be a normal UE. In this manner, for example, transmission power control can be appropriately performed for a flying UAV-UE and/or a UE at a high place.

According to the fifth embodiment, appropriate power control depending on a flight altitude of a UE can be performed.

According to the fifth embodiment, the following configuration is provided, for example.

Provided is a communication system including: a communication terminal device; and a plurality of base station devices configured to perform radio communication with the communication terminal device. More specifically, the communication terminal device and the base station device switch between a plurality of communication modes during communication, depending on an altitude difference between a position of the communication terminal device and a position of the base station device.

The above configuration can be variously modified based on the disclosure and the suggestion of the Description including the fifth embodiment. The above configuration and its modified configuration can solve the above problems, and can produce the above effects.

The embodiments and the modifications are merely illustrations of the present invention, and can be freely combined within the scope of the present invention. Any constituent elements of the embodiments and the modifications can be appropriately modified or omitted.

For example, the subframe in the embodiments and the modifications is an example time unit of communication in the fifth generation base station communication system. The subframe may be set per scheduling. The processes described in the embodiments and the modifications as being performed per subframe may be performed per TTI, per slot, per sub-slot, or per mini-slot.

While the invention is described in detail, the foregoing description is in all aspects illustrative and does not restrict the present invention. Therefore, numerous modifications and variations that have not yet been exemplified are devised without departing from the scope of the present invention.

EXPLANATION OF REFERENCE SIGNS

200 Communication system, 202 Communication terminal device, 203, 800 Base station device

The invention claimed is:

1. A communication system comprising:
a communication terminal device; and
a plurality of base station devices configured to perform radio communication with the communication terminal device, wherein
the plurality of base station devices include a master base station device and a secondary base station device that are configured to provide at least one bearer for the communication terminal device,
when the secondary base station device detects generation of downlink data for the communication terminal device being in an RRC_INACTIVE state, the secondary base station device notifies the master base station device of the generation of the downlink data,
when the master base station device receives the notification about the generation of the downlink data, the master base station device transmits paging to the communication terminal device, and
when the communication terminal device receives the paging, the communication terminal device transmits a request for restoration to an RRC_CONNECTED state to the master base station device,
the paging including at least one of
information about connection between the communication terminal device and the master base station device, and
information about connection between the communication terminal device and the secondary base station device.

2. A base station device configured to perform radio communication with a communication terminal device, wherein
the base station device operates as a secondary base station device configuring at least one bearer for the communication terminal device with a master base station device,
when the base station device detects generation of downlink data for the communication terminal device being in an RRC_INACTIVE state, the base station device notifies the master base station device of the generation of the downlink data,
when the master base station device receives the notification about the generation of the downlink data, the master base station device transmits paging to the communication terminal device, and
the paging includes at least one of
information about connection between the communication terminal device and the master base station device, and
information about connection between the communication terminal device and the base station device.

3. A base station device configured to perform radio communication with a communication terminal device, wherein
the base station device operates as a master base station device configuring at least one bearer for the communication terminal device with a secondary base station device,
when the secondary base station device detects generation of downlink data for the communication terminal device being in an RRC_INACTIVE state, the secondary base station device notifies the base station device of the generation of the downlink data,
when the base station device receives the notification about the generation of the downlink data, the base station device transmits paging to the communication terminal device, and
the paging includes at least one of
information about connection between the communication terminal device and the base station device, and
information about connection between the communication terminal device and the secondary base station device.

4. A communication terminal device configured to perform radio communication with a plurality of base station devices, wherein
the plurality of base station devices include a master base station device and a secondary base station device that are configured to provide at least one bearer for the communication terminal device,
when the secondary base station device detects generation of downlink data for the communication terminal device being in an RRC_INACTIVE state, the secondary base station device notifies the master base station device of the generation of the downlink data,
when the master base station device receives the notification about the generation of the downlink data, the master base station device transmits paging to the communication terminal device, and
when the communication terminal device receives the paging, the communication terminal device transmits a request for restoration to an RRC_CONNECTED state to the master base station device, the paging including at least one of
information about connection between the communication terminal device and the master base station device, and
information about connection between the communication terminal device and the secondary base station device.

* * * * *